USO11687195B2

(12) United States Patent
Uchida et al.

(10) Patent No.: US 11,687,195 B2
(45) Date of Patent: Jun. 27, 2023

(54) CONTACTLESS INPUT DEVICE

(71) Applicant: Alps Alpine Co., Ltd., Tokyo (JP)

(72) Inventors: Keitaro Uchida, Miyagi-ken (JP);
Masaki Ota, Miyagi-ken (JP);
Masahiro Takata, Miyagi-ken (JP)

(73) Assignee: Alps Alpine Co., Ltd., Tokyo (JP)

( * ) Notice: Subject to any disclaimer, the term of this patent is extended or adjusted under 35 U.S.C. 154(b) by 0 days.

(21) Appl. No.: 17/886,874

(22) Filed: Aug. 12, 2022

(65) Prior Publication Data

US 2023/0063584 A1    Mar. 2, 2023

(30) Foreign Application Priority Data

Aug. 26, 2021    (JP) .............................. JP2021-138377

(51) Int. Cl.
*G06F 3/041*    (2006.01)
*G06F 3/044*    (2006.01)

(52) U.S. Cl.
CPC ........ *G06F 3/04186* (2019.05); *G06F 3/0443* (2019.05); *G06F 3/0446* (2019.05); *G06F 2203/04104* (2013.01); *G06F 2203/04108* (2013.01)

(58) Field of Classification Search
CPC ...... G06F 3/0446; G06F 3/0443; G06F 3/044; G06F 2203/04108; G06F 2203/04104; G06F 3/041; G06F 3/0418; G06F 3/04186; G06F 3/0416; G06F 3/041661; G06F 3/041662; G06F 3/04166
See application file for complete search history.

(56) References Cited

U.S. PATENT DOCUMENTS

| 2010/0097329 | A1* | 4/2010 | Simmons | G06F 3/04166 345/173 |
| 2013/0016045 | A1* | 1/2013 | Zhao | G06F 3/04883 345/173 |
| 2015/0035795 | A1 | 2/2015 | Oshita et al. | |
| 2015/0212649 | A1 | 7/2015 | Oshita et al. | |
| 2016/0224187 | A1* | 8/2016 | Huang | G06F 3/041661 |
| 2017/0285848 | A1* | 10/2017 | Rosenberg | G06F 3/03547 |
| 2017/0322649 | A1* | 11/2017 | Wang | G06F 3/0443 |
| 2017/0356812 | A1* | 12/2017 | Madden | H03K 17/962 |
| 2018/0052562 | A1* | 2/2018 | Dekel | G06F 3/04186 |
| 2018/0129335 | A1* | 5/2018 | Stone | G06F 3/04162 |
| 2018/0164894 | A1* | 6/2018 | Guarneri | G06F 3/04883 |
| 2019/0346958 | A1* | 11/2019 | Suzuki | G02F 1/134363 |

(Continued)

FOREIGN PATENT DOCUMENTS

| JP | 2015-32177 | 2/2015 |
| JP | 2015-141425 | 8/2015 |

*Primary Examiner* — Darlene M Ritchie
(74) *Attorney, Agent, or Firm* — Beyer Law Group LLP

(57) ABSTRACT

A contactless input device includes a plurality of sensor electrodes and a determination unit. The plurality of sensor electrodes are configured to, when a hand performs an operational input over an operating surface of an operating part in a contactless manner, detect individual capacitances correlated to proximity of the hand to the operating surface. The determination unit is configured to calculate sharpnesses of the hand at a plurality of different locations in plan view based on the respective capacitances detected by the plurality of sensor electrodes and determine a location of the operational input based on the sharpnesses.

19 Claims, 36 Drawing Sheets

(56) References Cited

U.S. PATENT DOCUMENTS

| | | | |
|---|---|---|---|
| 2020/0257430 A1* | 8/2020 | Hatano | G06F 3/04186 |
| 2021/0026484 A1* | 1/2021 | Kim | G06F 3/04182 |
| 2022/0129147 A1* | 4/2022 | Slassi | G06F 3/0412 |
| 2022/0137780 A1* | 5/2022 | Kim | G06F 3/0447 |
| | | | 345/173 |
| 2023/0012245 A1* | 1/2023 | Li | G06F 1/1694 |
| 2023/0022102 A1* | 1/2023 | Yamaguchi | G06F 3/044 |

* cited by examiner

FIG. 14A

| 145 | 190 | 178 | 123 | 81 | 78 |
|---|---|---|---|---|---|
| 285 | 552 | 901 | 538 | 146 | 115 |
| 333 | 697 | 892 | 613 | 286 | 137 |
| 290 | 647 | 888 | 724 | 338 | 126 |
| 254 | 810 | 832 | 835 | 796 | 98 |

FIG. 14B

| 6.9 | 5.3 | 5.6 | 8.1 | 12.3 | 12.8 |
|---|---|---|---|---|---|
| 3.5 | 1.8 | 1.1 | 1.9 | 6.8 | 8.7 |
| 3.0 | 1.4 | 1.1 | 1.6 | 3.5 | 7.3 |
| 3.4 | 1.5 | 1.1 | 1.4 | 3.0 | 7.9 |
| 3.9 | 1.2 | 1.2 | 1.2 | 1.3 | 10.2 |

FIG. 14C

| MINIMUM RECIPROCAL VALUE Minimum(i) | COLUMN Column(i) of MINIMUM RECIPROCAL VALUE |
|---|---|
| 5.0 | – |
| 1.1 | 3 |
| 1.1 | 3 |
| 1.1 | 3 |
| 1.2 | 4 |

FIG. 15A

| EQUAL TO OR SMALLER THAN PROXIMITY DETERMINATION THRESHOLD | DOUBLE OR GREATER THAN ROW PLACED ONE ROW BELOW | DOUBLE OR GREATER THAN ROW PLACED ONE ROW ABOVE | TARGET |
|---|---|---|---|
| FALSE | FALSE | TRUE | FALSE |
| TRUE | TRUE | TRUE | TRUE |
| TRUE | TRUE | TRUE | TRUE |
| TRUE | TRUE | TRUE | TRUE |
| TRUE | TRUE | TRUE | TRUE |

FIG. 15B

| VALUE ON LEFT SIDE OF MINIMUM VALUE | MINIMUM VALUE | VALUE ON RIGHT SIDE OF MINIMUM VALUE |
|---|---|---|
| – | – | – |
| 1.8 | 1.1 | 1.9 |
| 1.4 | 1.1 | 1.6 |
| 1.5 | 1.1 | 1.4 |
| 1.2 | 1.2 | 1.3 |

FIG. 15C

| SECOND-ORDER COEFFICIENT OF QUADRATIC FUNCTION |
|---|
| 0.00 |
| 0.73 |
| 0.41 |
| 0.34 |
| 0.03 |

FIG. 15D

| MAXIMUM SECOND-ORDER COEFFICIENT, ROW, COLUMN |
|---|
| 0.73 |
| ROW 2 |
| COLUMN 3 |
|  |

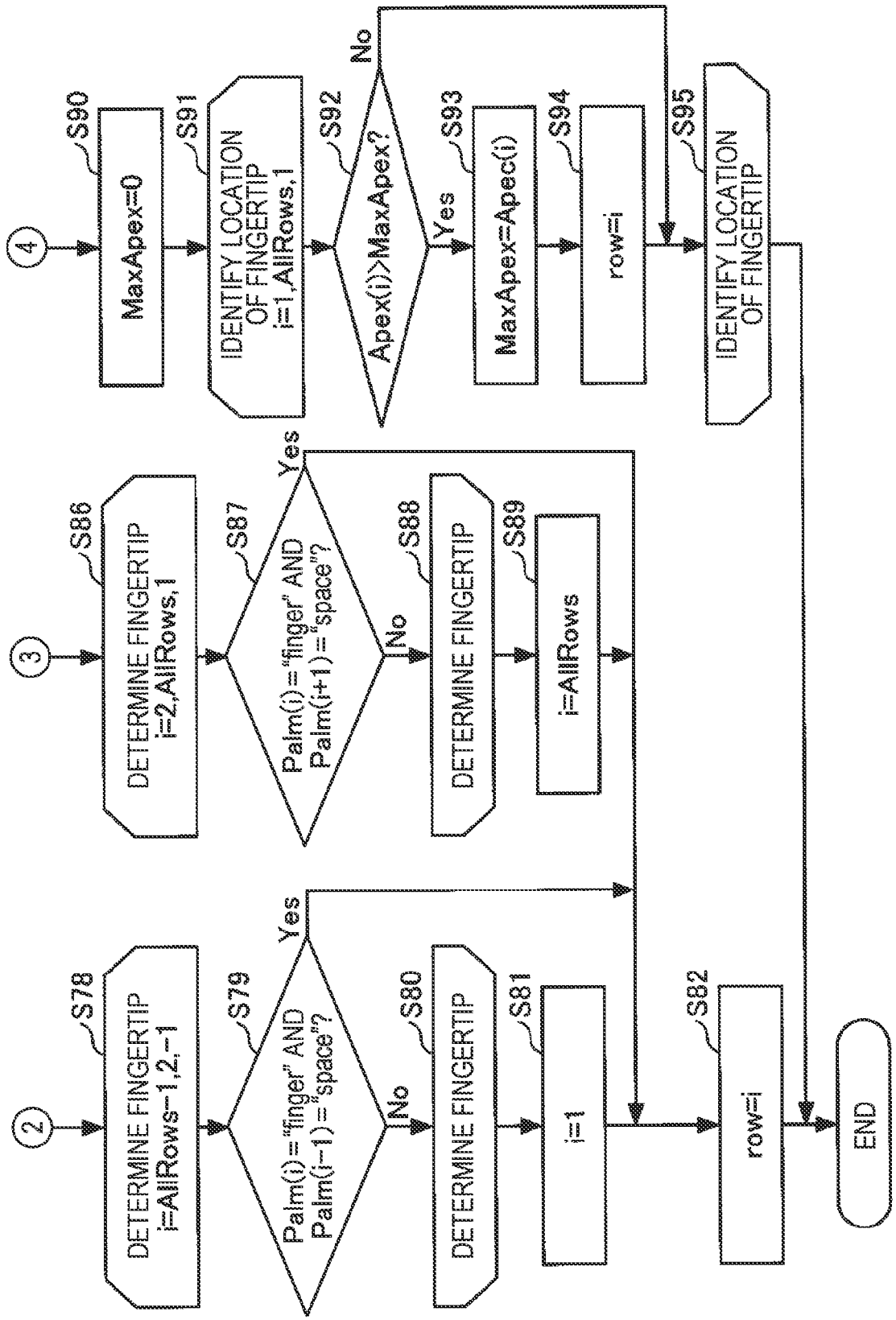

FIG. 24A

| 23 | 20 | 21 | 26 | 29 | 30 |
|----|----|----|----|----|----|
| 18 | 12 | 1  | 13 | 22 | 27 |
| 15 | 9  | 2  | 11 | 17 | 24 |
| 16 | 10 | 3  | 8  | 14 | 25 |
| 19 | 6  | 5  | 4  | 7  | 28 |

FIG. 24B

| ORDER | X COORDINATE | Y COORDINATE |
|-------|--------------|--------------|
| 1 | 3 | 2 |
| 2 | 3 | 3 |
| 3 | 3 | 4 |
| 4 | 4 | 5 |
| 5 | 3 | 5 |

FIG. 24C

| ABSOLUTE VALUE OF VARIANCE OF BigX(i) | ABSOLUTE VALUE OF COVARIANCE OF BigX(i) AND BigY(i) |
|---|---|
| 0.16 | 0.24 |

FIG. 25A

| FINGER/PALM DETERMINATION |
| --- |
| SPACE |
| FINGER |
| FINGER |
| FINGER |
| PALM |

FIG. 25B

| DETERMINATION OF FINGER EXTENDED FROM PALM ON LOWER SIDE |
| --- |
| FALSE |
| FALSE |
| FALSE |
| TRUE |

FIG. 25C

| DETERMINATION OF FINGERTIP |
| --- |
| - |
| TRUE |
| FALSE |
| FALSE |

FIG. 25D

| ROW AND COLUMN OF FINGERTIP |
| --- |
| ROW 2 |
| COLUMN 3 |

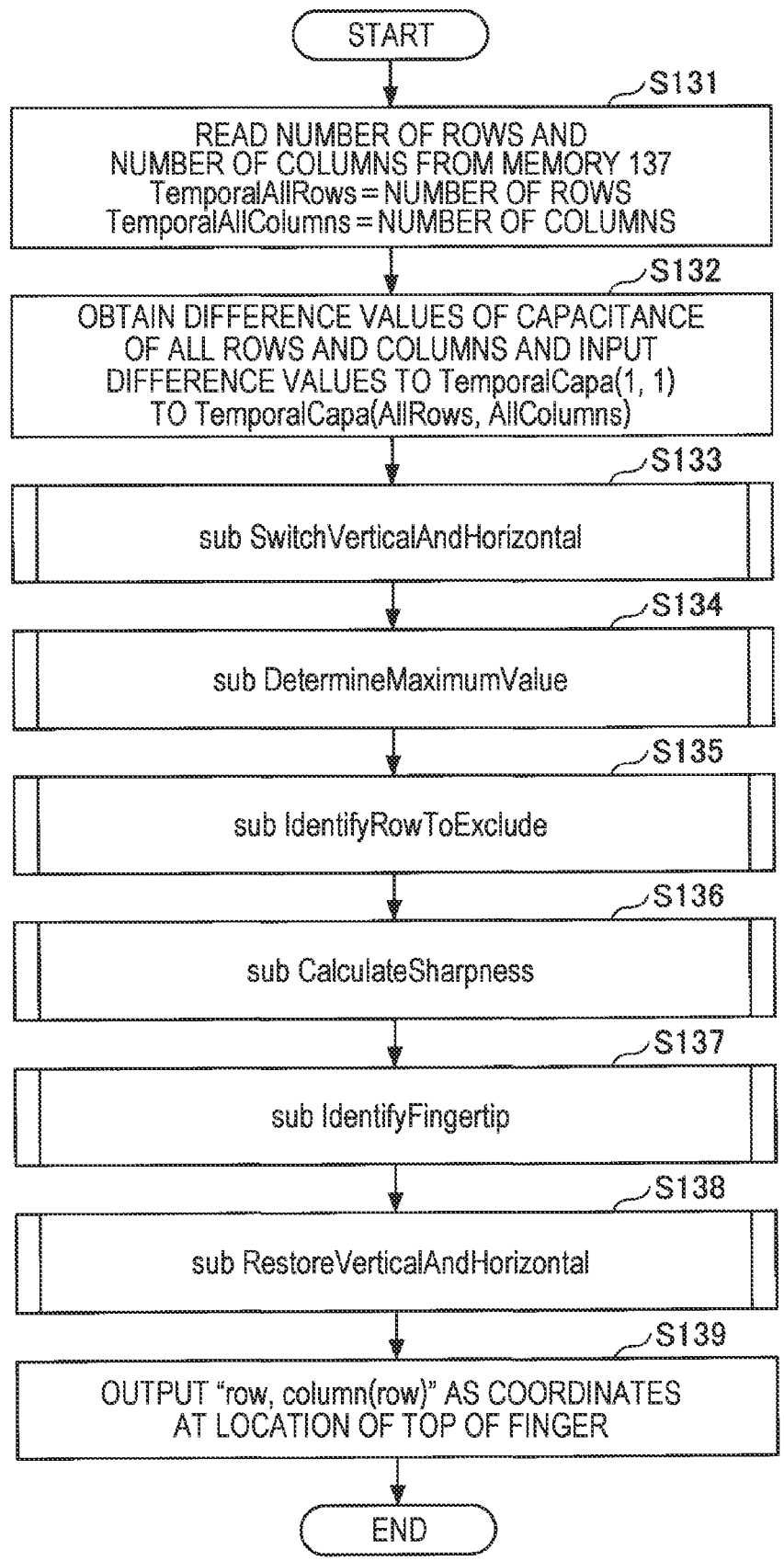

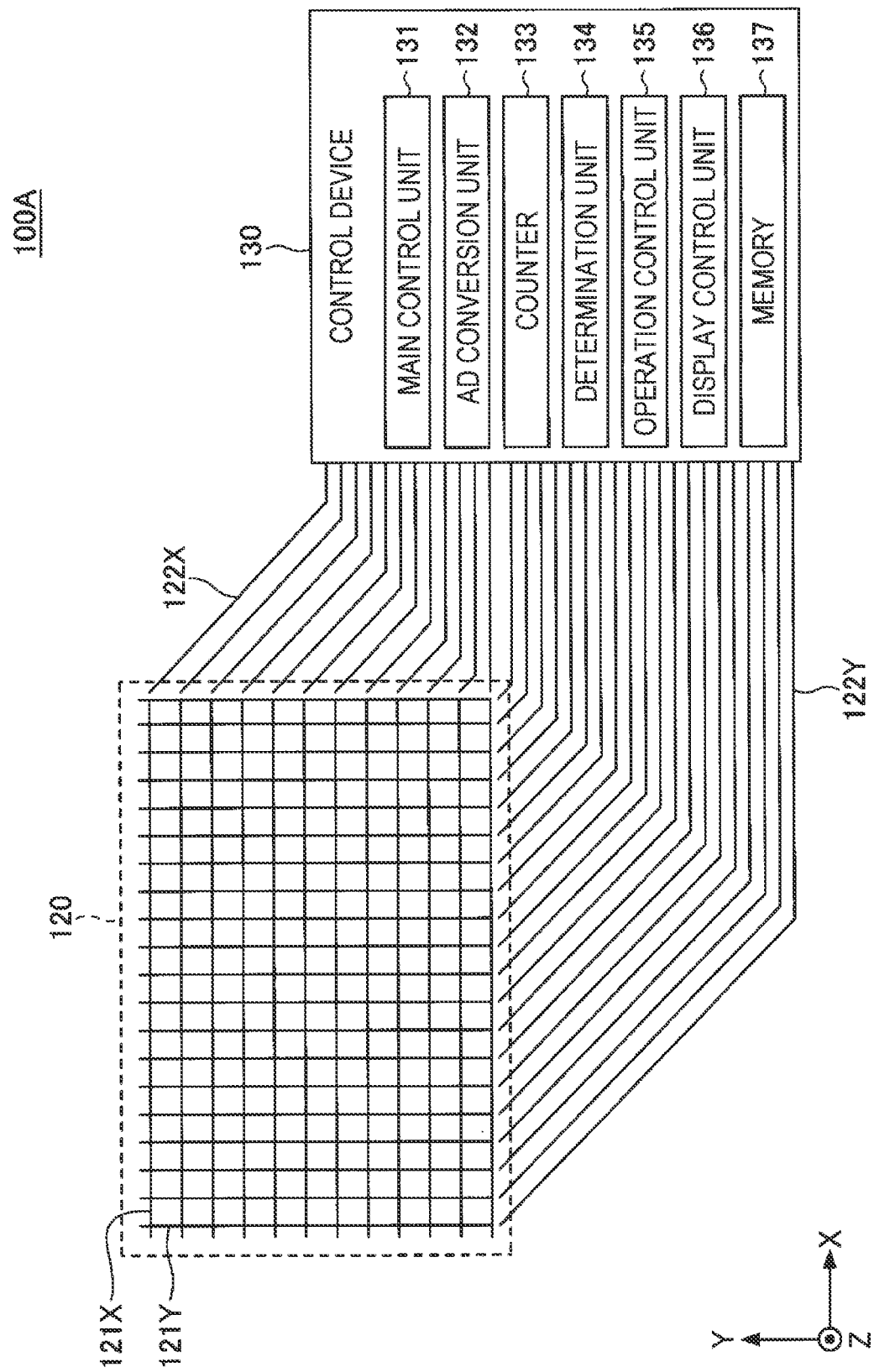

CONTACTLESS INPUT DEVICE

CLAIM OF PRIORITY

This application claims benefit of Japanese Patent Application No. 2021-138377 filed on Aug. 26, 2021, which is hereby incorporated by reference.

BACKGROUND OF THE INVENTION

1. Field of the Invention

The present invention relates to a contactless input device.

2. Description of the Related Art

A touchpad input device including a control unit having a palm rejection function has been developed. With the palm rejection function, by detecting a change in an electrical variable caused by an object in close contact with an operating surface, a contact region contacted by the object is calculated, and it is determined whether the contact region is contacted by a fingertip or a palm. The determination of whether the operation is performed by a fingertip or a palm is provided based on the area of the contact region (refer to, for example, US2015/0212649A1).

Known touch pad input devices have been developed to be used in the condition in which the operating surface is touched by a hand. However, in some cases, it is desired to perform operational input in a contactless manner without touching the operating surface with a hand.

The present invention provides a contactless input device that can determine whether a contactless operation is performed and where the operation is performed.

SUMMARY OF THE INVENTION

A contactless input device according to an embodiment of the present invention includes a plurality of sensor electrodes and a determination unit. The plurality of sensor electrodes are configured to, when a hand performs an operational input over an operating surface of an operating part in a contactless manner, detect individual capacitances correlated to proximity of the hand to the operating surface. The determination unit is configured to calculate sharpnesses of the hand at a plurality of different locations in plan view based on the respective capacitances detected by the plurality of sensor electrodes and determine a location of the operational input based on the sharpnesses.

BRIEF DESCRIPTION OF THE DRAWINGS

FIGS. 14A, 14B, and 14C indicate a distribution of the difference value $\Delta AD$, a distribution of reciprocal, and columns yielding the minimum reciprocal values Minimum(i), indicated by Column(i);

FIGS. 15A, 15B, 15C, and 15D indicate targets for calculation of sharpness, minimum values Minimum(i), results of calculation of sharpness, and a largest sharpness and coordinates;

FIGS. 20A and 20B provide a flowchart illustrating an operation of calculating sharpness, performed according to a subroutine "sub IdentifyFingertip" of a fourth modification;

FIGS. 24A, 24B, and 24C indicate an order of the difference values $\Delta AD$ calculated on sensor electrodes with 5 rows and 6 columns, and an absolute value of variance of BigX(i) and an absolute value of covariance of BigX(i) and BigY(i);

FIGS. 25A, 25B, 25C, and 25D indicate determination results obtained in the operation of identifying the fingertip according to the fourth modification illustrated in FIGS. 20A and 20B;

FIG. 26 is a flowchart illustrating a process of identifying the location of the fingertip according to a sixth modification;

FIG. 33 illustrates a specific configuration of the electrostatic sensor of the contactless input device.

DESCRIPTION OF THE PREFERRED EMBODIMENTS

Hereinafter, an embodiment as an application of a contactless input device of the present invention will be described.

Embodiment

Figure 1:
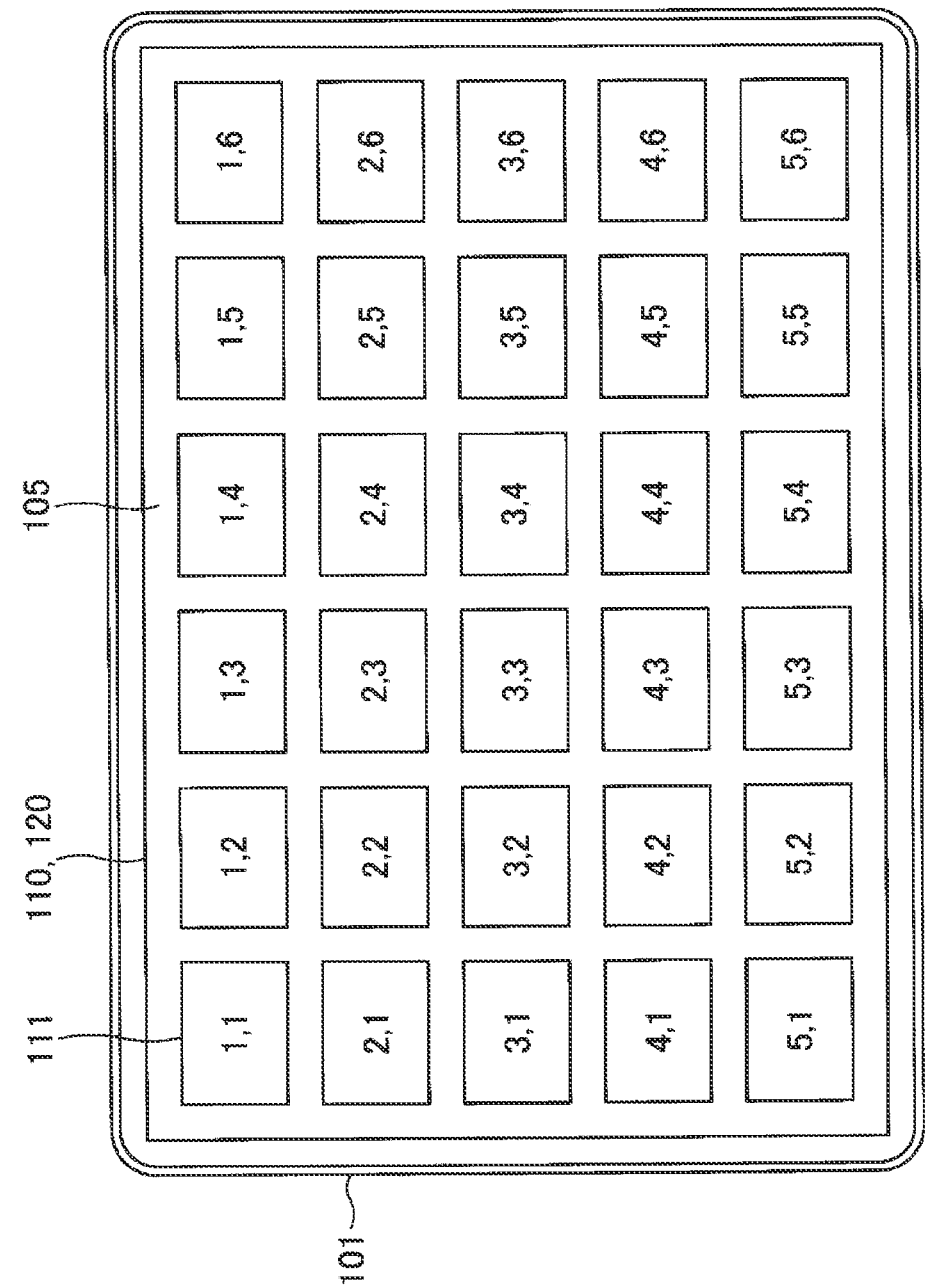
FIG. 1 illustrates an example of a configuration of an electronic apparatus including a contactless input device of an embodiment.
Figure 2:
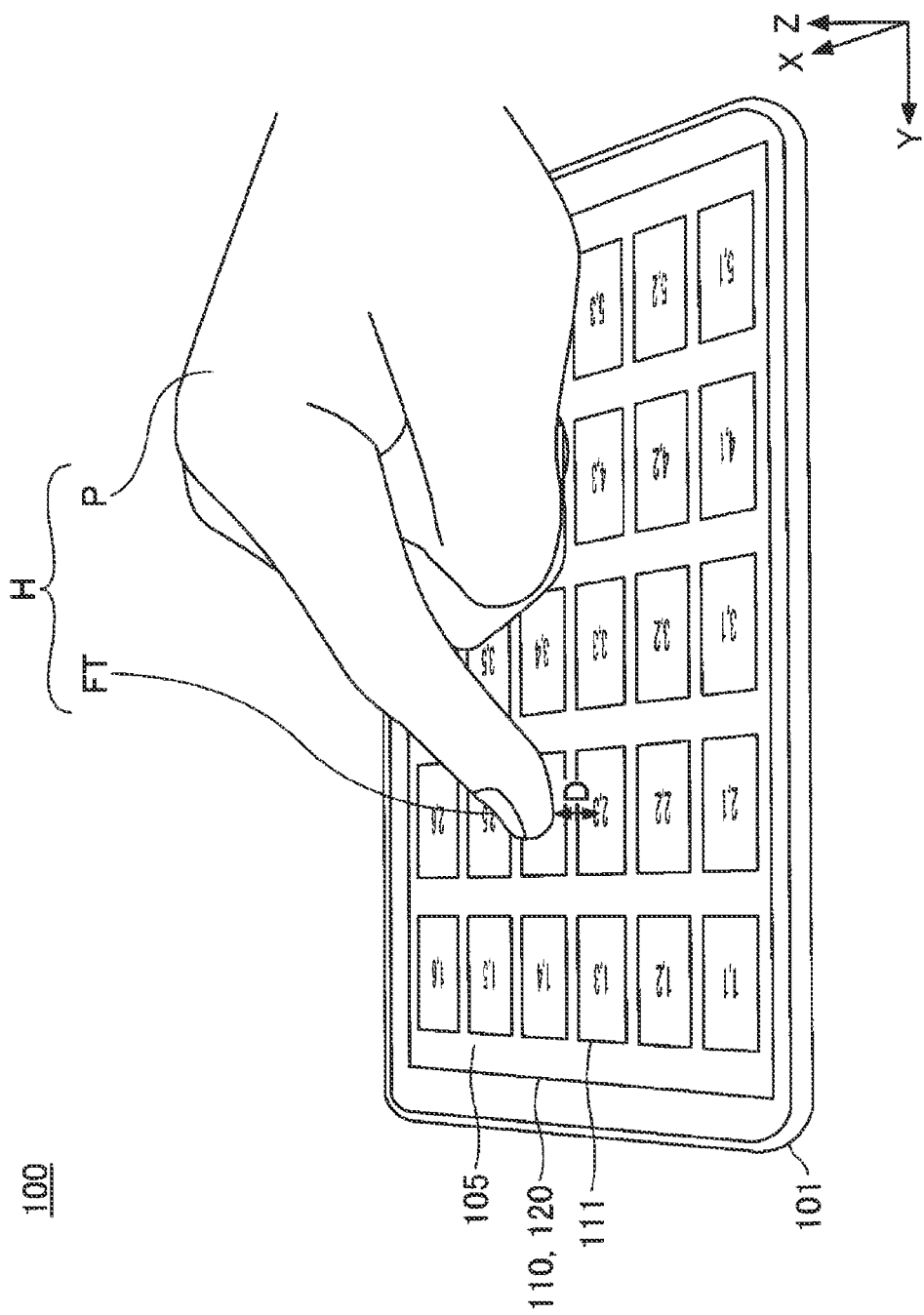
FIG. 2 illustrates an example of the configuration of the electronic apparatus including the contactless input device of the embodiment.
Figure 3:
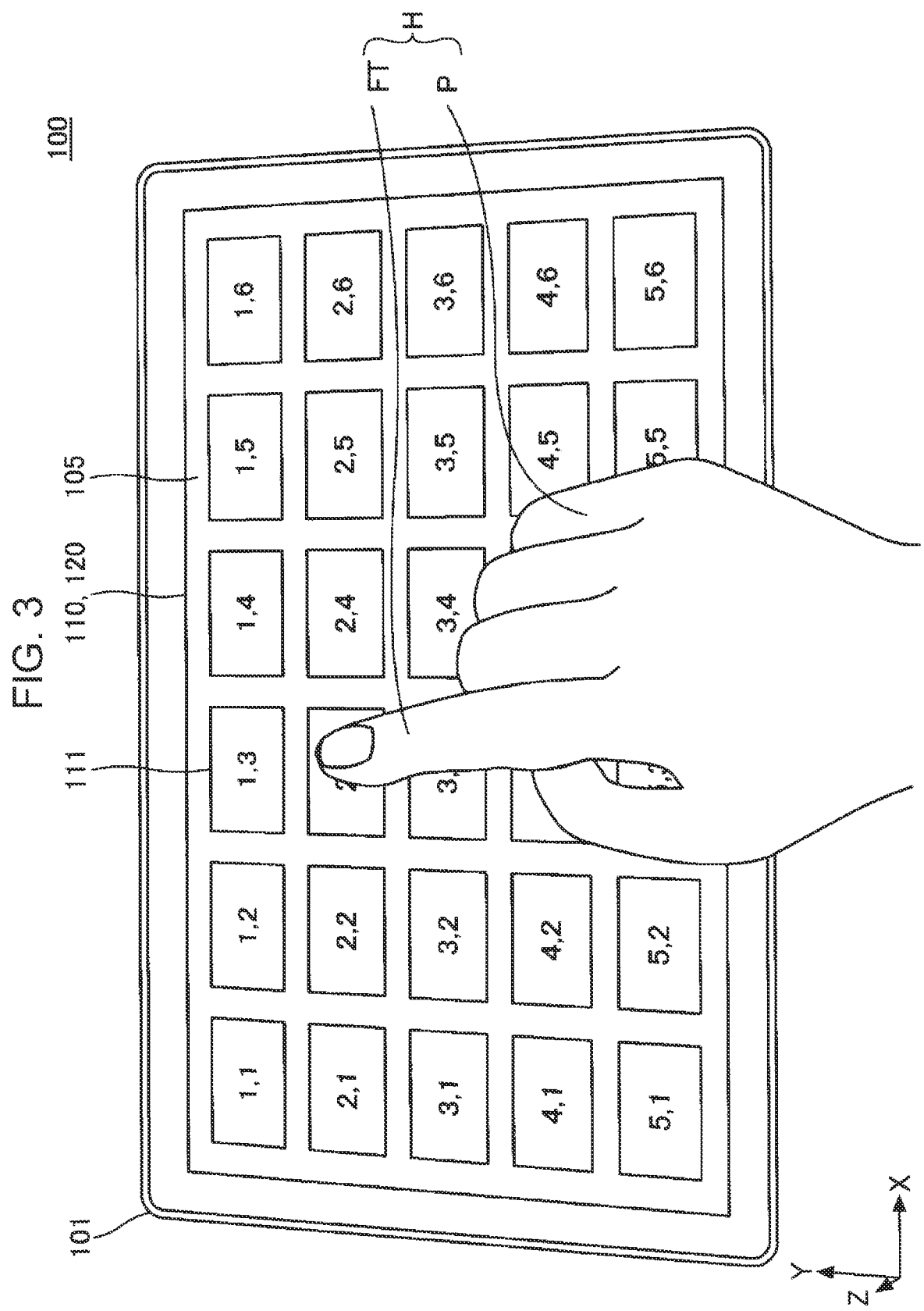
FIG. 3 illustrates an example of the configuration of the electronic apparatus including the contactless input device of the embodiment.
Figure 4:
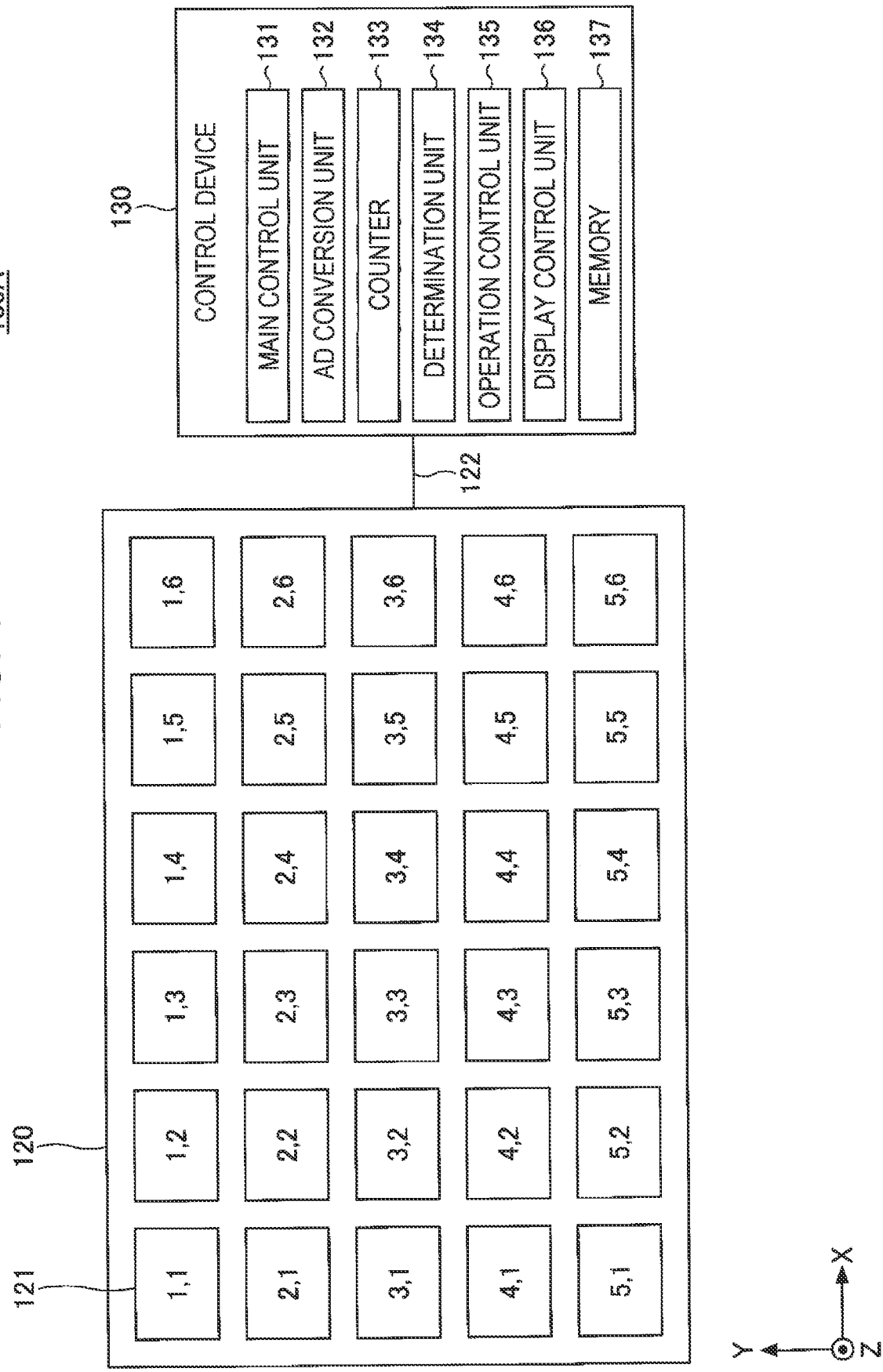
FIG. 4 illustrates an example of a configuration of the contactless input device of the embodiment.

FIGS. 1, 2, and 3 illustrate an example of a configuration of an electronic apparatus 100 including a contactless input device of an embodiment. FIG. 4 illustrates an example of a configuration of a contactless input device 100A of the embodiment. FIGS. 2 and 3 illustrate a hand H of a user of the electronic apparatus 100. More specifically, a fingertip FT and a palm (the inner surface of the hand) P of the hand H are illustrated. The fingertip FT is exemplified by the index finger, but may be a finger other than the index finger.

The following defines and describes an XYZ coordinate system. A direction parallel to an X axis (X direction), a direction parallel to a Y axis (Y direction), and a direction parallel to a Z axis (Z direction) are perpendicular to each other. In the following description, a −Z direction is a direction toward an electrostatic sensor 120, and the +Z direction is a direction away from the electrostatic sensor 120. Plan view means XY plane view. In the following description, for ease of understanding, for example, the length, width, and thickness of individual elements may be presented in an exaggerated manner.

The electronic apparatus 100 includes a casing 101, a display device 110, the electrostatic sensor 120, and a control device 130. Although FIGS. 1 to 3 do not illustrate the control device 130 (refer to FIG. 4), the control device 130 is provided, for example, under the display device 110 and the electrostatic sensor 120 inside the casing 101. The contactless input device 100A includes, as illustrated in FIG. 4, the electrostatic sensor 120 and the control device 130.

The casing 101 is a case made of a material such as a resin or metal, formed to house the display device 110, the electrostatic sensor 120, and the control device 130. The display device 110 is disposed, for example, under the transparent electrostatic sensor 120, and the display device 110 is viewable through an operating surface 105 that is the top surface of, for example, a transparent panel provided in an opening at the upper part of the casing 101.

Instead of touching the operating surface 105 of the electronic apparatus 100 with the fingertip FT and the palm P, the electronic apparatus 100 can be operated by the fingertip FT and the palm P brought close to the operating surface 105 in a contactless manner. FIGS. 2 and 3 illustrate, as an example, the state in which an operational input is being performed on an operating part 111 with the fingertip FT spaced apart by a distance D from the operating surface 105 (refer to FIG. 2). The electronic apparatus 100 detects the location of the fingertip FT not touching the operating surface 105 and accepts the contactless operational input. The contactless operational input means operating the electronic apparatus 100 with the fingertip FT without touching the operating surface 105 with the fingertip FT.

The electronic apparatus 100 may be, for example, a tablet computer input device or an input unit of an automatic teller machine (ATM), installed in a retail establishment or a facility for use by the general public. Alternatively, the electronic apparatus 100 may be, for example, a tablet computer, smartphone, or game console that is used by an individual.

The display device 110 may be, for example, a liquid crystal display or organic electroluminescent (EL) display. The display device 110 displays images of operating parts 111 with a graphic user interface (GUI). The operating parts 111 are arranged in, for example, a matrix in plan view.

FIGS. 1 to 3 illustrate, as an example, 30 pieces of the operating parts 111 in 5 rows×6 columns. The 30 pieces of the operating parts 111 are indicated by (row, column) such as (1, 1) to (5, 6). Of the 30 pieces of the operating parts 111 arranged in a matrix, the 5 rows are elongated in the X direction, parallel to the Y direction; the 6 columns are elongated in the Y direction, parallel with the X direction. Instead of having the display device 110, the electronic apparatus 100 may include operating parts displayed on the operating surface 105, for example, in a printed manner.

The electrostatic sensor 120 is overlaid on the display device 110. As illustrated in FIG. 4, the electrostatic sensor 120 includes 30 pieces of sensor electrodes 121 in total, in an arrangement of 6 pieces in the X direction by 5 pieces in the Y direction. The 30 pieces of the sensor electrodes 121 are individually coupled to the control device 130 with 30 lines of wires 122. FIG. 4 seems as if a single wire 122 exists, but in practice, the 30 pieces of the sensor electrodes 121 are individually coupled to the control device 130 by the 30 lines of wires 122. The electrostatic sensor 120 configured as described above may be formed by, for example, patterning the sensor electrodes 121 and the wires 122 at a transparent conductive film made of indium tin oxide (ITO) or other material on a surface of transparent glass. The capacitance of the electrostatic sensor 120 is inputted to the control device 130.

This description indicates, as an example, a configuration in which the 30 pieces of the operating parts 111 are superposed on the 30 pieces of the sensor electrodes 121. The relationships of rows and columns of the 30 pieces of the sensor electrodes 121 are the same as the operating parts 111. Specifically, the 30 pieces of the sensor electrodes 121 are arranged in a matrix with 5 rows and 6 columns; and in the same manner as the 30 pieces of the operating parts 111, the 30 pieces of the sensor electrodes 121 are indicated by (row, column) such as (1, 1) to (5, 6). The location of each of the 30 pieces of the sensor electrodes 121 is indicated by a row number and a column number.

In the following, the location of each sensor electrode 121 is represented by (i, j), in which row is represented by i, and column is represented by j. In this example, a row i is indicated by 1 to 5, and a column j is indicated by 1 to 6. For example, the sensor electrodes 121 in the row 1 are arranged along the front end in the +Y direction, and the sensor electrodes 121 in the row 5 are arranged along the front end in the −Y direction. The sensor electrodes 121 in the column 1 are arranged along the front end in the −X direction, and the sensor electrodes 121 in the column 6 are arranged along the front end in the +X direction.

A row next to the row i in the −Y direction is a row i+1, which is placed one row below the row i. A row next to the row i in the +Y direction is a row i−1, which is one row above the row i. The column number j of the farmost column in the −X direction is 1 (j=1). And, for example, the column number j of the farmost column in the +X direction is the largest column number. Here, the largest column number j is 6.

In the following, when the sensor electrodes 121 (i, j) are not particularly distinguished from each other, the sensor electrodes are simply referred to as the sensor electrodes 121. In the description, the sensor electrodes 121 and the operating parts 111 are in one-to-one correspondence, but a single operating part 111 may correspond to a plurality of sensor electrodes 121.

The control device 130 is implemented by a computer including, for example, a central processing unit (CPU), a random-access memory (RAM), a read-only memory (ROM), an input/output interface, and an internal bus.

The control device 130 includes a main control unit 131, an analog-to-digital (AD) conversion unit 132, a counter 133, a determination unit 134, an operation control unit 135, a display control unit 136, and a memory 137. The main control unit 131, the AD conversion unit 132, the counter 133, the determination unit 134, the operation control unit 135, and the display control unit 136 are illustrated as functional blocks that represent functions implemented by the control device 130 running a program. The memory 137 is illustrated as a function implemented by a memory of the control device 130.

The main control unit 131 is a processing unit for providing overall control on operations of the control device 130; the main control unit 131 performs operations except the operations performed by the AD conversion unit 132, the counter 133, the determination unit 134, the operation control unit 135, and the display control unit 136. For example, the main control unit 131 scans the 30 pieces of the sensor electrodes 121.

The AD conversion unit 132 converts an output of the electrostatic sensor 120 into a digital value. The output of the AD conversion unit 132 is a detected value of the capacitance between each sensor electrode 121 of the electrostatic sensor 120 and a surrounding conductor. The counter 133 counts a difference value between the output of the AD conversion unit 132 and a reference value and outputs the difference value. The difference value is a count value indicating the amount of change from the reference value to the output. In the following description, the difference value is indicated by ΔAD. The output of the AD conversion unit 132 indicates the capacitance between each sensor electrode 121 of the electrostatic sensor 120 and a surrounding conductor. The reference value indicates the capacitance between each sensor electrode 121 and a surrounding conductor when no finger exists in the vicinity of the sensor electrode 121. The difference value ΔAD indicates the capacitance between each sensor electrode 121 and a finger.

The difference value ΔAD is detected on each sensor electrode 121, and thus, 30 kinds of the difference value ΔAD are obtained from the output of the electrostatic sensor 120. The difference value obtained based on the capacitance of the sensor electrode 121(i, j) is referred to as a difference value ΔAD(i, j). The AD conversion unit 132 converts the capacitance of the sensor electrode 121(i, j) into a digital value, and the counter 133 counts the amount of change from the reference value to the output of the AD conversion unit 132 and outputs the difference value ΔAD(i, j) of each of the 30 pieces of the sensor electrodes 121(i, j). When the difference values ΔAD(i, j) are not particularly distinguished from each other, the difference values are simply referred to as the difference values ΔAD.

In accordance with the difference values ΔAD outputted by the counter 133, the determination unit 134 identifies the location of the fingertip FT, the location of the palm P, and the location at which the fingertip FT and the palm P are not present. In the electronic apparatus 100 and the contactless input device 100A, the determination unit 134 identifies the location of the top of the fingertip FT as the location of an operational input by the user. The method of determination performed by the determination unit 134 will be described later with reference to a flowchart.

The operation control unit 135 controls an operation of the electronic apparatus 100 in accordance with the location of an operational input determined by the determination unit 134. The display control unit 136 controls a display operation of the display device 110 in accordance with the location of an operational input determined by the determination unit 134. The memory 137 stores, for example, programs and data that are used by the main control unit 131, the determination unit 134, the operation control unit 135, and the display control unit 136 to perform operations. The memory 137 stores data representing the number of rows and the number of columns of the sensor electrodes 121.

Figure 5:
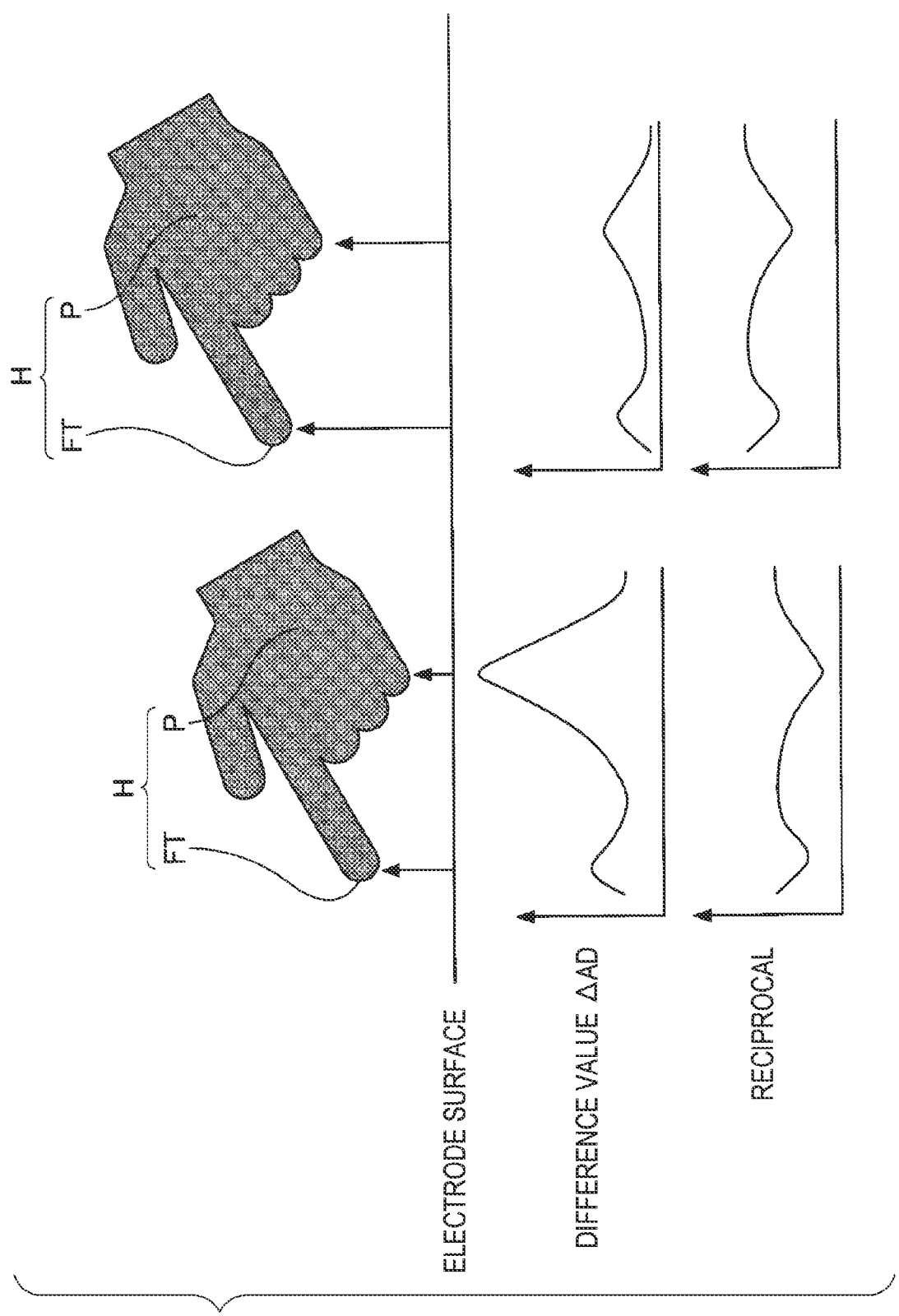
FIG. 5 illustrates an example of a distribution of a difference value $\Delta AD$ and a distribution of its reciprocal with respect to the relationships between a hand and electrode surfaces of an electrostatic sensor.

FIG. 5 illustrates an example of a distribution of the difference value ΔAD and a distribution of its reciprocal with respect to the relationships between the hand H and electrode surfaces of the electrostatic sensor 120. The electrode surfaces are surfaces of the 30 pieces of the sensor electrodes 121. The reciprocal is a multiplicative inverses of the difference value ΔAD.

The left side of FIG. 5 illustrates the case in which the fingertip FT and the palm P are close to the electrode surfaces, and the right side of FIG. 5 illustrates the case in which the fingertip FT and the palm P are slightly farther from the electrode surfaces than the case in the left side. Comparison between these cases indicates that the difference values ΔAD in the left-side case in which the fingertip FT and the palm P are close to the electrode surfaces are larger than the difference values ΔAD in the right-side case in which the fingertip FT and the palm P are slightly far from the electrode surfaces. This is because the difference value ΔAD indicates the amount of change in capacitance caused by a hand, detected by the electrostatic sensor 120, and ΔAD is inversely proportional to the distance between the electrode surfaces, and the fingertip FT or the palm P. Because ΔAD is inversely proportional to the distance, even when the hand H is in the same pose, different distances between the electrode surfaces, and the fingertip FT or the palm P draw different waveforms representing the distribution of the difference value ΔAD. In FIG. 5, both the left side and the right side illustrate a pose with the fingertip FT of the index finger pointing forward.

By contrast, as compared to the waveform representing the distribution of the difference value ΔAD, the waveform representing the distribution of reciprocal is less affected by the differences in the distance between the electrode surfaces, and the fingertip FT or the palm P, and relatively similar waveforms are drawn. This is because the reciprocal of the difference value ΔAD is a function of the distance between the electrode surfaces, and the fingertip FT or the palm P.

Figure 6:
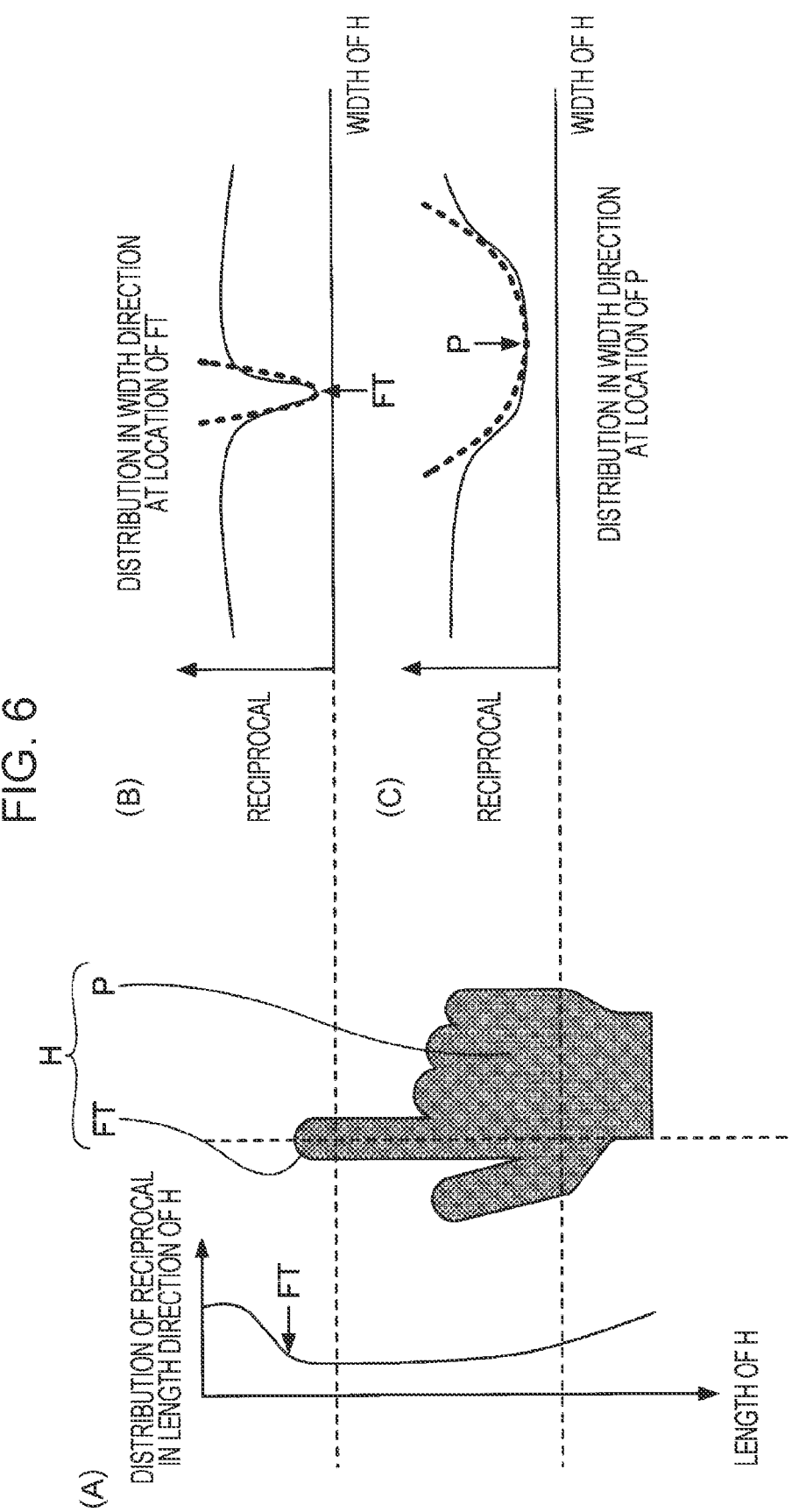
FIG. 6 illustrates an example of distributions of reciprocal in the length direction and the width direction of the hand.

FIG. 6 illustrates an example of distributions of reciprocal in the length direction and the width direction of the hand H.

The length direction of the hand H is the direction from the wrist to the palm P to the fingertip FT. The width direction of the hand H is the direction perpendicular to the length direction of the hand H in plan view, that is, the direction from the thumb to the little finger.

In FIG. 6, a distribution (A), which is presented at the left side with respect to the hand H, indicates a distribution of reciprocal in the length direction; a distribution (B), which is presented at the upper part of the right side with respect to the hand H, indicates a distribution of reciprocal in the width direction at the location of the fingertip FT; a distribution (C), which is presented at the lower part of the right side with respect to the hand H, indicates a distribution of reciprocal in the width direction at the location of the palm P.

Regarding the distribution (A) of reciprocal in the length direction of the hand H, the distribution gently curves in the section in which the hand H is present; by contrast, as indicated by an arrow FT, the reciprocal greatly changes at the boundary between the part including the fingertip FT and the part beyond the fingertip FT, that is, the part not including the hand H. As a result, by identifying the location at which the reciprocal greatly changes, the location of the fingertip FT in the length direction can be determined based on the distribution of reciprocal.

Regarding the distribution (B) of reciprocal in the width direction at the location of the fingertip FT, the reciprocal draws a V shape with a decrease in the section including the fingertip FT. As a result, by identifying the location at which the reciprocal draws a V shape, the location of the fingertip FT in the width direction can be determined based on the distribution of reciprocal. A quadratic curve can be fitted to the curve at which the reciprocal draws a V shape.

Regarding the distribution (C) of reciprocal in the width direction at the location of the palm P, the reciprocal is smaller in the section including the palm P than in both sides not including the palm P; the reciprocal is maintained at relatively small values throughout a section wider than the fingertip FT in the width direction. As a result, by identifying the location at which the reciprocal is maintained at relatively small values throughout a section wider than the fingertip FT in the width direction, the location of the palm P in the width direction can be determined. A quadratic curve or circle gentler than the fingertip FT can be fitted to the curve corresponding to the shape of the palm P. It can be assumed that the second-order coefficient greatly differs between the quadratic curve fitting the fingertip FT and the quadratic curve fitting the palm P.

Figure 7:
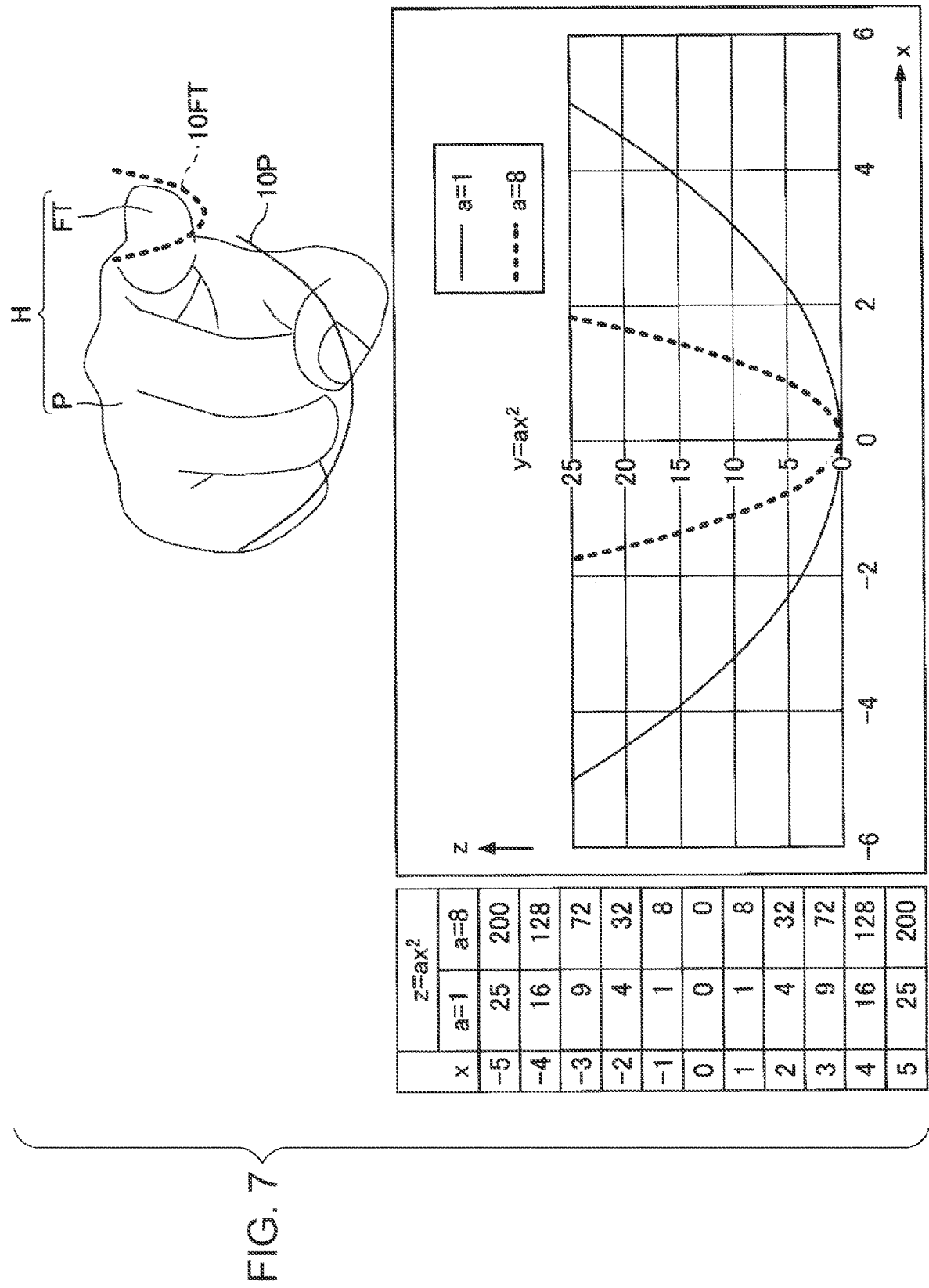
FIG. 7 illustrates an example of a second-order coefficient of a quadratic curve fitting a fingertip and a second-order coefficient of a quadratic curve fitting a palm.

FIG. 7 illustrates an example of a second-order coefficient of a quadratic curve fitting the fingertip FT and a second-order coefficient of a quadratic curve fitting the palm P. The upper part of FIG. 7 provides a front view of the hand H with the index finger pointing forward. A quadratic curve 10FT indicated by a dashed line fits the fingertip FT. A quadratic curve 101) indicated by a solid line fits the palm P.

As indicated in the lower half of FIG. 7, the quadratic curve 10FT is given by $z=a \times 2$, where the second-order coefficient a is 1 ($a=1$); the quadratic curve 10P is given by $z=a \times 2$, where the second-order coefficient a is 8 ($a=8$). By setting the second-order coefficient a to an appropriate value as described above, the quadratic curves 10FT and 10P respectively fitting the fingertip FT and the palm P can be obtained. The quadratic curves 10FT and 10P can be calculated by curve fitting.

Because the width of the fingertip FT and the width of the palm P are greatly different from each other, the second-order coefficient a of the quadratic curve fitted by curve fitting greatly differs between the fingertip FT and the palm P. For example, as indicated in FIG. 7, the second-order coefficient a of the quadratic curve fitting the fingertip FT is 8, whereas the second-order coefficient a of the quadratic curve fitting the palm P is 1. As a result, by calculating the distribution of reciprocal of the difference value $\Delta AD$ and then calculating the second-order coefficient a of a fitted quadratic curve by curve fitting, the fingertip FT and the palm P can be distinguished from each other. Identifying the location of the fingertip FT enables contactless operational input.

The greater the second-order coefficient a of the quadratic curve obtained by performing curve fitting on the distribution of reciprocal of the difference value $\Delta AD$ is, the sharper the V shape of the quadratic curve is. Here, the second-order coefficient a is calculated as the sharpness of a quadratic curve; based on the sharpness, the location of the fingertip FT is identified. The sharpness indicates the degree to which the V shape of a quadratic curve sharpens.

Figure 8:
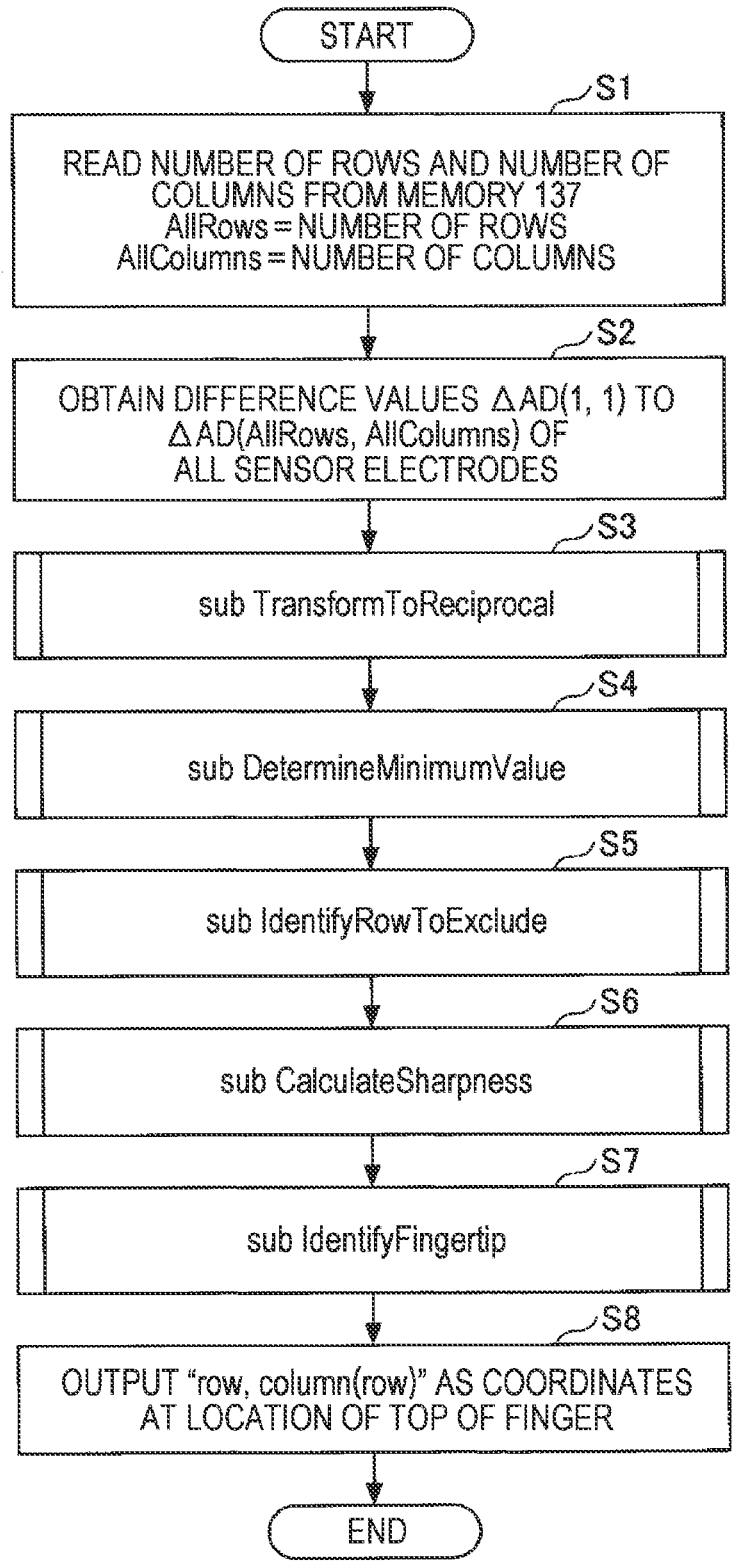
FIG. 8 is a flowchart illustrating a process of identifying the location of the fingertip.

The following describes how to identify the location of the fingertip FT with reference to flowcharts in FIGS. 8 to 13. FIGS. 8 to 13 are flowcharts illustrating a process of identifying the location of the fingertip FT. This process is performed by the determination unit 134. FIG. 8 illustrates a main flow, and FIGS. 9 to 13 respectively illustrate flows of subroutine operations in steps S3 to S7 in FIG. 8. The following description is based on an exemplary rule in which, as illustrated in FIG. 3, an operational input is performed with the hand H held over the electronic apparatus 100 above the operating surface 105 in an orientation from the edge extending in the X direction at the −Y direction side of the electronic apparatus 100 toward the +Y direction side.

When the process starts, the determination unit 134 reads the number of rows and the number of columns of the sensor electrodes 121 from the memory 137 (step S1). "AllRows" indicates the number of rows of the sensor electrodes 121, and "AllColumns" indicates the number of columns of the sensor electrodes 121. For example, AllRows indicates 5 rows, and AllColumns indicates 6 columns.

Next, the determination unit 134 obtains the difference values $\Delta AD(1, 1)$ to $\Delta AD(AllRows, AllColumns)$ of all the sensor electrodes 121 (step S2). As the result of performing the operation in step S2, for example, 30 values of the difference values $\Delta AD(1, 1)$ to $\Delta AD(AllRows, AllColumns)$ about the 30 pieces of the sensor electrodes 121 are obtained.

Next, the determination unit 134 calls a subroutine "sub TransformToReciprocal" and transforms all the difference values $\Delta AD(1, 1)$ to $\Delta AD(AllRows, AllColumns)$ into reciprocals (step S3).

Next, the determination unit 134 calls a subroutine "sub DetermineMinimumValue" and performs an operation of determining a minimum reciprocal value on the respective rows and identifying a column indicating the minimum reciprocal value (step S4).

Next, the determination unit 134 calls a subroutine "sub IdentifyRowToExclude" and performs an operation of identifying a row to be excluded (step S5). The row to be excluded is a row in which the hand H is not present. By identifying the row without the hand and excluding the row, the target is narrowed down to rows in which the hand is present.

Next, the determination unit 134 calls a subroutine "sub CalculateSharpness" and performs an operation of calculating the sharpness at the row with the hand (step S6).

Next, the determination unit 134 calls a subroutine "sub IdentifyFingertip" and performs an operation of identifying a row with the fingertip FT based on the sharpness calculated on the individual rows with the hand in step S6 (step S7).

Lastly, the determination unit 134 outputs coordinates indicating the location of the top of the fingertip FT based on the row with the fingertip identified in the step S7 (step S8). Here, "row" indicates a row number of the row with the fingertip FT; "column(i)" indicates a column number with a smallest reciprocal in a row i, and "column(row)" indicates a column number with a smallest reciprocal in a row "row".

Figure 9:
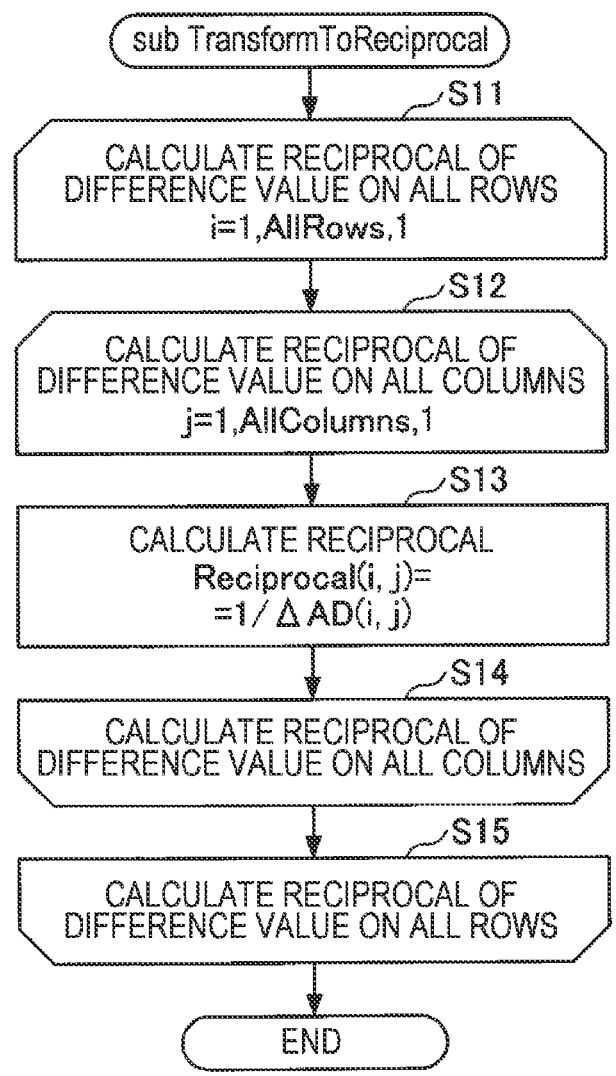
FIG. 9 is a flowchart illustrating the process of identifying the location of the fingertip.

The following describes a reciprocal transformation operation performed according to the subroutine "sub TransformToReciprocal" in step S3 in FIG. 8, with reference to FIG. 9.

While consecutively selecting the row i from i=1 to AllRows, the determination unit 134 performs loop processing for calculating a reciprocal of the difference value $\Delta AD(i, j)$ on all columns j in all rows i (steps S11 to S15). "i=1, AllRows, 1" means calculating a reciprocal while consecutively selecting one row from the row number i=1 to AllRows.

While consecutively selecting the column j from j=1 to AllColumns, the determination unit 134 performs loop processing for calculating a reciprocal of the difference value $\Delta AD(i, j)$ on all columns in relation to the selected row i (steps S12 to S14). "j=1, AllColumns, 1" means calculating a reciprocal from the column number j=1 to AllColumns one by one.

The determination unit 134 sequentially selects the column j and calculates a reciprocal "Reciprocal(i, j)" of the difference value $\Delta AD(i, j)$ in relation to the selected the row i (step S13). The determination unit 134 stores in the memory 137 the calculation result in step S13 as array data including elements of the row number i and the column number j. The reciprocal Reciprocal(i, j) of the difference value $\Delta AD(i, j)$ is given by Reciprocal(i, j)=1/$\Delta AD(i, j)$.

The determination unit 134 repeats the loop processing of steps S12 to S14 until a reciprocal of the difference value $\Delta AD(i, j)$ is calculated on all columns j in relation to the selected row i (step S14). By repeatedly performing the operations in steps S12 to S14 in relation to the selected row i, the determination unit 134 calculates a reciprocal of the difference value $\Delta AD(i, j)$ on all the columns j in the selected row i.

The determination unit 134 repeats loop processing of steps S11 to S15 until a reciprocal of the difference value $\Delta AD(i, j)$ is calculated on all the columns j in all the rows i. By repeatedly performing the operations in steps S11 to S15, while consecutively selecting a row from all the rows, the determination unit 134 calculate a reciprocal of the difference value $\Delta AD$ on all the columns in the row.

Figure 10:
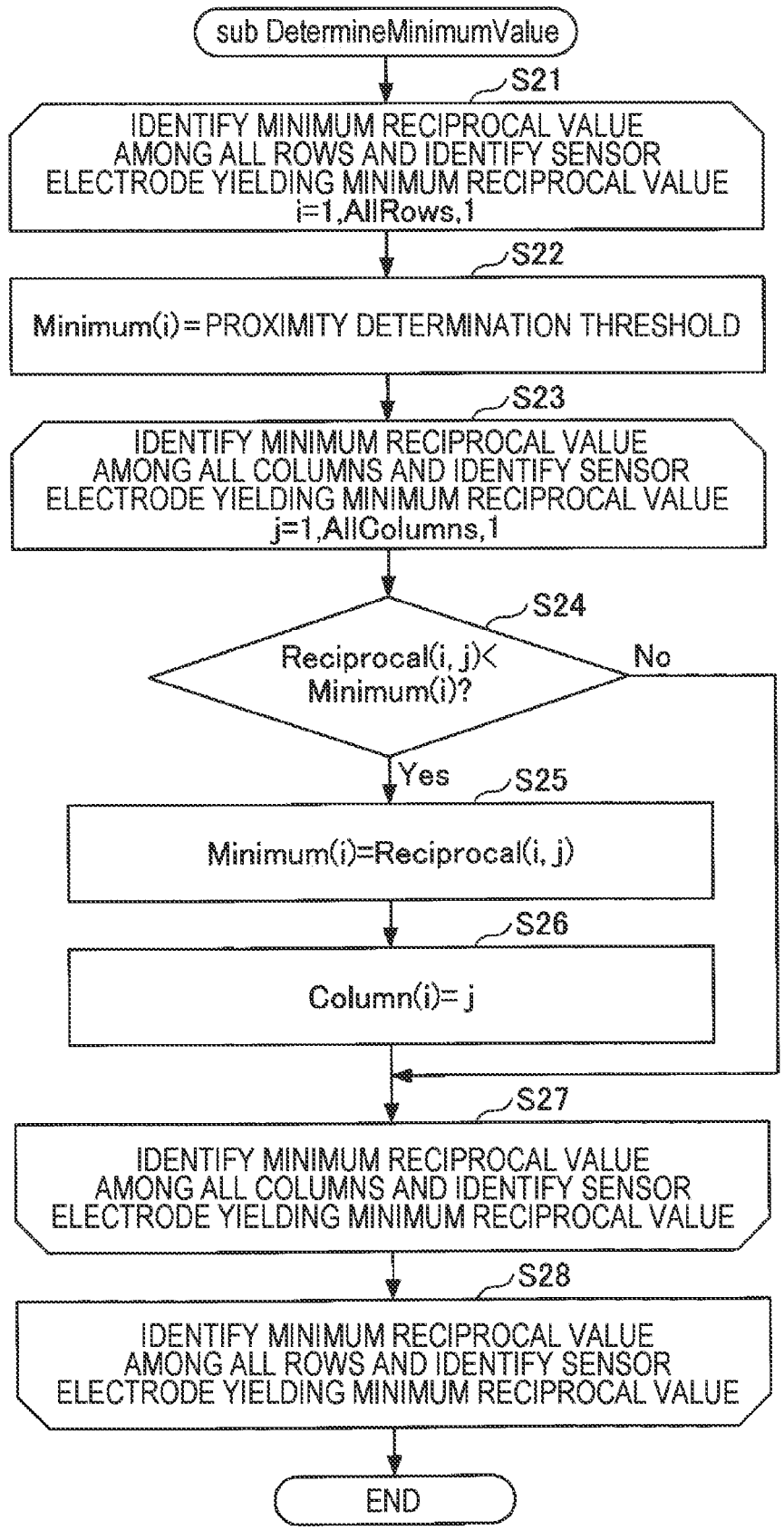
FIG. 10 is a flowchart illustrating the process of identifying the location of the fingertip.

The following describes an operation of determining a minimum reciprocal value among all rows, performed according to the subroutine "sub DetermineMinimumValue" in step S4 in FIG. 8, with reference to FIG. 10.

While consecutively selecting the row i from i=1 to AllRows, the determination unit 134 performs loop processing for identifying a minimum reciprocal value among all the columns j in all the rows i and further identifying the sensor electrode 121(i, j) yielding the minimum value (steps S21 to S28). "i=1, AllRows, 1" means identifying the sensor electrode 121(i, j) while consecutively selecting one row from the row number i=1 to AllRows.

The determination unit 134 sets an initial value of a minimum reciprocal value "Minimum(i)" in the selected row i at a proximity determination threshold (step S22). As the result of repeating the operations in steps S23 to S27, the minimum reciprocal value Minimum(i) in the selected row i indicates a minimum value of the reciprocals calculated on all the columns j in the selected row i. The proximity determination threshold is a threshold for determining whether the fingertip FT is close to the operating surface 105 to perform an operational input.

When the reciprocal Reciprocal(i, j) of the difference value $\Delta AD(i, j)$ of each of all the columns j in the row i is equal to or smaller than the proximity determination threshold, the proximity determination threshold is assigned to the minimum reciprocal value Minimum(i) in the row i. The row i to which the proximity determination threshold is assigned is designated as a row to be excluded as will be described later. The initial value of the minimum reciprocal value Minimum(i) can be set to a value equal to or greater than the proximity determination threshold. For example, due to the limitations of programming language, a largest value assignable to the minimum value Minimum(i) may be set as the initial value of the minimum reciprocal value Minimum(i). In this case, a minimum reciprocal value in the row i is assigned to Minimum(i) in every operation.

The determination unit 134 performs loop processing for identifying a minimum reciprocal value among all the columns j in the selected row i and further identifying the sensor electrode 121(i, j) yielding the minimum value (steps S23 to S27). "j=1, AllColumns, 1" means identifying a minimum value and the sensor electrode 121(i, j) from the column number j=1 to AllColumns one by one.

The determination unit 134 determines whether the reciprocal Reciprocal(i, j) is smaller than the minimum value Minimum(i) (step S24).

When determining that the reciprocal Reciprocal(i, j) is smaller than the minimum value Minimum(i) (Yes in step S24), the determination unit 134 assigns the reciprocal Reciprocal(i, j) to the minimum value Minimum(i) (step S25). The purpose of this operation is to update the minimum value Minimum(i) in the row i. The determination unit 134 stores in the memory 137 the minimum value Minimum (i) updated in step S25 as array data including an element of the row number i.

The determination unit 134 assigns j to a column "Column(i)" yielding the minimum value Minimum(i) in the row i (step S26). This means that Column(i)=j. Column(i) indicates a column number with a minimum reciprocal in the row i. For example, when the column 3 indicates a minimum reciprocal in the row 2, Reciprocal(2, 3)<Minimum(2) is satisfied, whereas Reciprocal(2, 4)<Minimum(2), Reciprocal(2, 5)<Minimum(2), and Reciprocal(2, 6)<Minimum(2) are not satisfied; therefore, Column(2)=3. The determination unit 134 stores the value obtained in step S26 in the memory 137.

The determination unit 134 performs the loop processing of steps S23 to S27 to identify a minimum reciprocal value and the sensor electrode 121(i, j) yielding the minimum value in relation to the selected row i.

The determination unit 134 repeats loop processing of steps S21 to S28 until a minimum reciprocal value and the sensor electrode 121(i, j) yielding the minimum value are identified on all rows. As a result, a minimum reciprocal value and the sensor electrode 121(i, j) yielding the minimum value are identified on all rows.

Figure 11A:
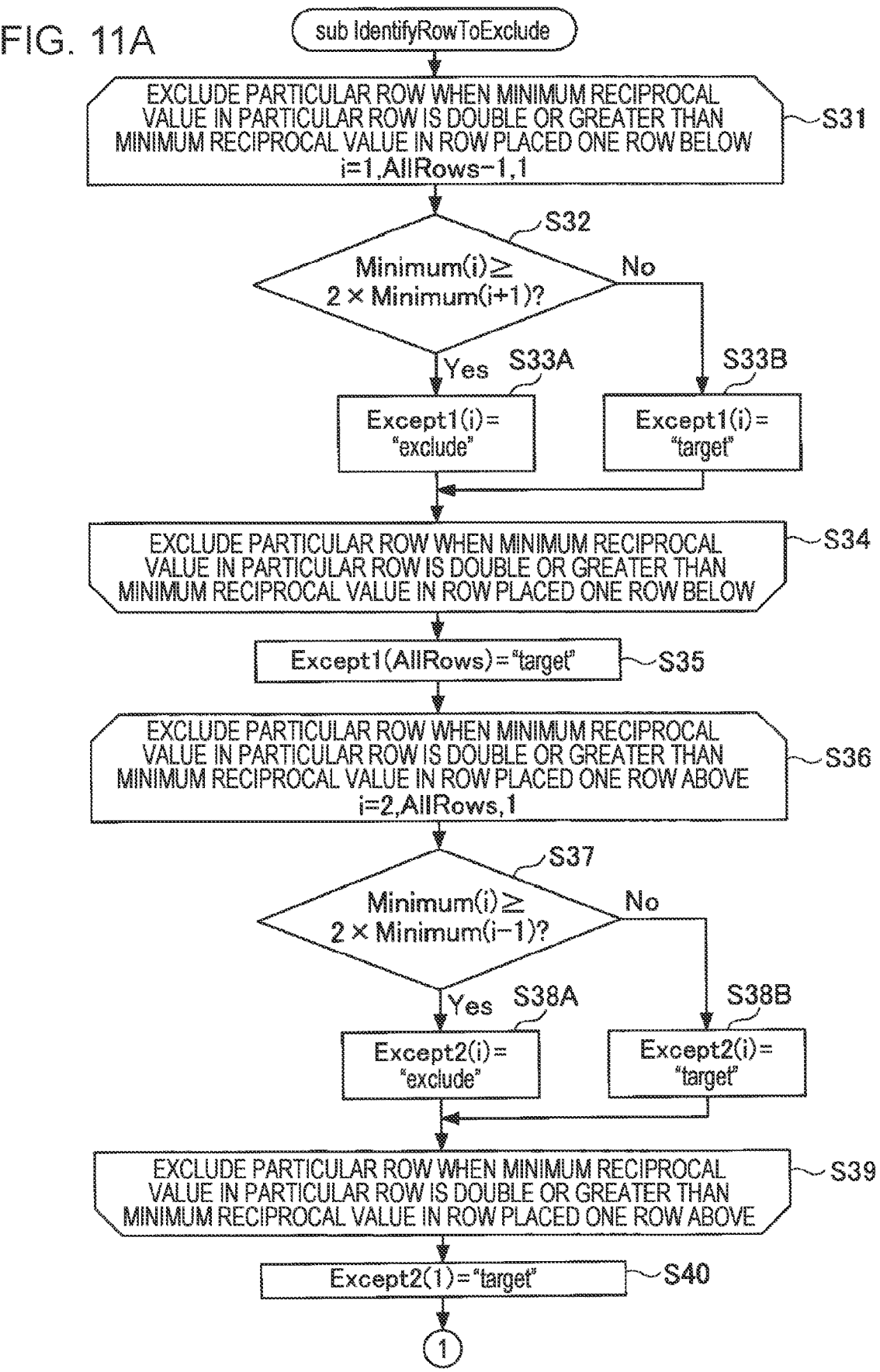
FIGS. 11A and 11B provide a flowchart illustrating the process of identifying the location of the fingertip.
Figure 11B:
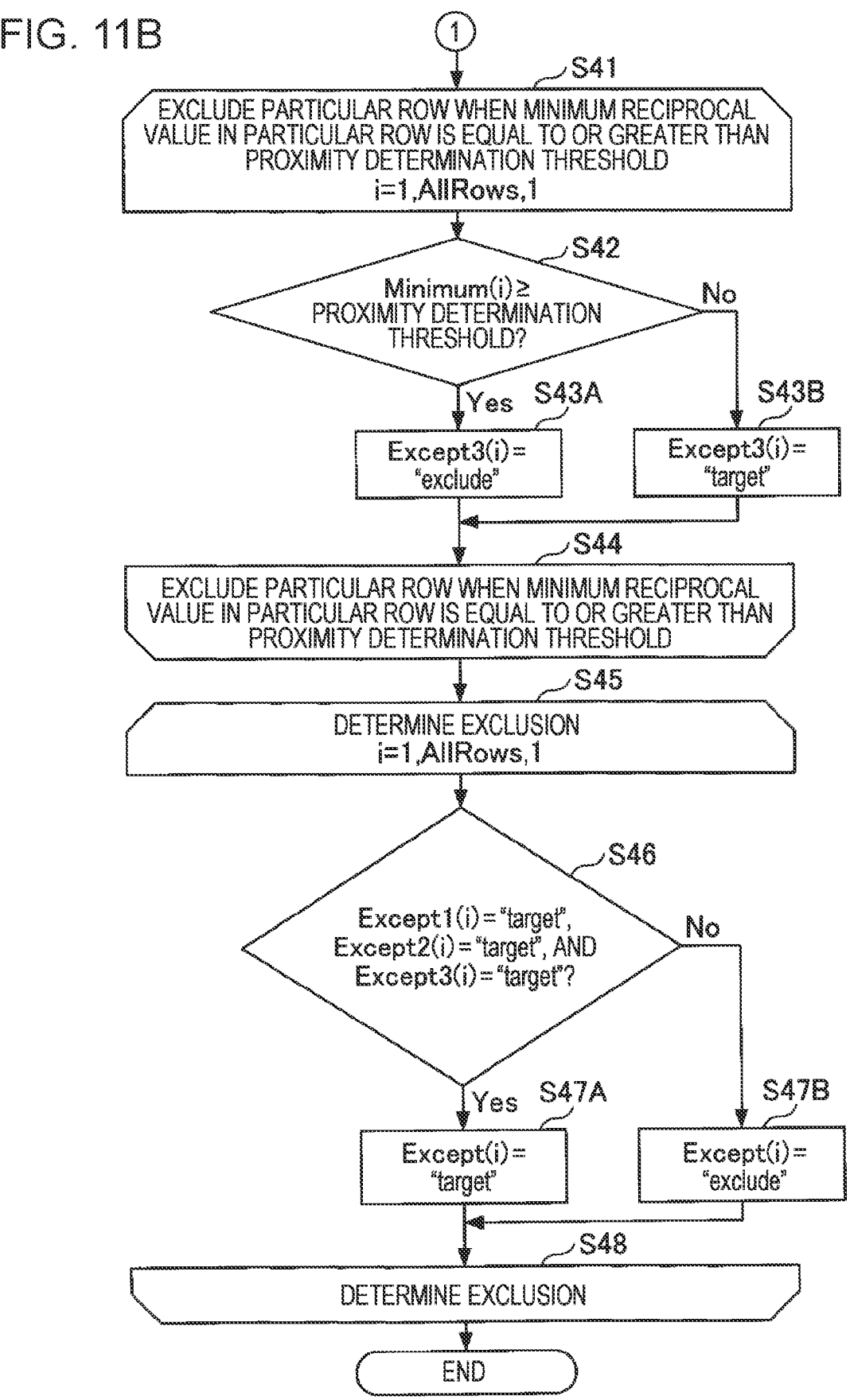

The following describes an operation of identifying a row to be excluded, performed according to the subroutine "sub IdentifyRowToExclude" in step S5 in FIG. 8, with reference to FIGS. 11A and 11B.

The determination unit 134 performs loop processing for excluding the row i when the minimum reciprocal value in the row i is double or greater than the minimum reciprocal value in the row i+1, which is placed one row below the row i, with respect to all the rows i from i=1 to AllRows−1 (steps S31 to S34).

The row i+1 placed one row below the row i is a row next to the row i in the −Y direction. "i=1, AllRows−1, 1" means identifying a row to be excluded while consecutively selecting one row from the row number i=1 to AllRows−1. Because there is no following row below the row AllRows, the processing is repeated until the processing is performed on the row number AllRows−1.

In the operation of identifying a row to be excluded, for the purpose of avoiding misrecognition of a space close to the fingertip FT as a finger, the row i is excluded when the minimum reciprocal value in the row i is double or greater than the minimum reciprocal value in the row i+1 placed one row below. In the case in which a finger exists near the sensor electrode 121(i, j), even when the finger does not face the sensor electrode 121(i, j), the capacitance increases. As a result, simply comparing the reciprocal of capacitance to the threshold may result in misrecognition of a space as a finger. When a finger exists near the sensor electrode 121 but does not face the sensor electrode 121, the capacitance of the sensor electrode 121(i, j) is greatly different from the capacitance of the adjacent sensor electrode 121(i+1, j). The minimum reciprocal value in a row under the top of the fingertip FT is relatively small; in contrast, the minimum reciprocal value in a row placed one row above the row under the top of the fingertip FT is relatively large because the top of the fingertip FT does not overlap the row. As such, the minimum reciprocal value greatly differs between a row under the top of the fingertip FT and one row above. Here, for example, the configuration is made such that the location at which the minimum reciprocal value is double or greater is deemed to be the location of a row placed one row above the top of the fingertip FT; when the minimum reciprocal value in the row i is double or greater than the minimum reciprocal value in the row i+1 placed one row below, the row i is excluded. In this case, the top of the fingertip FT overlaps the row i+1 but not the row i, the row i is excluded.

The determination unit 134 determines, with respect to the selected row i, whether the minimum reciprocal value Minimum(i) in the row i is double or greater than a minimum reciprocal value Minimum(i+1) in the row i+1 placed one row below (step S32).

When determining that the minimum value Minimum(i) is double or greater than the minimum value Minimum (i+1) (Yes in step S32), the determination unit 134 assigns "exclude" to Except1(i) (step S33A). The row i of Except1 (i) assigned "exclude" is not targeted for the calculation of sharpness described later. The determination unit 134 stores in the memory 137 Except1(i) as array data including an element of the row number i.

By contrast, when determining that the minimum value Minimum(i) is not double or greater than the minimum value Minimum (i+1) (No in step S32), the determination unit 134 assigns "target" to Except1(i) (step S33B). The row i of Except1(i) assigned "target" can be targeted for the calculation of sharpness described later. The determination unit 134 stores in the memory 137 Except1(i) as array data including an element of the row number i.

The determination unit 134 repeats the loop processing of steps S31 to S34 until all the rows i are subjected to the operations for storing the row i as a row to be excluded when the minimum reciprocal value in the row i is double or greater than the minimum reciprocal value in the row i+1 placed one row below.

Next, the determination unit 134 designates AllRows indicating the lowermost row as a target row (step S35). As a result, Except1(AllRows)="target". Because there is no row placed one row below the lowermost row AllRows, the configuration is made to designate AllRows as a target.

Next, the determination unit 134 performs loop processing for excluding the row i when the minimum reciprocal value in the row i is double or greater than the minimum reciprocal value in the row i−1, which is placed one row above the row i, with respect to all the rows i from i=2 to AllRows (steps S36 to S39).

The row i−1 placed one row above the row i is a row next to the row i in the +Y direction. "i=2, AllRows, 1" means identifying a row to be excluded while consecutively selecting one row from the row number i=2 to AllRows. The row number i=1 is excluded because there is no row placed one row above the uppermost row.

In the operation of identifying a row to be excluded, for the purpose of avoiding misrecognition of a space close to the fingertip FT as a finger, the row i is excluded when the minimum reciprocal value in the row i is double or greater than the minimum reciprocal value in the row i−1 placed one row above. The reason for excluding the row i when the minimum reciprocal value in the row i is double or greater than the minimum reciprocal value in the row i−1 is that, when the fingertip FT is present across the row i and the row i−1 placed one row above, the minimum reciprocal value in the row i cannot be double or greater than the minimum reciprocal value in the row i−1 placed one row above, and also for the purpose of matching the configuration with the loop processing of steps S31 to S34.

The determination unit 134 determines, with respect to the selected row i, whether the minimum reciprocal value Minimum(i) in the row i is double or greater than a minimum reciprocal value Minimum(i−1) in the row i−1 placed one row above (step S37).

When determining that the minimum value Minimum(i) is double or greater than the minimum value Minimum (i−1) (Yes in step S37), the determination unit 134 assigns "exclude" to Except2(i) (step S38A). The row i of Except2 (i) assigned "exclude" is not targeted for the calculation of sharpness described later. The determination unit 134 stores in the memory 137 Except2(i) as array data including an element of the row number i.

By contrast, when determining that the minimum value Minimum(i) is not double or greater than the minimum value Minimum (i−1) (No in step S37), the determination unit 134 assigns "target" to Except2(i) (step S38B). The row i of Except2(i) assigned "target" can be targeted for the calculation of sharpness described later. The determination unit 134 stores in the memory 137 Except2(i) as array data including an element of the row number i.

The determination unit 134 repeats the loop processing of steps S36 to S39 until all the rows i are subjected to the operations for storing the row i as a row to be excluded when the minimum reciprocal value in the row i is double or greater than the minimum reciprocal value in the row i−1 placed one row above.

Next, the determination unit 134 designates i=1 indicating the uppermost row as a target row (step S40). As a result, Except2(1)="target". Because there is no row placed one row above the uppermost row, the configuration is made to designate i=1 as a target.

Next, the determination unit 134 performs loop processing for excluding the row i when the minimum reciprocal value in the row i is equal to or greater than the proximity determination threshold, with respect to all the rows i from i=1 to AllRows (steps S41 to S44).

"i=1, AllRows, 1" means identifying a row to be excluded while consecutively selecting one row from the row number i=1 to AllRows. The purpose of excluding the row i when the minimum reciprocal value in the row i is equal to or greater than the proximity determination threshold is to determine whether the fingertip FT is present in the row i.

The determination unit 134 determines, with respect to the selected row i, whether the minimum reciprocal value Minimum(i) in the row i is equal to or greater than the proximity determination threshold (step S42).

When determining that the minimum value Minimum(i) is equal to or greater than the proximity determination threshold (Yes in step S42), the determination unit 134 assigns "exclude" to Except3(i) (step S43A). When determining that the minimum value Minimum(i) is smaller than the proximity determination threshold, no conductor is present near the sensor electrode 121(i, j). The row i of Except3(i) assigned "exclude" is not targeted for the calculation of sharpness described later. The determination unit 134 stores in the memory 137 Except3(i) as array data including an element of the row number i. In this embodiment, when the minimum reciprocal value in the row i is equal to or greater than the proximity determination threshold, Minimum(i)=the proximity determination threshold is set. Thus, Except3(i) of the row i with a minimum reciprocal value equal to or greater than the proximity determination threshold is assigned "exclude".

By contrast, when determining that the minimum value Minimum(i) is not double or greater than the proximity determination threshold (No in step S42), the determination unit 134 assigns "target" to Except3(i) (step S43B). The row i of Except3(i) assigned "target" can be targeted for the calculation of sharpness described later. The determination unit 134 stores in the memory 137 Except3(i) as array data including an element of the row number i.

The determination unit 134 repeats the loop processing of steps S41 to S44 until all the rows i are subjected to the operations for excluding the row i when the minimum reciprocal value in the row i is equal to or greater than the proximity determination threshold.

Next, the determination unit 134 performs loop processing for determining a row to be excluded while consecutively selecting the row i from i=1 to AllRows (steps S45 to S48). "i=1, AllRows, 1" means consecutively selecting one row from the row number i=1 to AllRows to determine a row to be excluded.

The determination unit 134 determines whether Except1(i)="target", Except2(i)="target", and Except3(i)="target", with respect to the selected row i (step S46).

When determining Yes in step S46, the determination unit 134 assigns "target" to Except(i) (step S47A). The row i of Except(i) assigned "target" is targeted for the calculation of sharpness described later. The row i of Except(i) assigned "target" includes the sensor electrode 121(i, j) facing the hand. The determination unit 134 stores in the memory 137 Except(i) as array data including an element of the row number i. After completing the operation in step S47A, the determination unit 134 proceeds to step S48.

By contrast, when at least one of Except1(i), Except2(i), and Except3(i) is "exclude", the determination unit 134 determines No in step S46. When determining No in step S46, the determination unit 134 assigns "exclude" to Except(i) (step S47B). The row i of Except(i) assigned "exclude" is not targeted for the calculation of sharpness described later. The row i of Except(i) assigned "exclude" does not include the sensor electrode 121(i, j) facing the hand. This means that the sensor electrode 121(i, j) in the row i of Except(i) assigned "exclude" faces space. The determination unit 134 stores in the memory 137 Except(i) as array data including an element of the row number i.

The determination unit 134 repeats the loop processing of steps S45 to S48 until all the rows i are subjected to the operations for determining a row to be excluded. In the manner described above, the row i to be excluded is determined among all the rows i.

Figure 12:
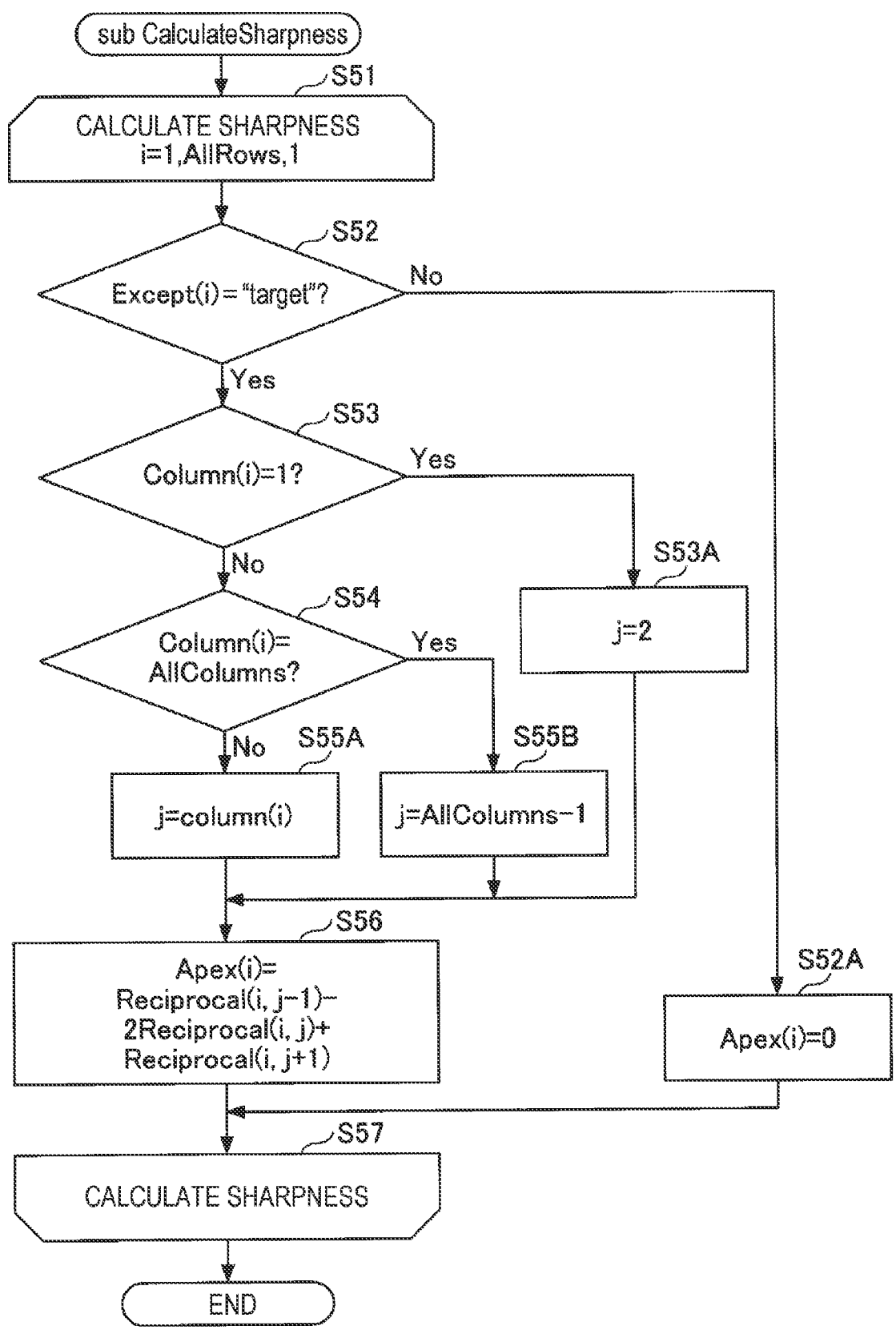
FIG. 12 is a flowchart illustrating the process of identifying the location of the fingertip.

The following describes an operation of calculating sharpness, performed according to the subroutine "sub CalculateSharpness" in step S6 in FIG. 8, with reference to FIG. 12. FIG. 12 is a flowchart illustrating an operation of calculating sharpness, performed according to the subroutine "sub CalculateSharpness".

The determination unit 134 performs loop processing for calculating sharpness while consecutively selecting the row i from i=1 to AllRows (steps S51 to S57). "i=1, AllRows, 1" means calculating sharpness while consecutively selecting one row from the row number i=1 to AllRows.

The determination unit 134 determines whether Except(i)="target" with respect to the selected row i (step S52). This is because when Except(i) is not target, sharpness is not calculated.

When determining that Except(i)="target" (Yes in S52), the determination unit 134 determines whether the column Column(i) yielding the minimum value Minimum(i) in the row i is the column 1 (step S53). This means it is determined whether Column(i)=1 in relation to the row i. The purpose of this operation is to determine whether the minimum value Minimum(i) in the row i is obtained in the column 1 (a column along the front end in the −X direction).

When determining that Column(i)=1 is not satisfied (No in S53), the determination unit 134 determines whether Column(i)=AllColumns (step S54). This means it is determined whether Column(i)=AllColumns in relation to the row i. The purpose of this operation is to determine whether the minimum value Minimum(i) in the row i is obtained in the column indicated by AllColumns along the front end in the +X direction.

When determining that Column(i)=AllColumns is not satisfied (No in S54), the determination unit 134 assigns Column(i) to j (step S55A). This means that when Column(i) is a column other than the end columns, Column(i) is assigned to j. Column(i) indicates a column yielding the minimum value Minimum(i) in the row i (refer to step S26).

The determination unit 134 calculates a sharpness Apex(i) (step S56). The sharpness Apex(i) is given by the following expression:

$$\text{Apex}(i)=\text{Reciprocal}(i,j-1)-2\text{Reciprocal}(i,j)+\text{Reciprocal}(i,j+1)$$

When determining that Except(i)="target" is not satisfied (No in S52), the determination unit 134 sets the sharpness Apex(i) to 0 (step S52A). This means that the sharpness Apex(i)=0. Because the row is not targeted for calculation of sharpness, the sharpness Apex(i) is set to 0. As will be described later, the sharpness Apex(i) is used to identify a row under a fingertip. By setting the sharpness Apex(i) of a row not targeted for calculation of sharpness to a particular numerical value (0), rows targeted for calculation of sharpness and rows not targeted for calculation of sharpness can be dealt with in accordance with the same procedure. As will be described later, in this embodiment, calculation of sharpness yields a positive value. As will be described later, a row with a greatest sharpness is identified as a row under a fingertip. As a result, setting the sharpness Apex(i) to 0 equals determining that the row i is not a row under a fingertip. After completing the operation in step S52A, the determination unit 134 proceeds to step S57.

When determining that Column(i)=1 (Yes in S53), the determination unit 134 sets j=2 (step S53A). The purpose of this operation is that, because the column Column(i) yielding the minimum value Minimum(i) in the row i is a column along the front end in the −X direction (the column 1), the column 2 is designated as the column j in the middle of three columns used to calculate sharpness; as a result, three values of reciprocal of the columns 1 to 3 are used to calculate sharpness. After completing the operation in step S53A, the determination unit 134 proceeds to step S56 and calculates sharpness.

When determining that Column(i)=AllColumns (Yes in S54), the determination unit 134 sets j=AllColumns−1 (step S55B). The purpose of this operation is that, because the column Column(i) yielding the minimum value Minimum(i) in the row i is a column along the front end in the +X direction (the column 6 indicated by AllColumns), AllColumns−1 (the column 5) is designated as the column j in the middle of three columns used to calculate sharpness; as a result, three values of reciprocal of the columns 4 to 6 are used to calculate sharpness. After completing the operation in step S55B, the determination unit 134 proceeds to step S56 and calculates sharpness.

The determination unit 134 repeats the loop processing of steps S51 to S57 until all the rows i are subjected to the operations for calculating sharpness.

Figure 13:
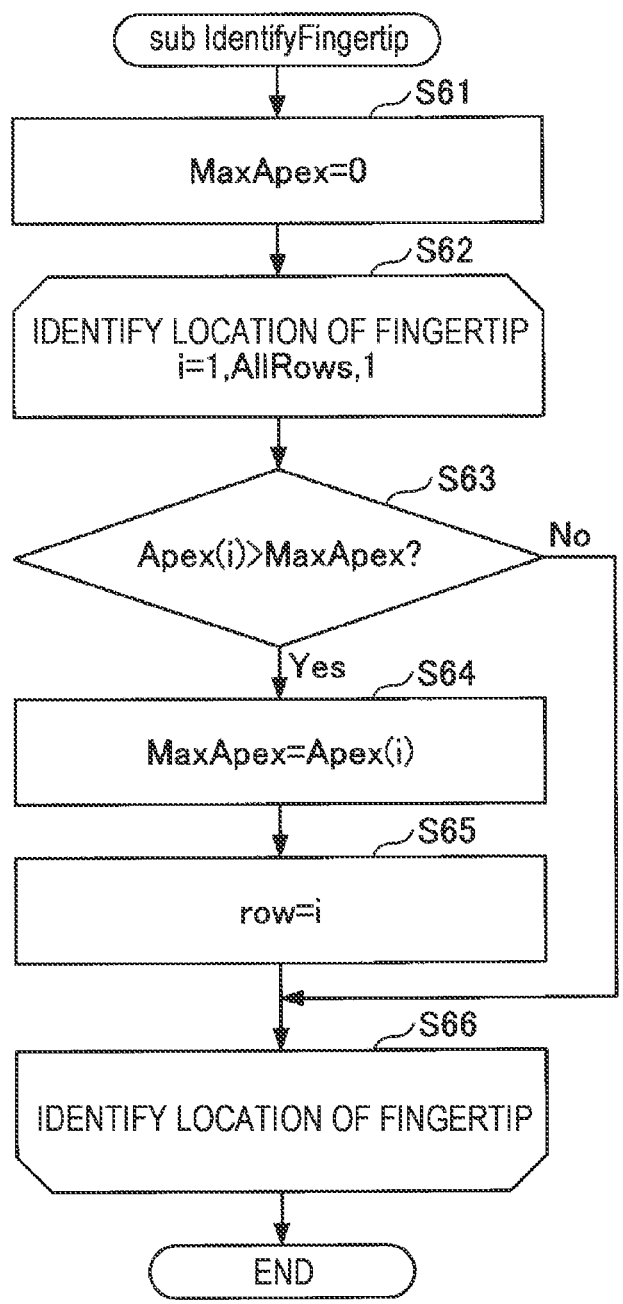
FIG. 13 is a flowchart illustrating the process of identifying the location of the fingertip.

The following describes an operation of identifying the location of the fingertip FT, performed according to the subroutine "sub IdentifyFingertip" in step S7 in FIG. 8, with reference to FIG. 13. The location of the column j yielding a maximum sharpness MaxApex that is a maximum value of sharpness, indicated by Column(i) in the row i, is identified as the location of the fingertip FT. Column(i) indicates a column yielding a smallest reciprocal of the reciprocals calculated on the individual rows (refer to step S26).

The determination unit 134 sets the initial value of the maximum sharpness MaxApex to 0 (step S61).

The determination unit 134 performs loop processing for identifying the location of the fingertip FT while consecutively selecting the row i from i=1 to AllRows (steps S62 to S66). "i=1, AllRows, 1" means identifying the location of the fingertip FT while consecutively selecting one row from the row number i=1 to AllRows.

The determination unit 134 determines whether the sharpness Apex(i) is greater than the maximum sharpness MaxApex with respect to the selected row i (step S63). By repeating the operation in step S63, the maximum sharpness MaxApex is updated, and consequently, the row i yielding the maximum sharpness MaxApex is identified.

When determining that the sharpness Apex(i) is greater than the maximum sharpness MaxApex (Yes in step S63), the determination unit 134 updates the maximum sharpness MaxApex to the sharpness Apex(i) (step S64).

The determination unit 134 assigns the row i of the sharpness Apex(i) indicating the maximum sharpness MaxApex to a variable "row" (step S65).

The determination unit 134 performs the loop processing of steps S61 to S66 on all the rows i, and as a result, a row number indicating the maximum sharpness is assigned to "row".

After the loop processing of steps S61 to S66 is completed, the operation in step S8 in the main loop in FIG. 8 described above is performed. As described above, the row number of the row under the top of the finger is assigned to "row". A column number yielding the minimum reciprocal in each row is assigned to "Column(i)". Thus, "row, column (row)" is outputted as coordinates at the top of the finger (step S8).

The following describes a specific example of the operations from calculating the difference value ΔAD to identifying the location of the fingertip FT with reference to FIGS. 14A to 14C, and 15A to 15D. FIGS. 14A, 14B, and 14C indicate a distribution of the difference value ΔAD, a distribution of reciprocal, and the columns j yielding the minimum reciprocal values Minimum(i), indicated by Column(i).

FIG. 14A illustrates a distribution of the difference value ΔAD calculated on the sensor electrodes 121 with 5 rows and 6 columns. It is assumed that an operational input is performed on the sensor electrode 121(2, 3) at the row 2 in the column 3 as illustrated in FIGS. 2 and 3.

FIG. 14B indicates values obtained by multiplying reciprocals of the difference values ΔAD indicated in FIG. 14A by 1000. FIG. 14C illustrates correspondence between the minimum value Minimum(i) of the values obtained by multiplying reciprocals of the difference values ΔAD by 1000 in individual rows and a column number Column(i) including an electrode yielding the minimum value Minimum(i). For the row 1, the proximity determination threshold, specifically 5, is assigned to a minimum value Minimum(1). Because the values obtained by multiplying reciprocals of the difference values ΔAD in the row 1 by 1000 all exceed the proximity determination threshold, which is 5, the proximity determination threshold (5), which is previously set as an initial value of the minimum value Minimum(1), is assigned as a minimum value. Because the column Column(i) indicating the minimum value in the row 1 cannot be specified, "-" is indicated in FIG. 14C. When the column Column(i) indicating a minimum value cannot be specified, a previous calculation result is maintained. Because the minimum value Minimum(1) is set to the proximity determination threshold (5), the row i is not targeted for calculation of sharpness. Any value of Column (i) has no effect on processing results when the row i is not targeted for calculation of sharpness. When the initial value of the minimum value Minimum(i) is set to a largest value assignable to the minimum value Minimum(i), an actual minimum value is assigned to the minimum value Minimum (i) in every operation. Also in this case, a row not targeted for calculation of sharpness is identified, and thus, the same operations are subsequently performed.

FIGS. 15A, 15B, 15C, and 15D indicate targets for calculation of sharpness, the minimum values Minimum(i), results of calculation of sharpness, and a largest sharpness and coordinates. FIG. 15A indicates whether the individual rows are targeted for calculation of sharpness as candidates for the location of the fingertip, determined based on the quantity of the minimum value Minimum(i) and results of comparison with the minimum values Minimum (i−1) and Minimum(i+1) of adjacent rows. Regarding the row 1, "equal to or smaller than proximity determination threshold" is not satisfied (FALSE), and thus, the row 1 is not targeted (FALSE is assigned to target).

FIG. 15B indicates values obtained by multiplying by 1000 reciprocals of the minimum value Minimum(i) in the individual rows and the difference values ΔAD on its left and right sides. Because the row 1 is not targeted for calculation of sharpness, "-" is indicated in FIG. 15B.

FIG. 15C indicates results of calculation of sharpness in the individual rows. Here, for example, second-order coefficient of quadratic function is used as sharpness. The row not targeted for calculation of sharpness (the row 1) is assigned 0.

FIG. 15D indicates a maximum sharpness and coordinates indicating the maximum sharpness. Here, for example, second-order coefficient of quadratic function is used as sharpness. The largest value in FIG. 15C is 0.73, and thus, the maximum second-order coefficient is 0.73. The maximum second-order coefficient (0.73) is indicated in the row 2 in FIG. 15C, and as a result, the row of maximum second-order coefficient is the row 2. A column Column(2) with a minimum value in the row 2 is, according to FIG. 14C, the column 3. Therefore, the location of the fingertip is at the row 2 in the column 3.

As described above, the location of the fingertip FT can be identified. Accordingly, it is possible to provide the contactless input device 100A that can accurately identify the location of the fingertip FT spaced apart from the sensor electrodes 121. This means that it is possible to provide the contactless input device 100A that can determine whether a contactless operation is performed and where the operation is performed.

Operation of Calculating Sharpness according to First Modification

Figure 16:
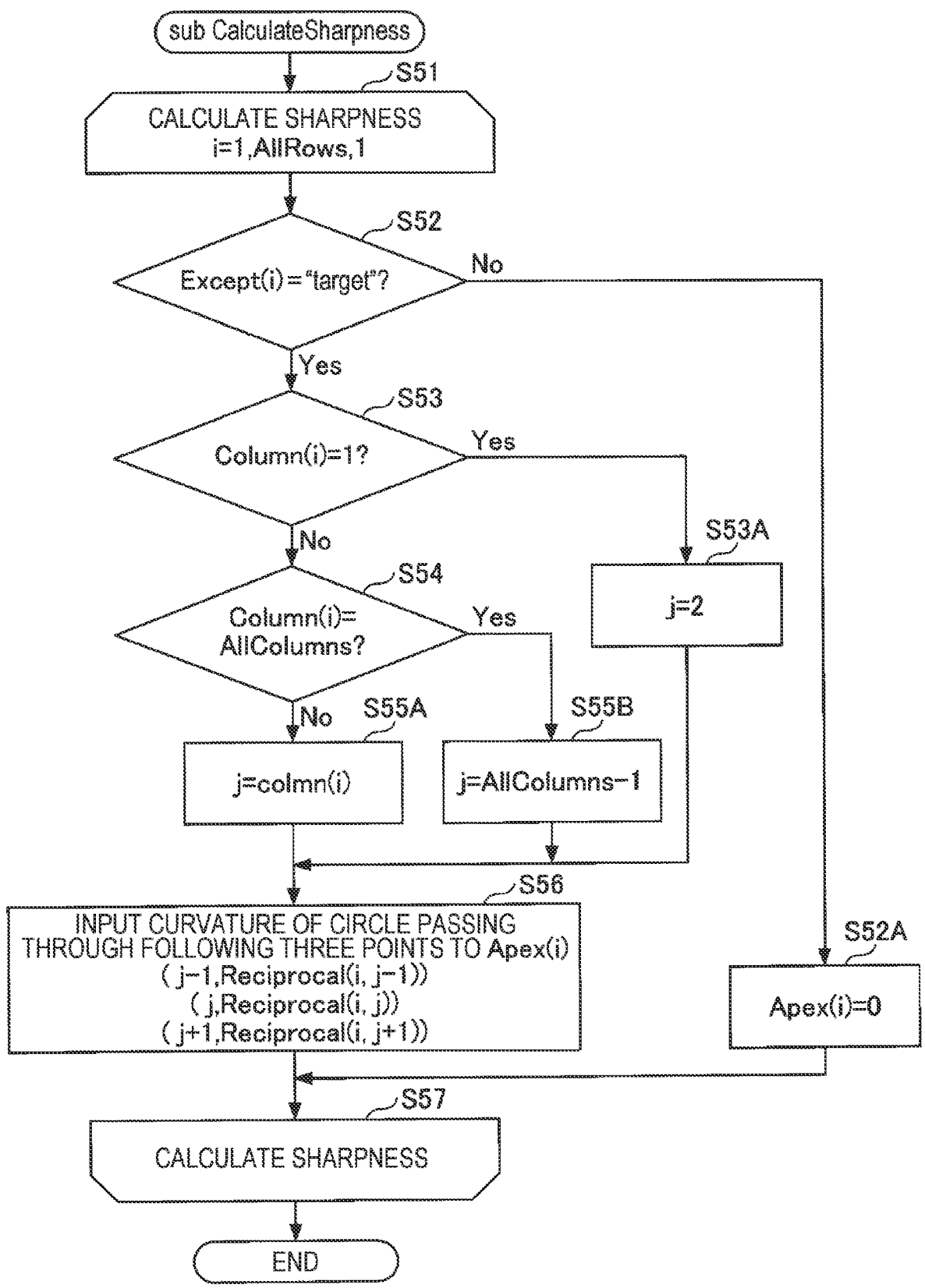
FIG. 16 is a flowchart illustrating an operation of calculating sharpness, performed according to a subroutine "sub CalculateSharpness" of a first modification.

FIG. 16 is a flowchart illustrating an operation of calculating sharpness, performed according to a subroutine "sub CalculateSharpness" of a first modification. In the operations illustrated in FIG. 16, the operation in step S56 is different from the operation in step S56 illustrated in FIG. 12. The following describes the difference to the operation illustrated in FIG. 12.

In the operation illustrated in the FIG. 16, the determination unit 134 calculates the curvature of a circle passing through the following three points as the sharpness Apex(i) (step S56). The three points are indicated by (j−1, Reciprocal (i, j−1)), (j, Reciprocal(i, j)), and (j+1,Reciprocal(i, j+1)).

Figure 17:
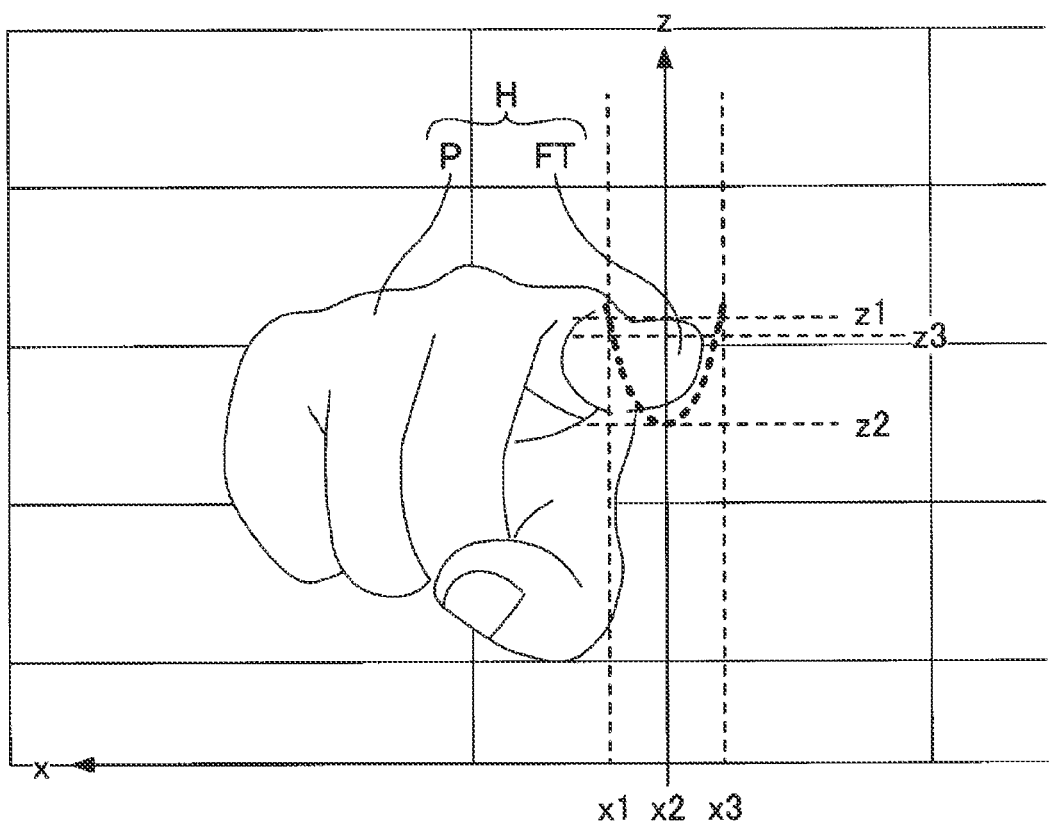
FIG. 17 illustrates the fingertip in relation to the xz coordinates.

Here, in the xy coordinates in which the x axis indicates the column j, and the z axis indicates the reciprocal "Reciprocal", j−1, j, j+1 are represented by x1, x2, x3, and Reciprocal(i, j−1), Reciprocal(i, j), Reciprocal(i, j+1) are represented by z1, z2, z3, which are illustrated in FIG. 17. FIG. 17 illustrates the fingertip FT in relation to the xz coordinates.

Coordinates (xp, zp) at the center of a circle passing through the three points are given by the following expressions (1) and (2).

$$x_p = \frac{(z_1 - z_2)(x_3^2 - x_1^2 + z_3^2 - z_1^2) - (z_1 - z_3)(x_2^2 - x_1^2 + z_2^2 - z_1^2)}{2(x_1 - x_2)(z_1 - z_3) - 2(x_1 - x_3)(z_1 - z_2)} \quad (1)$$

$$z_p = \frac{(x_1 - x_3)(x_2^2 - x_1^2 + z_2^2 - z_1^2) - (x_1 - x_2)(x_3^2 - x_1^2 + z_3^2 - z_1^2)}{2(x_1 - x_2)(z_1 - z_3) - 2(x_1 - x_3)(z_1 - z_2)} \quad (2)$$

With the coordinates (xp, zp) at the center of the circle passing through the three points, a radius r of the circle is given by the following expression (3).

$$r = \sqrt{(x_p - x_1)^2 + (z_p - z_1)^2} \quad (3)$$

The determination unit 134 calculates a curvature (a reciprocal of the radius: 1/r) as the sharpness Apex(i). This means that the sharpness Apex(i)=1/r.

Operation of Calculating Sharpness According to Second Modification

Figure 18:
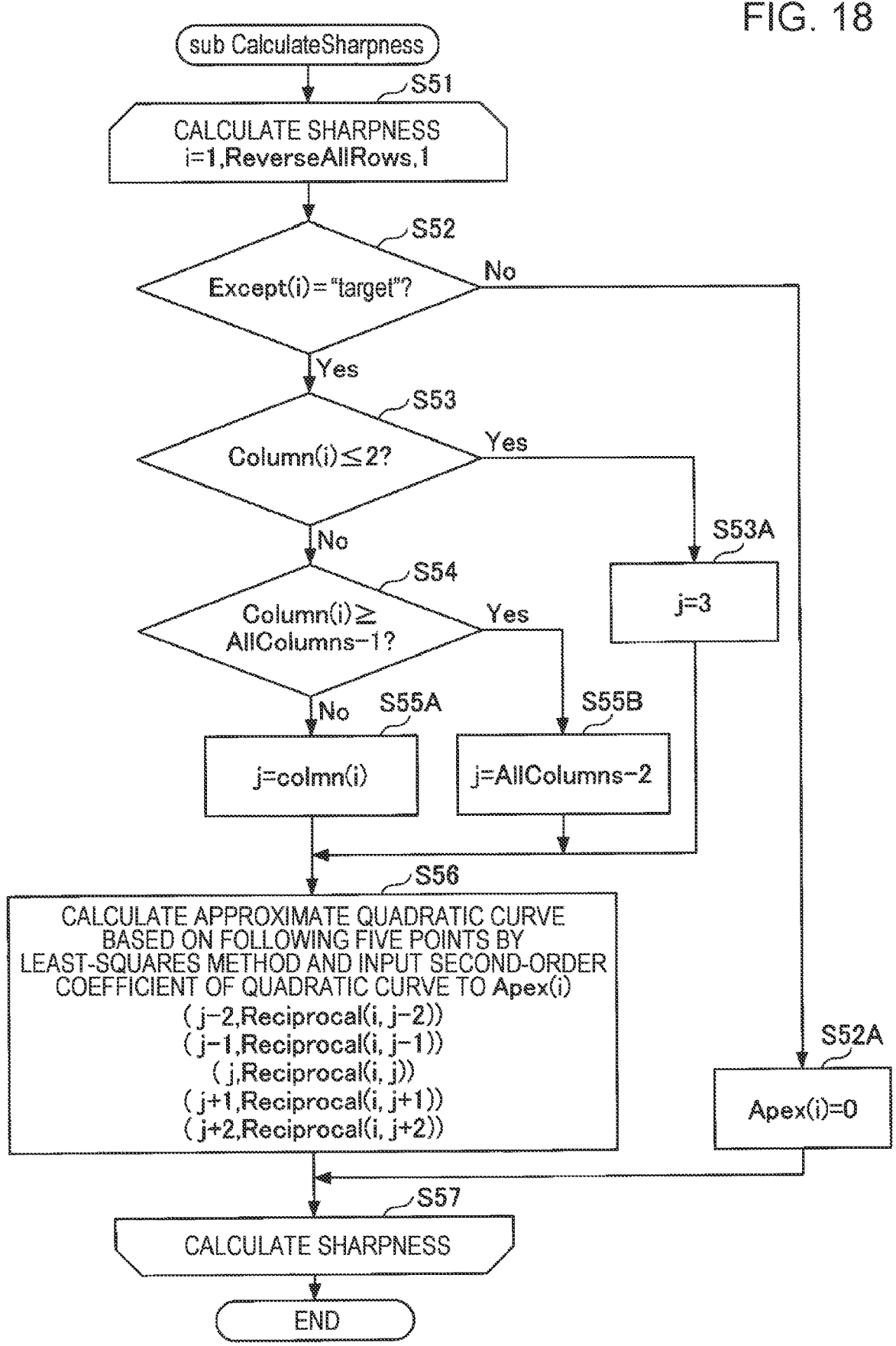
FIG. 18 is a flowchart illustrating an operation of calculating sharpness, performed according to a subroutine "sub CalculateSharpness" of a second modification.

FIG. 18 is a flowchart illustrating an operation of calculating sharpness, performed according to a subroutine "sub CalculateSharpness" of a second modification. In the operations illustrated in FIG. 18, the operation in step S56 is different from the operation in step S56 illustrated in FIG. 12. The following describes the difference to the operation illustrated in FIG. 12.

In the operation illustrated in FIG. 18, the determination unit 134 calculates a quadratic curve that approximates adjacent five points in the row i by curve fitting according to the least-squares method and further calculates a second-order coefficient of the curve as the sharpness Apex(i) (step S56).

The adjacent five points in the row i are indicated by (j−2, Reciprocal(i, j−2)), (j−1, Reciprocal(i, j−1)), (j, Reciprocal (i, j)), (j+1, Reciprocal(i, j+1)), and (j+2, Reciprocal(i, j+2)).

Operation of Calculating Sharpness According to Third Modification

Figure 19:
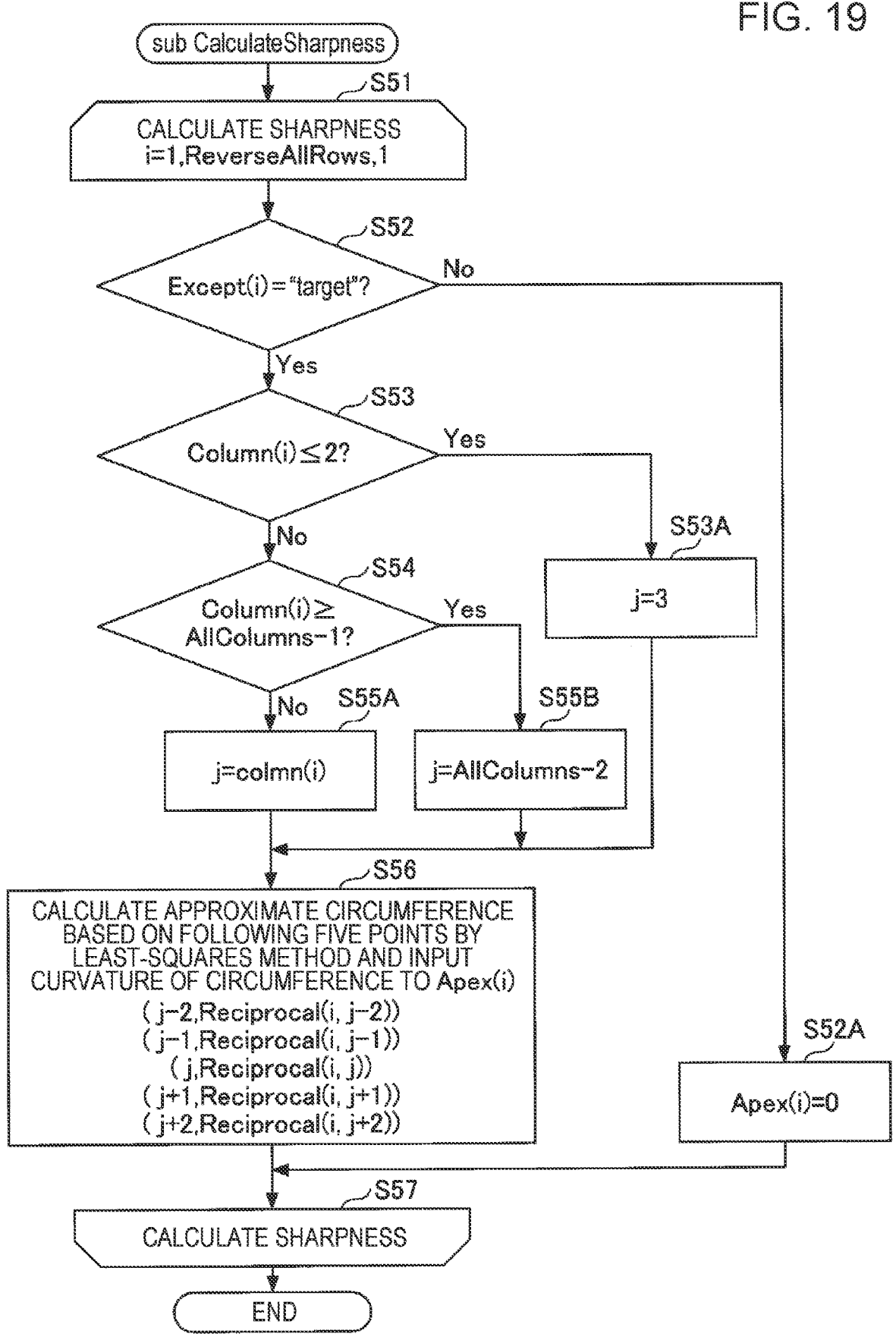
FIG. 19 is a flowchart illustrating an operation of calculating sharpness, performed according to a subroutine "sub CalculateSharpness" of a third modification.

FIG. 19 is a flowchart illustrating an operation of calculating sharpness, performed according to a subroutine "sub CalculateSharpness" of a third modification. In the operations illustrated in FIG. 19, the operation in step S56 is different from the operation in step S56 illustrated in FIG. 12. The following describes the difference to the operation illustrated in FIG. 12.

In the operation illustrated in FIG. 19, the determination unit 134 calculates a circumference that approximates adjacent five points in the row i by curve fitting with the least-squares method and further calculates a curvature of the curve as the sharpness Apex(i) (step S56).

The adjacent five points in the row i are indicated by (j−2, Reciprocal(i, j−2)), (j−1, Reciprocal(i, j−1)), (j, Reciprocal (i, j)), (j+1, Reciprocal(i, j+1)), and (j+2, Reciprocal(i, j+2)).

Operation of Identifying Fingertip According to Fourth Modification

Figure 20A:
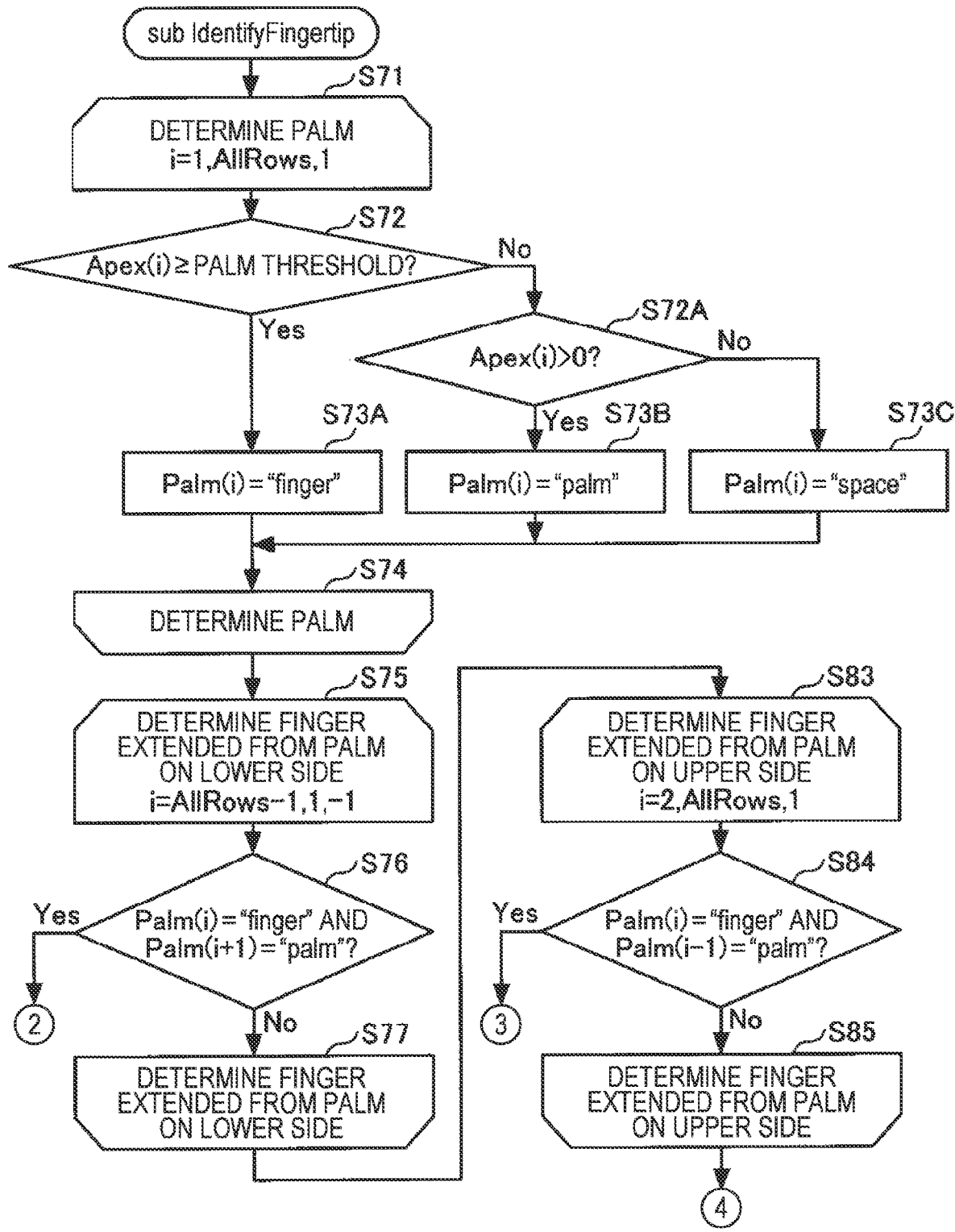

FIGS. 20A and 20B provide a flowchart illustrating an operation of identifying a fingertip, performed according to a subroutine "sub IdentifyFingertip" of a fourth modification. The flow illustrated in FIG. 13 can be replaced with the operation illustrated in FIGS. 20A and 20B.

The determination unit 134 performs loop processing for determining a finger, the palm P, or space while consecutively selecting the row i from i=1 to AllRows (steps S71 to S74). "i=1, AllRows, 1" means determining a finger, the palm P, or space while consecutively selecting one row from the row number i=1 to AllRows.

The determination unit 134 determines whether the sharpness Apex(i) calculated in step S6 is equal to or greater than a palm threshold (step S72). The palm threshold is a value determining whether the sharpness Apex(i) is based on a finger or the palm P and also a minimum value indicated when the sharpness Apex(i) is based on the fingertip FT.

When determining that the sharpness Apex(i) is equal to or greater than the palm threshold (Yes in step S72), the determination unit 134 determines that Palm(i) is a finger (step S73A).

When determining that the sharpness Apex(i) is not equal to or greater than the palm threshold (No in step S72), the determination unit 134 determines whether the sharpness Apex(i) is a positive value (step S72A). The purpose of this operation is to determine whether there is the palm P or there is space instead of the palm P.

When determining that the sharpness Apex(i) is a positive value (Yes in step S72A), the determination unit 134 determines that Palm(i) is a palm (step S73B).

By contrast, when determining that the sharpness Apex(i) is not a positive value (No in step S72A), the determination unit 134 determines that Palm(i) is space (step S73C). In step S52A in FIG. 12, when space is determined, 0 is inputted to Apex(i).

The determination unit 134 performs the loop processing of steps S71 to S74 on all the rows i, and as a result, a row number indicating the palm P is assigned to Palm(i).

The determination unit 134 performs loop processing for determining a finger extended from the palm P on the lower side while consecutively selecting the row i from i=AllRows−1 to the row 1 (steps S75 to S77). "i=AllRows−1, 1, −1" means determining a finger extended from the palm P on the lower side while consecutively selecting one row from the row number i=AllRows−1 to the row 1. The finger extended from the palm P on the lower side denotes the state in which the palm P is positioned on the front side in the −Y direction with a finger pointing in the +Y direction.

The determination unit 134 determines whether Palm(i) is a finger, and Palm(i+1) is the palm P (step S76). This operation determines whether a finger is present over the row i, and the palm P is present over the subsequent row i+1 in the −Y direction.

When determining that Palm(i) is a finger, and Palm(i+1) is the palm P (Yes in step S76), the determination unit 134 proceeds to step S78. By contrast, when there is no row i satisfying the condition that Palm(i) is a finger, and Palm (i+1) is the palm P, the determination unit 134 ends the loop processing "DETERMINE FINGER EXTENDED FROM PALM ON LOWER SIDE" (steps S75 to S77) and proceeds to step S83.

By performing the loop processing of steps S75 to S77 on all the rows i, the determination unit 134 determines whether the finger is a finger extended from the palm P on the lower side.

The determination unit 134 performs loop processing "DETERMINE FINGERTIP" for determining the row i under the fingertip FT while consecutively selecting the row i from i=AllRows−1 to the row 2 (steps S78 to S80). "i=AllRows−1, 2, −1" means determining a finger extended from the palm P on the lower side while consecutively selecting one row from the row number i=AllRows−1 to the row 2.

The determination unit 134 determines whether Palm(i) is a finger, and Palm(i−1) is space (step S79). This operation determines whether a finger is present over the row i, and space is present over the subsequent row i−1 in the +Y direction.

When determining that Palm(i) is a finger, and Palm(i−1) is space (Yes in step S79), the determination unit 134 proceeds to step S82. By contrast, when there is no row i satisfying the condition that Palm(i) is a finger, and Palm (i−1) is space, the determination unit 134 ends the loop processing "DETERMINE FINGERTIP" (steps S78 to S80) and proceeds to step S81.

The determination unit 134 assigns 1 to i (step S81). When the finger extended from the palm P reaches an end of the electrostatic sensor 120, the fingertip FT is deemed to be present over the end of the electrostatic sensor 120. This means that when there is no space on the front side in the +Y direction, the fingertip FT is deemed to be present over the row 1. After completing the operation in step S81, the determination unit 134 proceeds to step S82.

In step S82 after step S81, the determination unit 134 assigns the row i determined in step S81 to the variable "row" (step S82). This means that row=1; in other words, the fingertip FT is positioned over the row 1.

After completing the operation in step S82, the determination unit 134 ends the operation of identifying the location of the fingertip according to the subroutine "sub Identify-Fingertip" illustrated in FIGS. 20A and 20B (END) and performs the operation in step S8 of the main loop described above.

When determining that Palm(i) is a finger, and Palm(i−1) is space (Yes in step S79), the determination unit 134 proceeds to step S82. In this case, the determination unit 134 assigns the row i satisfying the condition that Palm(i) is a finger, and Palm(i−1) is space (Yes in step S79) to the variable "row" (step S82). The fingertip FT is positioned over the row i determined to satisfy the condition that Palm(i) is a finger, and Palm(i−1) is space (Yes in step S79).

After completing the operation in step S82, the determination unit 134 ends the operation of identifying the location of the fingertip according to the subroutine "sub Identify-Fingertip" illustrated in FIGS. 20A and 20B (END).

The determination unit 134 performs loop processing for determining a finger extended from the palm P on the upper side while consecutively selecting the row i from i=2 to AllRows (steps S83 to S85). "i=2, AllRows, 1" means determining a finger extended from the palm P on the upper side while consecutively selecting one row from the row number i=2 to AllRows. The finger extended from the palm P on the upper side denotes the state in which the palm P is positioned on the front side in the +Y direction with a finger pointing in the −Y direction.

The determination unit 134 determines whether Palm(i) is a finger, and Palm(i−1) is the palm P (step S84). This operation determines whether a finger is present over the row i, and the palm P is present over the subsequent row i−1 in the +Y direction.

When determining that Palm(i) is a finger, and Palm(i−1) is the palm P (Yes in step S84), the determination unit 134 proceeds to step S86. By contrast, when there is no row i satisfying the condition that Palm(i) is a finger, and Palm (i−1) is the palm P, the determination unit 134 ends the loop processing "DETERMINE FINGER EXTENDED FROM PALM ON UPPER SIDE" (steps S83 to S85) and proceeds to step S90. When the palm P is present outside the electrostatic sensor 120, the determination unit 134 proceeds to step S90.

By performing the loop processing of steps S83 to S85 on all the rows i, the determination unit 134 determines whether the finger is a finger extended from the palm P on the upper side.

The determination unit 134 performs loop processing "DETERMINE FINGERTIP" for determining the row i under the fingertip FT while consecutively selecting the row i from i=2 to AllRows (steps S86 to S89). "i=2, AllRows, 1" means determining a finger extended from the palm P on the lower side while consecutively selecting one row from the row number i=2 to AllRows.

The determination unit 134 determines whether Palm(i) is a finger, and Palm(i+1) is space (step S87). This operation determines whether a finger is present over the row i, and space is present over the subsequent row i+1 in the −Y direction.

When determining that Palm(i) is a finger, and Palm(i+1) is space (Yes in step S87), the determination unit 134 proceeds to step S82. In this case, the determination unit 134 assigns the row i satisfying the condition that Palm(i) is a finger, and Palm(i+1) is space (Yes in step S87) to the variable "row" (step S82). The fingertip FT is positioned over the row i determined to satisfy the condition that Palm(i) is a finger, and Palm(i+1) is space (Yes in step S87).

By contrast, when there is no row i satisfying the condition that Palm(i) is a finger, and Palm(i+1) is space, the determination unit 134 ends the loop processing "DETERMINE FINGERTIP" and proceeds to step S89.

The determination unit 134 assigns Allrows to i (step S89). When the finger extended from the palm P reaches an end of the electrostatic sensor 120, the fingertip FT is deemed to be present over the end of the electrostatic sensor 120. This means that when there is no space on the front side in the −Y direction, the fingertip FT is deemed to be present over the row Allrows along an end of the electrostatic sensor 120.

When the palm P is outside the electrostatic sensor 120, the determination unit 134 sets the initial value of the maximum sharpness MaxApex to 0 (step S90).

The determination unit 134 performs loop processing "IDENTIFY location OF FINGERTIP" while consecutively selecting the row i from i=1 to AllRows (steps S91 to S95). "i=1, AllRows, 1" means identifying the location of the fingertip FT while consecutively selecting one row from the row number i=1 to AllRows.

The determination unit 134 determines whether the sharpness Apex(i) is greater than the maximum sharpness MaxApex with respect to the selected row i (step S92). By repeating the operations in steps S91 to S95, the maximum sharpness MaxApex is updated, and consequently, the row i yielding the maximum sharpness MaxApex is identified.

When determining that the sharpness Apex(i) is greater than the maximum sharpness MaxApex (Yes in step S92), the determination unit 134 updates the maximum sharpness MaxApex to the sharpness Apex(i) (step S93).

The determination unit 134 assigns the row i of the sharpness Apex(i) indicating the maximum sharpness MaxApex to a variable "row" (step S94).

The determination unit 134 performs the loop processing of steps S91 to S95 on all the rows i, and as a result, a row number indicating the maximum sharpness is assigned to "row" (step S95).

After completing the loop processing of steps S91 to S95, the determination unit 134 performs the operation in step S8 in the main loop in FIG. 8 described above.

Figure 21:
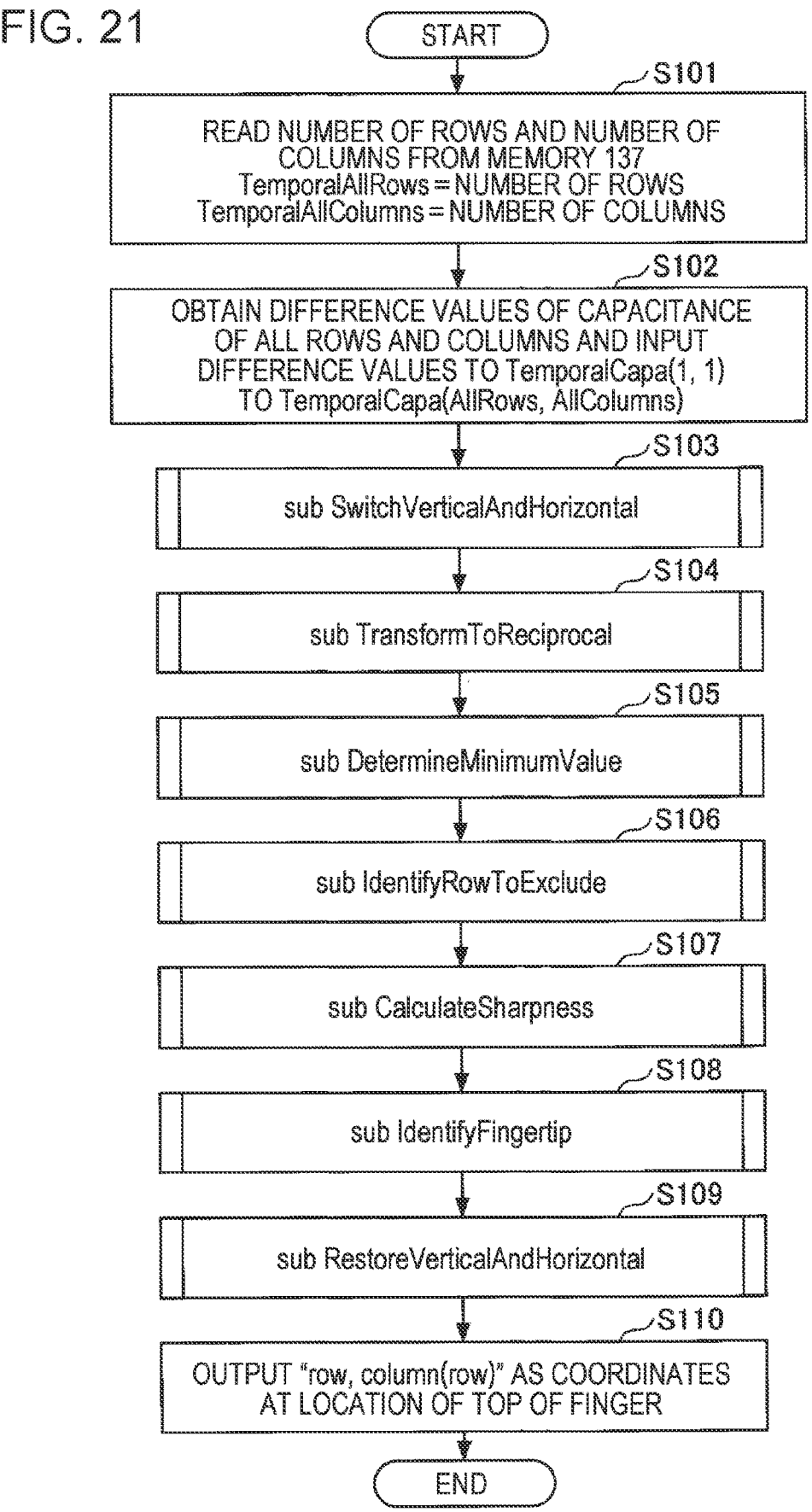
FIG. 21 is a flowchart illustrating a process of identifying the location of the fingertip according to a fifth modification.
Figure 22:
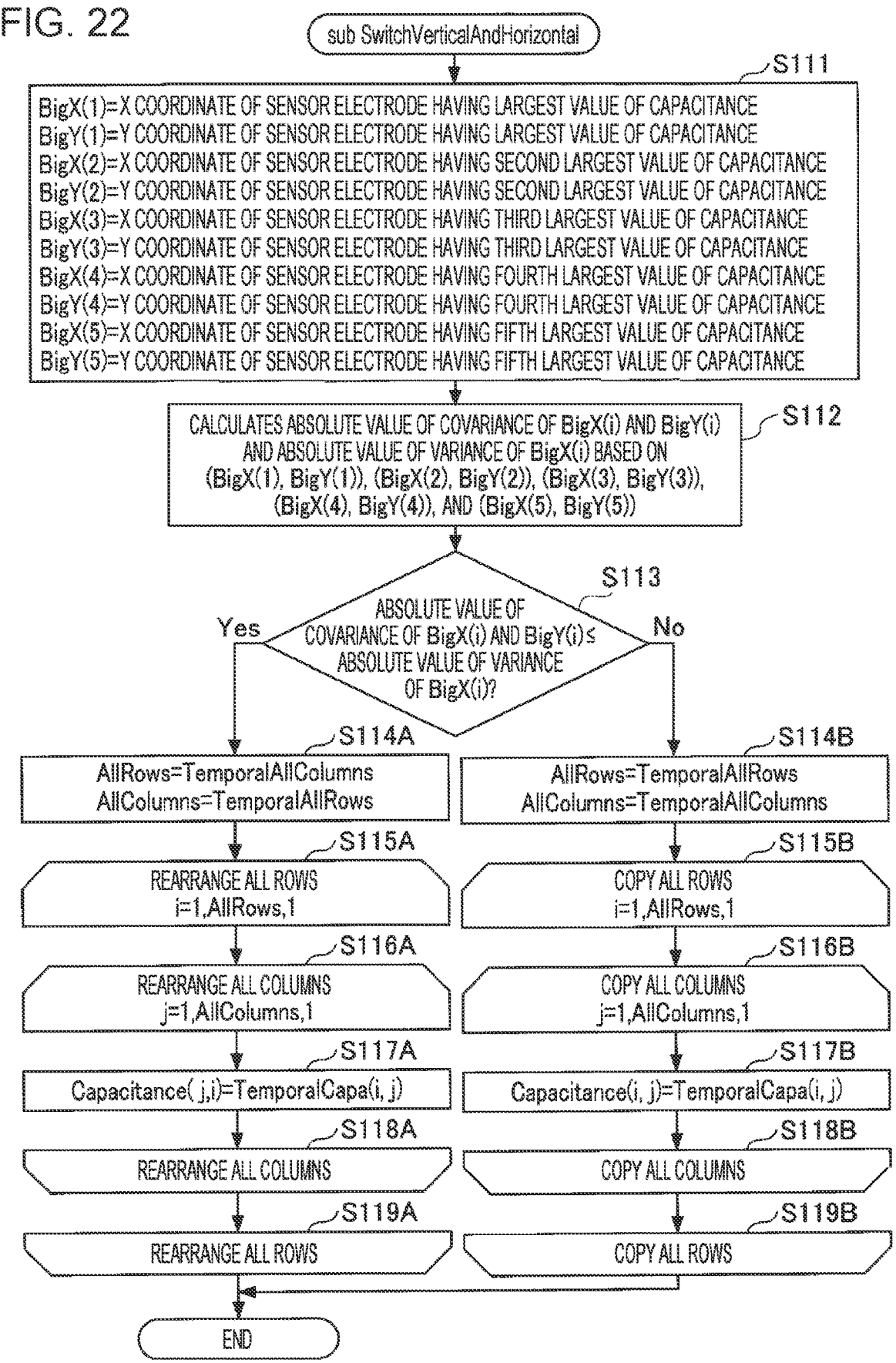
FIG. 22 is a flowchart illustrating the process of identifying the location of the fingertip according to the fifth modification.
Figure 23:
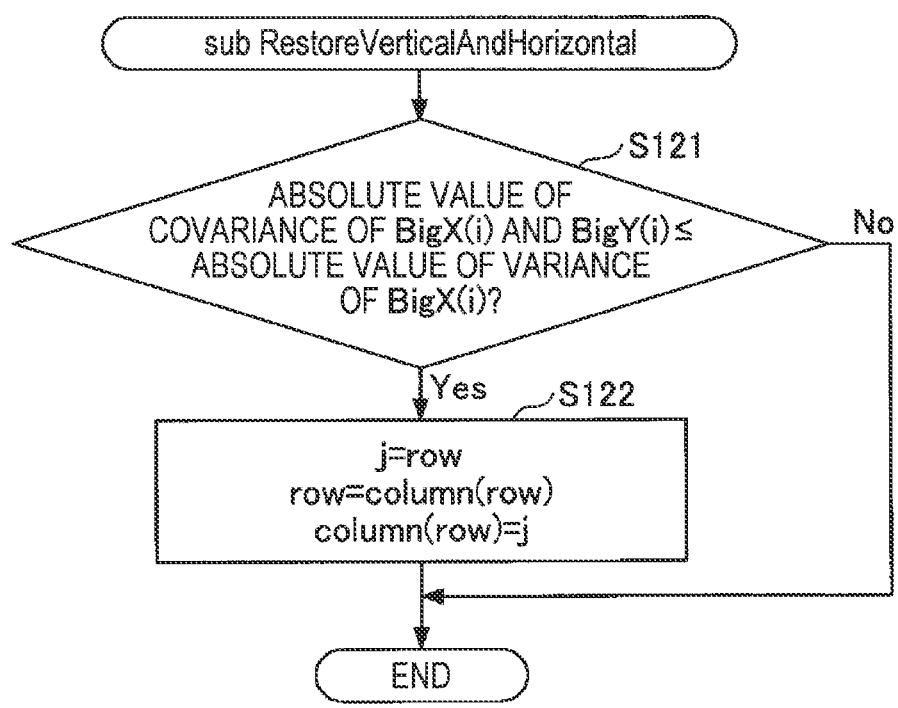
FIG. 23 is a flowchart illustrating the process of identifying the location of the fingertip according to the fifth modification.

Operation of Identifying Location of Fingertip FT According to Fifth Modification The following describes how to identify the location of the fingertip FT according to a fifth modification with reference to flowcharts in FIGS. 21 to 23. FIGS. 21 to 23 are flowcharts illustrating a process of identifying the location of the fingertip FT according to the fifth modification. This process is performed by the determination unit 134. FIG. 21 illustrates a main flow, and FIGS. 22 and 23 respectively illustrate flows of subroutine operations in steps S103 and S109 in FIG. 21. The subroutine operations "sub TransformToReciprocal", "sub DetermineMinimumValue", "sub IdentifyRowToExclude", "sub CalculateSharpness", and "sub IdentifyFingertip" in FIGS. 9 to 13 are used as the subroutine operations in steps S104 to S108 in FIG. 21, and descriptions thereof are not repeated. The following description is based on the condition that, for example, an operational input can be performed with the hand H held over the electronic apparatus 100 above the operating surface 105 in an orientation from the front side in any of the −Y direction, the +Y direction, the −X direction, and the +X direction of the electronic apparatus 100 in FIG. 3.

When the process starts, the determination unit 134 reads the number of rows and the number of columns of the sensor electrodes 121 from the memory 137 (step S101). "TemporalAllRows" indicates the number of rows of the sensor electrodes 121, and "TemporalAllColumns" indicates the number of columns of the sensor electrodes 121. For example, TemporalAllRows indicates 5 rows, and TemporalAllColumns indicates 6 columns.

Next, the determination unit 134 obtains the difference values ΔAD(1, 1) to ΔAD(AllRows, AllColumns) of all the sensor electrodes 121 and inputs the difference values to TemporalCapa(1, 1) to TemporalCapa(AllRows, AllColumns) (step S102). As the result of performing the operation in step S102, for example, 30 values of the difference values TemporalCapa(1, 1) to TemporalCapa(AllRows, AllColumns) about the 30 pieces of the sensor electrodes 121 are obtained.

Next, the determination unit 134 calls a subroutine "sub SwitchVerticalAndHorizontal"; when it is necessary to switch the vertical and the horizontal, the determination unit 134 transposes the row i and the column j and inputs TemporalCapa(i, j) to Capacitance(j, i). When it is unnecessary to switch the vertical and the horizontal, the determination unit 134 inputs TemporalCapa(i, j) to Capacitance (step S103).

Next, the determination unit 134 calls the subroutine "sub TransformToReciprocal" and transforms all the difference values ΔAD(1, 1) to ΔAD(AllRows, AllColumns) into reciprocals (step S104).

Next, the determination unit 134 calls the subroutine "sub DetermineMinimumValue" and performs the operation of determining a minimum reciprocal value on the respective rows and identifying a column indicating the minimum reciprocal value (step S105).

Next, the determination unit 134 calls the subroutine "sub IdentifyRowToExclude" and performs the operation of identifying a row to be excluded (step S106). The row to be excluded is a row in which the hand H is not present. By identifying the row without the hand and excluding the row, the target is narrowed down to rows in which the hand is present.

Next, the determination unit 134 calls the subroutine "sub CalculateSharpness" and performs the operation of calculating the sharpness at the row with the hand (step S107).

Next, the determination unit 134 calls a subroutine "sub IdentifyFingertip" and performs an operation of identifying a row with the fingertip FT based on the sharpness calculated on the individual rows with the hand in step S107 (step S108).

Next, the determination unit 134 calls a subroutine "sub RestoreVerticalAndHorizontal" and performs an operation of restoring the vertical and the horizontal (step S109).

Lastly, the determination unit 134 outputs coordinates indicating the location of the top of the fingertip FT (step S110). Here, "row" indicates a row number of the row with the fingertip FT. "column(i)" indicates a column number with a smallest reciprocal in a row i, and thus, "column (row)" indicates a column number with a smallest reciprocal in a row "row".

The following describes an operation of switching the vertical and the horizontal, performed according to the subroutine "sub SwitchVerticalAndHorizontal" in step S103 in FIG. 21, with reference to FIG. 22.

The determination unit 134 obtains, from TemporalCapa (1, 1) to TemporalCapa(AllRows, AllColumns) obtained by the operation in step S102, BigX(1)=an X coordinate of the sensor electrode 121 having the largest value of capacitance, BigY(1)=a Y coordinate of the sensor electrode 121 having the largest value of capacitance, BigX(2)=an X coordinate of the sensor electrode 121 having the second largest value of capacitance, BigY(2)=a Y coordinate of the sensor electrode 121 having the second largest value of capacitance, BigX(3)=an X coordinate of the sensor electrode 121 having the third largest value of capacitance, BigY(3)=a Y coordinate of the sensor electrode 121 having the third largest value of capacitance, BigX(4)=an X coordinate of the sensor electrode 121 having the fourth largest value of capacitance, BigY(4)=a Y coordinate of the sensor electrode 121 having the fourth largest value of capacitance, BigX(5)=an X coordinate of the sensor electrode 121 having the fifth largest value of capacitance, and BigY(5)=a Y coordinate of the sensor electrode 121 having the fifth largest value of capacitance (step S111). The X coordinate indicates the number of the column j of the sensor electrode 121, and the Y coordinate indicates the number of the row i of the sensor electrode 121.

The determination unit 134 calculates an absolute value of covariance of BigX(i) and BigY(i) and an absolute value of variance of BigX(i) based on (BigX(1), BigY(1)), (BigX(2), BigY(2)), (BigX(3), BigY(3)), (BigX(4), BigY(4)), and (BigX(5), BigY(5)) (step S112).

The determination unit 134 determines whether the "absolute value of covariance of BigX(i) and BigY(i)" is equal to or smaller than the "absolute value of variance of BigX(i)" (step S113).

When the "absolute value of covariance of BigX(i) and BigY(i)" is equal to or smaller than the "absolute value of variance of BigX(i)" (Yes in S113), the determination unit 134 assigns TemporalAllColumns to AllRows and TemporalAllRows to AllColumns to transpose the row and the column (step S114A). This means that AllRows=TemporalAllColumns, and AllColumns=TemporalAllRows.

The determination unit 134 performs loop processing for rearranging all the rows i while consecutively selecting the row i from i=1 to AllRows (steps S115A to S119A). "i=1, AllRows, 1" means rearranging all the rows i while consecutively selecting one row from the row number i=1 to AllRows.

The determination unit 134 performs loop processing for rearranging all the columns j while consecutively selecting the column j from j=1 to AllColumns (steps S116A to S118A). "j=1, AllColumns, 1" means rearranging the column j while consecutively selecting one column from the column number j=1 to AllColumns.

The determination unit 134 assigns TemporalCapa(i, j) to a capacitance "Capacitance(j, i)" at a location (j, i) (step S117A). In this manner, the column and the row are transposed.

The determination unit 134 repeats the loop processing of steps S116A to S118A until all the columns j are rearranged (step S118A).

The determination unit 134 repeats the loop processing of steps S115A to S119A until all the rows i are rearranged. Subsequently, the operation according to the subroutine "sub SwitchVerticalAndHorizontal" ends (END).

When the "absolute value of covariance of BigX(i) and BigY(i)" is greater than the "absolute value of variance of BigX(i)" (No in step S113), the determination unit 134 assigns TemporalAllRows to AllRows and TemporalAllColumns to AllColumns (step S114B). This means that AllRows=TemporalAllRows, and AllColumns=TemporalAllColumns.

The determination unit 134 performs loop processing for copying the difference values $\Delta AD$ of all the rows i while consecutively selecting the row i from i=1 to AllRows (steps S115B to S119B). "i=1, AllRows, 1" means performing copying while consecutively selecting one row from the row number i=1 to AllRows.

The determination unit 134 performs loop processing for copying the difference values $\Delta AD$ of all the columns j while consecutively selecting the column j from j=1 to AllColumns (steps S116B to S118B). "j=1, AllColumns, 1" means performing copying while consecutively selecting one column from the column number j=1 to AllColumns.

The determination unit 134 assigns TemporalCapa(i, j) to the capacitance Capacitance(i, j) at a location (i, j) (step S117B). In the case, the column and the row are not transposed.

The determination unit 134 repeats the loop processing of steps S116B to S118B until all the columns j are copied.

The determination unit 134 repeats the loop processing of steps S115B to S119B until all the rows i are copied. Subsequently, the operation according to the subroutine "sub SwitchVerticalAndHorizontal" ends (END).

The following describes an operation performed according to the subroutine "sub RestoreVerticalAndHorizontal" in step S109 in FIG. 21, with reference to FIG. 23.

The determination unit 134 determines whether the "absolute value of covariance of BigX(i) and BigY(i)" is equal to or smaller than the "absolute value of variance of BigX(i)" (step S121). The purpose of this operation is to determine whether to restore the vertical and the horizontal. The branch condition in step S121 is the same as step S113. When the series of operations are performed after the vertical and the horizontal are switched, the vertical and the horizontal of the coordinates to be outputted are switched, so that the location of the fingertip is correctly outputted.

When determining that the "absolute value of covariance of BigX(i) and BigY(i)" is equal to or smaller than the "absolute value of variance of BigX(i)" (Yes in step S121), the determination unit 134 exchanges the value of the variable "row" with the value of a variable "column(row)". To do this, firstly, the value of the variable "row" is stored in the variable j; secondly, column(row) is assigned to the variable "row"; and finally, the value of the variable j is assigned to the variable column(row) (step S122). After completing the operation in step S122, the determination unit 134 ends the operation according to the subroutine "sub RestoreVerticalAndHorizontal" (END).

When determining that the "absolute value of covariance of BigX(i) and BigY(i)" is greater than the "absolute value of variance of BigX(i)" (No in step S121), the determination unit 134 ends the operation according to the subroutine "sub RestoreVerticalAndHorizontal" (END).

The following describes a specific example of the operations from calculating the difference value $\Delta AD$ to identifying the location of the fingertip FT with reference to FIGS. 24A to 24C, and 25A to 25D. It is assumed that an operational input is performed on the sensor electrode 121(2, 3) at the row 2 in the column 3 as illustrated in FIGS. 2 and 3. Additionally, the following description is based on the assumption that the same difference values $\Delta AD$ as indicated in FIG. 14A are obtained in the operation according to "sub TransformToReciprocal" in step S104, and the same values of sharpness as indicated in FIG. 15C are obtained with "sub CalculateSharpness" in step S107.

FIGS. 24A, 24B, and 24C indicate an order of the difference values $\Delta AD$ calculated on the sensor electrodes 121 with 5 rows and 6 columns, and an absolute value of variance of BigX(i) and an absolute value of covariance of BigX(i) and BigY(i). FIG. 24A indicates an order of the difference values $\Delta AD$ calculated on the sensor electrodes 121 with 5 rows and 6 columns. Of 30 values of the difference value ΔAD, the sensor electrode 121(2, 3) of the largest difference value is in the first place, and the sensor electrode 121(1, 6) of the smallest difference value is in the thirtieth place.

FIG. 24B indicates an X coordinate (the column j) and a Y coordinate (the row i) of the individual sensor electrodes 121 in the first to fifth places of the difference values ΔAD presented in FIG. 24A. The sensor electrodes 121 in the first to fifth places are the sensor electrode 121 having the first largest to fifth largest values of capacitance.

FIG. 24C indicates an "absolute value of variance of BigX(i)" (0.16) calculated based on the X coordinate of the individual sensor electrode 121 having the first largest to fifth largest values of capacitance and an "absolute value of covariance of BigX(i) and BigY(i) calculated based on the X and Y coordinates" (0.24). According to FIG. 24(C), the condition that "the absolute value of covariance of BigX(i) and BigY(i) calculated based on the X and Y coordinates (0.24) the absolute value of variance of BigX(i) (0.16)" is not satisfied. Thus, in this example, the vertical and the horizontal are not switched.

FIGS. 25A, 25B, 25C, and 25D indicate determination results obtained in the operation of identifying the fingertip according to the fourth modification illustrated in FIGS. 20A and 20B. FIG. 25A indicates determination results of "SPACE", "FINGER", or "PALM" obtained in the operation of identifying the fingertip, which is illustrated in FIGS. 20A and 20B, based on sharpness indicated in FIG. 15C; when sharpness indicates 0.00, 0.73, 0.41, 0.34, and 0.03 as indicated from top to bottom in FIG. 15C, the determination results are "SPACE, "FINGER", "FINGER", "FINGER", and "PALM".

FIG. 25B indicates determination results obtained in the loop processing for determining a finger extended from the palm P on the lower side; the determination results are provided as "FALSE" or "TRUE" based on results of combining two entries selected in descending order from the top of the five determination results in FIG. 25A. In this example, the determination is provided from the upper entries. In FIG. 25B, the topmost result is FALSE because the previous results are "SPACE" and "FINGER; the second result is FALSE because the previous results are "FINGER" and "FINGER"; the third result is FALSE because the previous results are "FINGER" and "FINGER"; the fourth (bottommost) result is TRUE because the previous results are "FINGER" and "PALM". Because TRUE exists, it is determined that a finger is extended toward the upper side from the palm P on the lower side.

FIG. 25C indicates determination results obtained in the loop processing for determining the fingertip FT is present over the row i. Because the finger is determined to be extended from the palm P on the lower side, the determination here is performed from the lower side. Based on the determination results in FIG. 25A, as indicated in FIG. 25C, the fourth (bottommost) result is FALSE because the row i is "FINGER" and the row i−1 is "FINGER"; the third result is FALSE because the row i is "FINGER" and the row i−1 is also "FINGER"; the second result is TRUE because the row i is "FINGER" and the row i−1 is "SPACE"; the topmost result is indicated by "-" because the determination is not provided for the topmost row without the row i−1. The fingertip FT is present over the row 2 designated TRUE.

FIG. 25D indicates results of identifying the location of the fingertip. The column Column(2) with the minimum value in the row 2 is, according to FIG. 14C, the column 3. Therefore, the location of the fingertip is at the row 2 in the column 3.

As described above, the location of the fingertip FT can be identified. Accordingly, it is possible to provide the contactless input device 100A that can accurately identify the location of the fingertip FT spaced apart from the sensor electrodes 121.

Operation of Identifying Location of Fingertip FT According to Sixth Modification The following describes how to identify the location of the fingertip FT according to a sixth modification with reference to flowcharts in FIGS. 26 to 29. FIGS. 26 to 29 are flowcharts illustrating a process of identifying the location of the fingertip FT according to the sixth modification. This process is performed by the determination unit 134. FIG. 26 illustrates a main flow, and FIGS. 27 to 29 respectively illustrate flows of subroutine operations in steps S134 to S136 in FIG. 26. The subroutine operations "sub SwitchVerticalAndHorizontal", "sub IdentifyFingertip", and "sub RestoreVerticalAndHorizontal" in FIGS. 22, 13, and 23 are used as the subroutine operations in steps S133, S137, and S138 in FIG. 26, and descriptions thereof are not repeated. The following description is based on the condition that, for example, an operational input can be performed with the hand H held over the electronic apparatus 100 above the operating surface 105 in an orientation from the front side in any of the −Y direction, the +Y direction, the −X direction, and the +X direction of the electronic apparatus 100 in FIG. 3.

When the process starts, the determination unit 134 reads the number of rows and the number of columns of the sensor electrodes 121 from the memory 137 (step S131). "TemporalAllRows" indicates the number of rows of the sensor electrodes 121, and "TemporalAllColumns" indicates the number of columns of the sensor electrodes 121. For example, TemporalAllRows indicates 5 rows, and TemporalAllColumns indicates 6 columns.

Next, the determination unit 134 obtains the difference values ΔAD(1, 1) to ΔAD(AllRows, AllColumns) of all the sensor electrodes 121 and inputs the difference values to TemporalCapa(1, 1) to TemporalCapa(AllRows, AllColumns) (step S132). As the result of performing the operation in step S132, for example, 30 values of the difference values TemporalCapa(1, 1) to TemporalCapa(AllRows, AllColumns) about the 30 pieces of the sensor electrodes 121 are obtained.

Next, the determination unit 134 calls the subroutine "sub SwitchVerticalAndHorizontal" (refer to FIG. 22) (step S133). Because the subroutine "sub SwitchVerticalAndHorizontal" (refer to FIG. 22) has been described in another example, the description thereof is not repeated.

Next, the determination unit 134 calls a subroutine "sub DetermineMaximumValue" (refer to FIG. 27) and determines a maximum value of Capacitance(i, j) in the individual rows (step S134).

Next, the determination unit 134 calls the subroutine "sub IdentifyRowToExclude" (refer to FIGS. 28A and 28B) and performs the operation of identifying a row to be excluded (step S135). The row to be excluded is a row in which the hand H is not present. By identifying the row without the hand and excluding the row, the target is narrowed down to rows in which the hand is present.

Next, the determination unit 134 calls the subroutine "sub CalculateSharpness" (refer to FIG. 29) and performs the operation of calculating the sharpness at the row with the hand (step S136).

Next, the determination unit 134 calls the subroutine "sub IdentifyFingertip" (refer to FIG. 13) and performs the operation of identifying a row with the fingertip FT based on the sharpness calculated on the individual rows with the hand in step S136 (step S137).

Next, the determination unit 134 calls the subroutine "sub RestoreVerticalAndHorizontal" (refer to FIG. 23) and performs the operation of restoring the vertical and the horizontal (step S138).

Lastly, the determination unit 134 outputs coordinates indicating the location of the top of the fingertip FT (step S139). Here, "row" indicates a row number of the row with the fingertip FT. "column(i)" indicates a column number with a maximum capacitance value in the row i, and thus, "column(row)" indicates a column number with a maximum capacitance value in the row "row".

Figure 27:
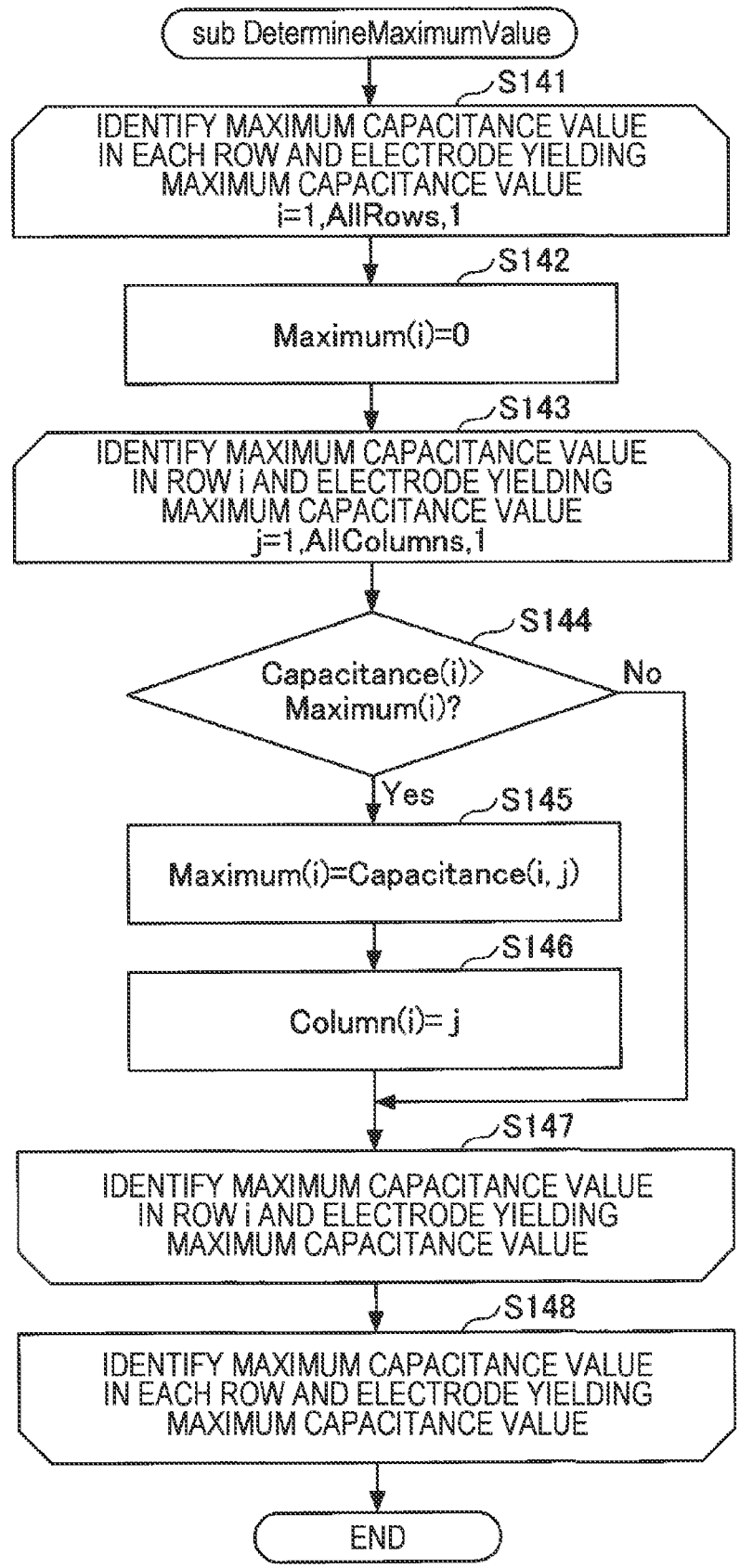
FIG. 27 is a flowchart illustrating the process of identifying the location of the fingertip according to the sixth modification.

The following describes an operation of determining a maximum value, performed according to the subroutine "sub DetermineMaximumValue" in step S134 in FIG. 26, with reference to FIG. 27.

The determination unit 134 starts loop processing for identifying a maximum capacitance value in the row i and an electrode yielding the maximum capacitance value while consecutively selecting the row i from i=1 to AllRows (steps S141 to S148). "i=1, AllRows, 1" means identifying a maximum capacitance value and an electrode yielding the maximum value while consecutively selecting one row from the row number i=1 to AllRows.

The determination unit 134 sets the initial value of a maximum capacitance value Maximum(i) in the row i to 0 (step S142). This means that Maximum(i)=0.

The determination unit 134 starts loop processing for identifying a maximum capacitance value in the column j and an electrode yielding the maximum capacitance value while consecutively selecting the column j from j=1 to AllColumns (steps S143 to S147). "j=1, AllColumns, 1" means identifying a maximum capacitance value and an electrode yielding the maximum value while consecutively selecting one column from the column number j=1 to AllColumns.

The determination unit 134 determines whether the capacitance Capacitance(i) is greater than the maximum value Maximum(i) (step S144).

When determining that the capacitance value Capacitance(i) is greater than the maximum value Maximum(i) (Yes in step S144), the determination unit 134 assigns the capacitance value Capacitance(i, j) to the maximum value Maximum(i) (step S145). The purpose of this operation is to update the maximum value Maximum(i) in the row i. The determination unit 134 stores in the memory 137 the maximum value Maximum(i) in the row i updated in step S145.

The determination unit 134 assigns j to the column Column(i) yielding the maximum value Maximum(i) in the row i (step S146). This means that Column(i)=j. Column(i) indicates a column number with a maximum capacitance value in the row i. The determination unit 134 stores the value obtained in step S146 in the memory 137.

The determination unit 134 performs the loop processing of steps S143 to S147 to identify a maximum capacitance value and the sensor electrode 121(i, j) yielding the maximum value in relation to the selected row i.

The determination unit 134 repeats loop processing of steps S141 to S148 until a maximum capacitance value and the sensor electrode 121(i, j) yielding the maximum value are identified on all rows. As a result, a maximum capacitance value and the sensor electrode 121(i, j) yielding the maximum value are identified on all rows.

Figure 28A:
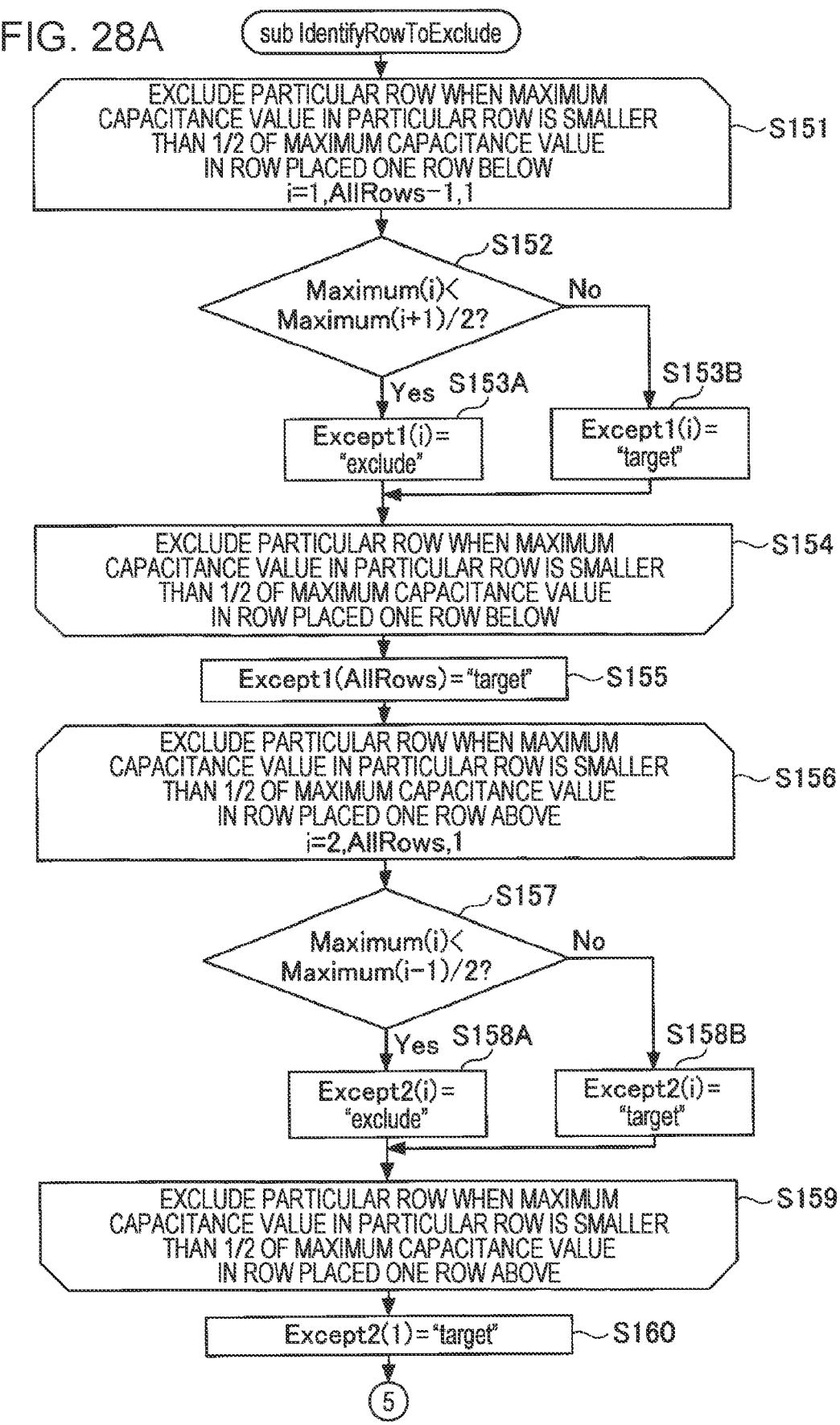
FIGS. 28A and 28B provide a flowchart illustrating the process of identifying the location of the fingertip according to the sixth modification.
Figure 28B:
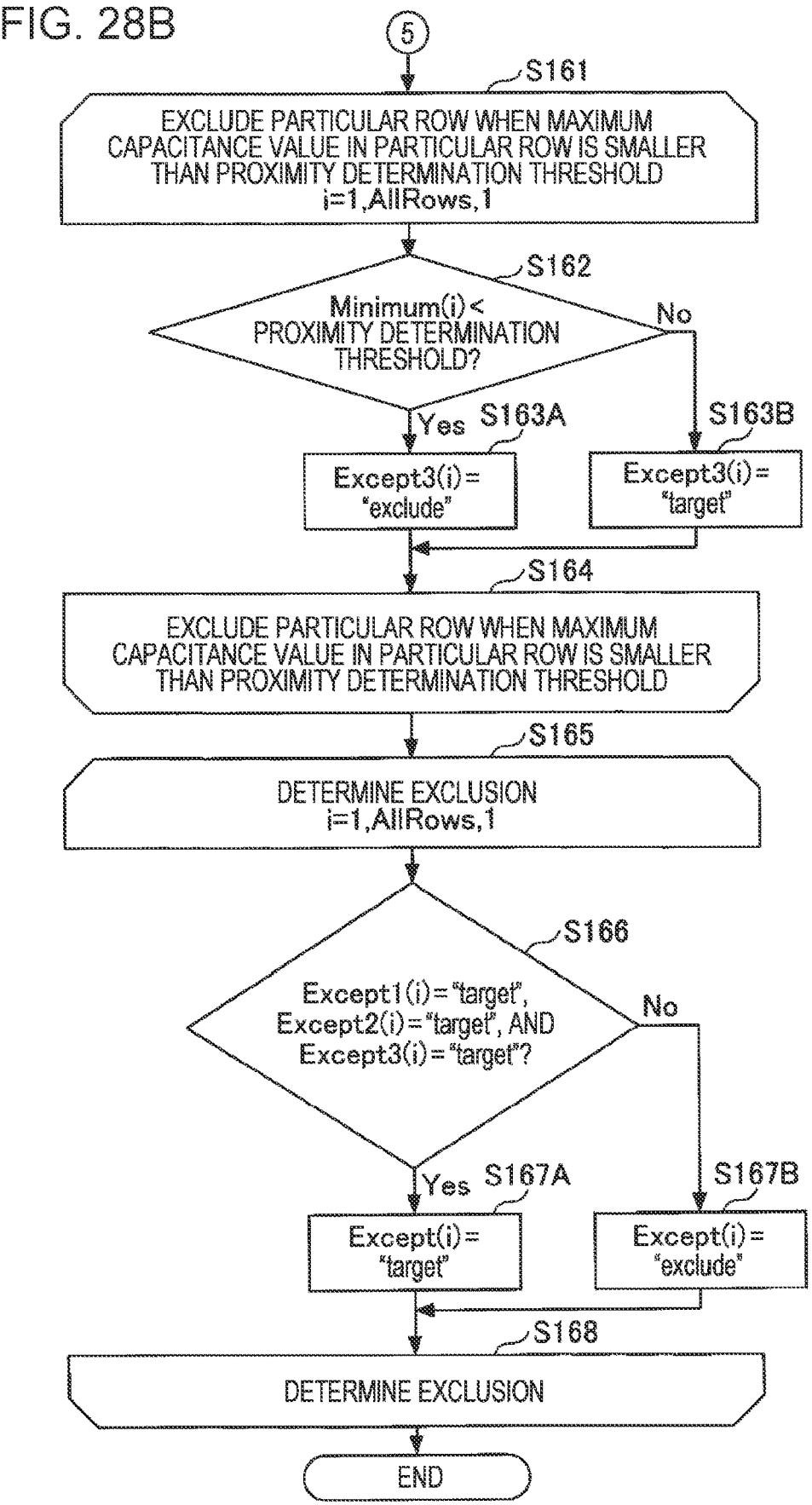

The following describes an operation of identifying a row to be excluded, performed according to the subroutine "sub IdentifyRowToExclude" in step S135 in FIG. 26, with reference to FIGS. 28A and 28B.

The determination unit 134 performs loop processing for excluding the row i when the maximum capacitance value in the row i is smaller than ½ of the maximum capacitance value in the row i+1 placed one row below, with respect to all the rows i from i=1 to AllRows−1 (steps S151 to S154).

The row i+1 placed one row below the row i is a row next to the row i in the −Y direction. "i=1, AllRows−1, 1" means identifying a row to be excluded while consecutively selecting one row from the row number i=1 to AllRows−1. Because there is no following row below the row AllRows, the processing is repeated until the processing is performed on the row number AllRows−1.

In the operation of identifying a row to be excluded, for the purpose of identifying the top of the fingertip FT, the row i is excluded when the maximum capacitance value in the row i is smaller than ½ of the maximum capacitance value in the row i+1 placed one row below. The maximum capacitance value in a row under the top of the fingertip FT is relatively large; in contrast, the maximum capacitance value in a row placed one row above the row under the top of the fingertip FT is relatively small because the top of the fingertip FT does not overlap the row. As such, the maximum capacitance value greatly differs between a row under the top of the fingertip FT and one row above. Here, for example, the configuration is made such that the location at which the maximum capacitance value is smaller than ½ is deemed to be the location of a row placed one row above the top of the fingertip FT; when the maximum capacitance value in the row i is smaller than ½ of the maximum capacitance value in the row i+1 placed one row below, the row i is excluded. In this case, the top of the fingertip FT overlaps the row i+1 but not the row i, the row i is excluded.

The determination unit 134 determines, with respect to the selected row i, whether the maximum capacitance value Maximum(i) in the row i is smaller than ½ of a maximum capacitance value Maximum(i+1) in the row i+1 placed one row below (step S152).

When determining that the maximum capacitance value Maximum(i) is smaller than ½ (Yes in step S152), the determination unit 134 assigns "exclude" to Except1(i) (step S153A). The row i of Except1(i) assigned "exclude" is not targeted for the calculation of sharpness described later. The determination unit 134 stores in the memory 137 Except1(i) as array data including an element of the row number i.

By contrast, when determining that the maximum capacitance value Maximum(i) is not smaller than ½ (No in step S152), the determination unit 134 assigns "target" to Except1(i) (step S153B). The row i of Except1(i) assigned "target" can be targeted for the calculation of sharpness described later. The determination unit 134 stores in the memory 137 Except1(i) as array data including an element of the row number i.

The determination unit 134 repeats the loop processing of steps S151 to S154 until all the rows i are subjected to the operations for excluding the row i when the maximum capacitance value in the row i is smaller than ½ of the maximum capacitance value in the row i+1 placed one row below.

Next, the determination unit 134 designates AllRows indicating the lowermost row as a target row (step S155). As a result, Except1(AllRows)="target". Because there is no row placed one row below the lowermost row AllRows, the configuration is made to designate AllRows as a target.

Next, the determination unit 134 performs loop processing for excluding the row i when the maximum capacitance value in the row i is smaller than ½ of the maximum capacitance value in the row i−1 placed one row above, with respect to all the rows i from i=2 to AllRows (steps S156 to S159).

The row i−1 placed one row above the row i is a row next to the row i in the +Y direction. "i=2, AllRows, 1" means identifying a row to be excluded while consecutively selecting one row from the row number i=2 to AllRows. The row number i=1 is excluded because there is no row placed one row above the uppermost row.

In the operation of identifying a row to be excluded, for the purpose of avoiding misrecognition of a space close to the fingertip FT as a finger, the row i is excluded when the maximum capacitance value in the row i is smaller than ½ of the maximum capacitance value in the row i−1 placed one row above. The reason for excluding the row i when the minimum reciprocal value in the row i is smaller than ½ is that, when the fingertip FT is present across the row i and the row i−1 placed one row above, the maximum capacitance value in the row i cannot be smaller than ½ of the maximum capacitance value in the row i−1 placed one row above, and also for the purpose of matching the configuration with the loop processing of steps S151 to S154.

The determination unit 134 determines, with respect to the selected row i, whether the maximum capacitance value Maximum(i) in the row i is smaller than ½ of a maximum capacitance value Maximum(i−1) in the row i−1 placed one row above (step S157).

When determining that the maximum capacitance value Maximum(i) is smaller than ½ (Yes in step S157), the determination unit 134 identifies the row i as a row to be excluded (Except2(i)="exclude") (step S158A). The row i of Except2(i)="exclude" is not targeted for the calculation of sharpness described later. The determination unit 134 stores in the memory 137 the determination result obtained in step S158A as data including an element of the row number i.

By contrast, when determining that the maximum capacitance value Maximum(i) is not smaller than ½ (No in step S157), the determination unit 134 assigns "target" to Except2(i) (step S158B). The row i of Except2(i) assigned "target" can be targeted for the calculation of sharpness described later. The determination unit 134 stores in the memory 137 Except2(i) of the determination result obtained in step S158B as array data including an element of the row number i.

The determination unit 134 repeats the loop processing of steps S156 to S159 until all the rows i are subjected to the operations for excluding the row i when the maximum capacitance value in the row i is smaller than ½ of the maximum capacitance value in the row i−1 placed one row above.

Next, the determination unit 134 designates i=1 indicating the uppermost row as a target row (step S160). This means that Except2(1) is assigned "target". Because there is no row placed one row above the uppermost row, the configuration is made to designate i=1 as a target.

Next, the determination unit 134 starts loop processing for excluding the row i when the maximum capacitance value in the row i is smaller than the proximity determination threshold, with respect to all the rows i from i=1 to AllRows (steps S161 to S164).

"i=1, AllRows, 1" means identifying a row to be excluded while consecutively selecting one row from the row number i=1 to AllRows. The purpose of excluding the row i when the maximum capacitance value in the row i is smaller than the proximity determination threshold is to determine whether the fingertip FT is present in the row i.

The determination unit 134 determines, with respect to the selected row i, whether the maximum capacitance value Maximum(i) in the row i is smaller than the proximity determination threshold (step S162).

When determining that the maximum capacitance value Maximum(i) is smaller than the proximity determination threshold (Yes in step S162), the determination unit 134 assigns "exclude" to Except3(i) (step S163A). The row i of Except3(i) assigned "exclude" is not targeted for the calculation of sharpness described later. The determination unit 134 stores in the memory 137 Except3(i) as array data including an element of the row number i.

By contrast, when determining that the maximum capacitance value Maximum(i) is not smaller than the proximity determination threshold (No in step S162), the determination unit 134 assigns "target" to Except3(i) (step S163B). The row i of Except3(i) assigned "target" can be targeted for the calculation of sharpness described later. The determination unit 134 stores in the memory 137 Except3(i) as array data including an array element of the row number i.

The determination unit 134 repeats the loop processing of steps S161 to S164 until all the rows i are subjected to the operations for excluding the row i when the maximum capacitance value in the row i is smaller than the proximity determination threshold.

Next, the determination unit 134 performs loop processing for determining a row to be excluded while consecutively selecting the row i from i=1 to AllRows (steps S165 to S168). "i=1, AllRows, 1" means consecutively selecting one row from the row number i=1 to AllRows to determine a row to be excluded.

The determination unit 134 determines whether Except1(i)="target", Except2(i)="target", and Except3(i)="target", with respect to the selected row i (step S166).

When determining Yes in step S166, the determination unit 134 assigns "target" to Except(i) (step S167A). The row i of Except(i) assigned "target" is targeted for the calculation of sharpness described later. The determination unit 134 stores in the memory 137 Except(i) as array data including an element of the row number i.

By contrast, when at least one of Except1(i), Except2(i), and Except3(i) is "exclude", the determination unit 134 determines No in step S166. When determining No in step S166, the determination unit 134 assigns "exclude" to Except(i) (step S167B). The row i of Except(i) assigned "exclude" is not targeted for the calculation of sharpness described later. The determination unit 134 stores in the memory 137 Except(i) as array data including an element of the row number i.

The determination unit 134 repeats the loop processing of steps S165 to S168 until all the rows i are subjected to the operations for determining a row to be excluded. In the manner described above, the row i to be excluded is determined among all the rows i.

Figure 29:
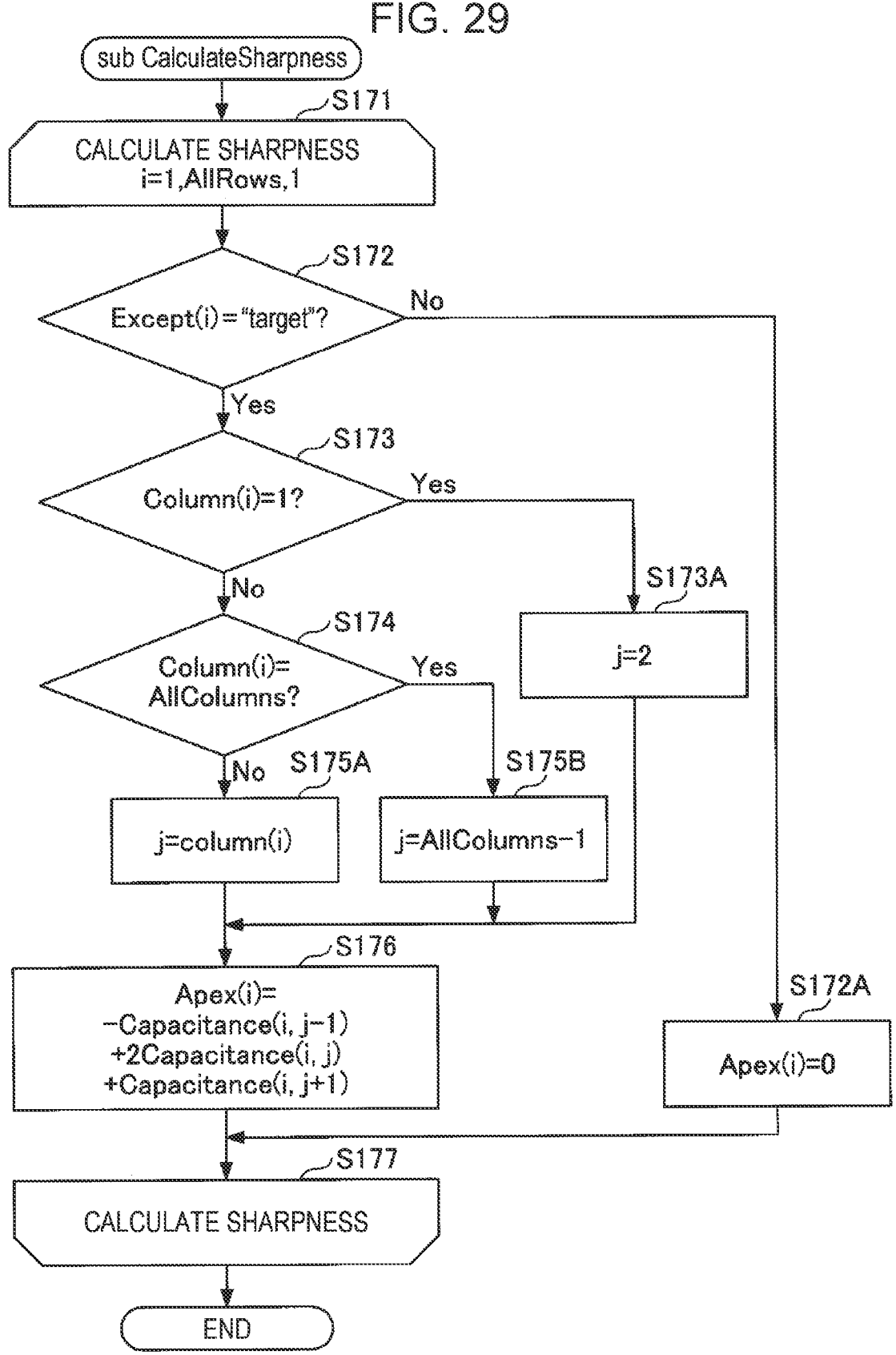
FIG. 29 is a flowchart illustrating the process of identifying the location of the fingertip according to the sixth modification.

The following describes an operation of calculating sharpness, performed according to the subroutine "sub CalculateSharpness" in step S136 in FIG. 26, with reference to FIG. 29. FIG. 29 is a flowchart illustrating an operation of calculating sharpness, performed according to the subroutine "sub CalculateSharpness".

The determination unit 134 performs loop processing for calculating sharpness while consecutively selecting the row i from i=1 to AllRows (steps S171 to S177). "i=1, AllRows, 1" means calculating sharpness while consecutively selecting one row from the row number i=1 to AllRows.

The determination unit 134 determines whether Except(i)="target" with respect to the selected row i (step S172). This is because when Except(i) is not target, sharpness is not calculated.

When determining that Except(i)="target" (Yes in S172), the determination unit 134 determines whether the column Column(i) yielding the maximum value Maximum(i) in the row i is the column 1 (step S173). This means it is determined whether Column(i)=1 in relation to the row i. The purpose of this operation is to determine whether the maximum value Maximum(i) in the row i is obtained in the column 1 (a column along the front end in the −X direction).

When determining that Column(i)=1 is not satisfied (No in S173), the determination unit 134 determines whether Column(i)=AllColumns (step S174). This means it is determined whether Column(i)=AllColumns in relation to the row i. The purpose of this operation is to determine whether the maximum value Maximum(i) in the row i is obtained in the column indicated by AllColumns along the front end in the +X direction.

When determining that Column(i)=AllColumns is not satisfied (No in S174), the determination unit 134 assigns Column(i) to j (step S175A). This means that when Column(i) is a column other than the end columns, Column(i) is assigned to j. Column(i) indicates a column yielding the maximum value Maximum(i) in the row i (refer to step S26).

The determination unit 134 calculates a sharpness Apex(i) (step S176). The sharpness Apex(i) is given by the expression presented below. The determination unit 134 calculates the sharpness Apex(i) and subsequently proceeds to step S177.

$$\text{Apex}(i) = -\text{Capacitance}(i,j-1) + 2\text{Capacitance}(i,j) + \text{Capacitance}(i,j+1)$$

When determining that Except(i)="target" is not satisfied (No in S172), the determination unit 134 sets the sharpness Apex(i) to 0 (step S172A). This means that the sharpness Apex(i) is assigned 0. Because the row is not targeted for calculation of sharpness, the sharpness Apex(i) is set to 0. As will be described later, the sharpness Apex(i) is used to identify a row under a fingertip. By setting the sharpness Apex(i) of a row not targeted for calculation of sharpness to a particular numerical value (0), rows targeted for calculation of sharpness and rows not targeted for calculation of sharpness can be dealt with in accordance with the same procedure. As will be described later, in this embodiment, calculation of sharpness yields a positive value. As will be described later, a row with a greatest sharpness is identified as a row under a fingertip. As a result, setting the sharpness Apex(i) to 0 equals determining that the row i is not a row under a fingertip.

When determining that Column(i)=1 (Yes in S173), the determination unit 134 sets j=2 (step S173A). The purpose of this operation is that, because the column Column(i) yielding the maximum value Maximum(i) in the row i is a column along the front end in the −X direction (the column 1), the column 2 is designated as the column j in the middle of three columns used to calculate sharpness; as a result, three values of reciprocal of the columns 1 to 3 are used to calculate sharpness. After completing the operation in step S173A, the determination unit 134 proceeds to step S176 and calculates sharpness.

When determining that Column(i)=AllColumns (Yes in S174), the determination unit 134 sets j=AllColumns−1 (step S175B). The purpose of this operation is that, because the column Column(i) yielding the maximum value Maximum(i) in the row i is a column along the front end in the +X direction (the column 6 indicated by AllColumns), AllColumns−1 (the column 5) is designated as the column j in the middle of three columns used to calculate sharpness; as a result, three values of reciprocal of the columns 4 to 6 are used to calculate sharpness. After completing the operation in step S175B, the determination unit 134 proceeds to step S176 and calculates sharpness.

The determination unit 134 repeats the loop processing of steps S171 to S177 until all the rows i are subjected to the operations for calculating sharpness.

Operation of Calculating Sharpness According to Seventh Modification

Figure 30:
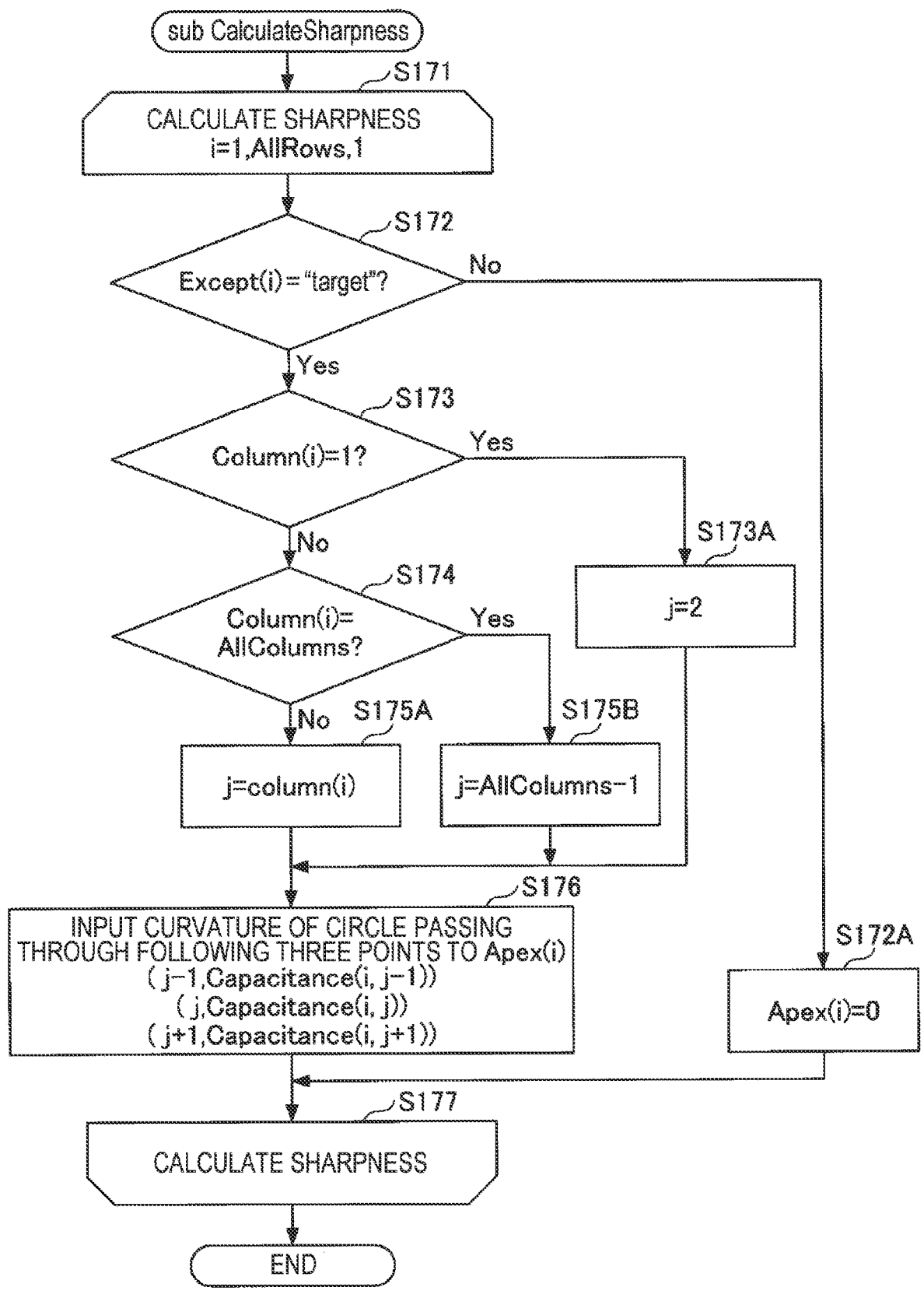
FIG. 30 is a flowchart illustrating an operation of calculating sharpness, performed according to a subroutine "subCalculateSharpness" of a seventh modification.

FIG. 30 is a flowchart illustrating an operation of calculating sharpness, performed according to a subroutine "sub CalculateSharpness" of a seventh modification. In the operations illustrated in FIG. 30, the operation in step S176 is different from the operation in step S176 illustrated in FIG. 29. The following describes the difference to the operation illustrated in FIG. 29.

In the operation illustrated in the FIG. 30, the determination unit 134 calculates the curvature of a circle passing through the following three points as the sharpness Apex(i) (step S176). The three points are indicated by (j−1, Capacitance(i, j−1)), (j, Capacitance(i, j)), and (j+1, Capacitance(i, j+1)).

Here, in the xy coordinates in which the x axis indicates the column j, and the y axis indicates the capacitance value Capacitance, j−1, j, j+1 are represented by x1, x2, x3, and Capacitance(i, j−1), Capacitance(i, j), Capacitance(i, j+1) are represented by y1, y2, y3. In this example, instead of the reciprocal Reciprocal designated as the y axis in FIG. 17, the capacitance value Capacitance is designated as the y axis. This example is not illustrated in the drawings.

The determination unit 134 calculates a radius r of a circle passing through the three points in the same manner and accordingly inputs a curvature (a reciprocal of the radius: 1/r) to the sharpness Apex(i). This means that the sharpness Apex(i)=1/r.

Operation of Calculating Sharpness According to Eighth Modification

Figure 31:
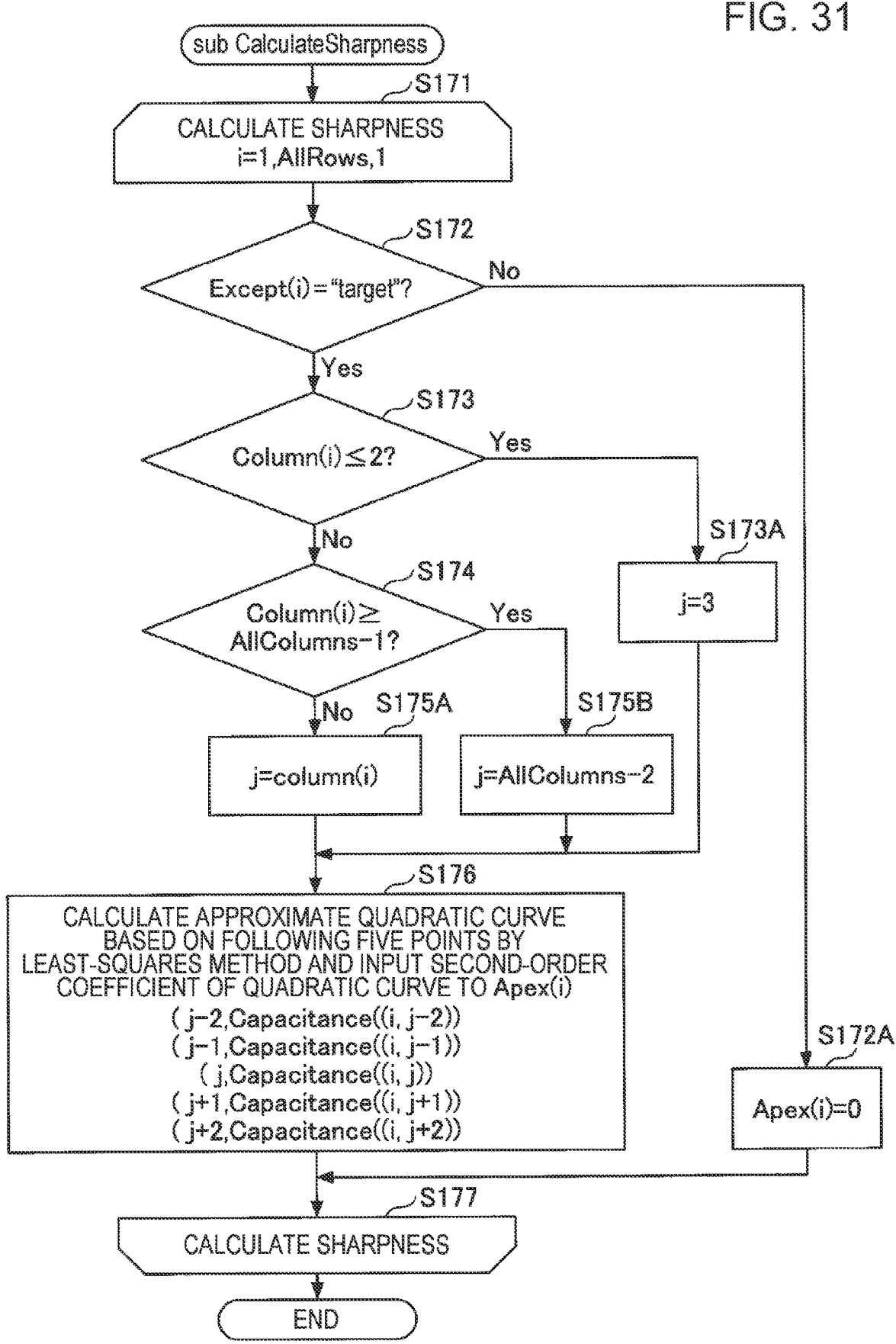
FIG. 31 is a flowchart illustrating an operation of calculating sharpness, performed according to a subroutine "subCalculateSharpness" of an eighth modification.

FIG. 31 is a flowchart illustrating an operation of calculating sharpness, performed according to a subroutine "sub CalculateSharpness" of an eighth modification. In the operations illustrated in FIG. 31, the operation in step S176 is different from the operation in step S176 illustrated in FIG. 29. The following describes the difference to the operation illustrated in FIG. 29.

In the operation illustrated in FIG. 31, the determination unit 134 calculates a quadratic curve that approximates adjacent five points in the row i by curve fitting according to the least-squares method and further calculates a second-order coefficient of the curve as the sharpness Apex(i) (step S176).

The adjacent five points in the row i are indicated by (j−2, Capacitance(i, j−2)), (j−1, Capacitance(i, j−1)), (j, Capacitance(i, j)), (j+1, Capacitance(i, j+1)), and (j+2, Capacitance(i, j+2)). The determination unit 134 calculates the sharpness Apex(i) and subsequently proceeds to step S177.

Operation of Calculating Sharpness According to Ninth Modification

Figure 32:
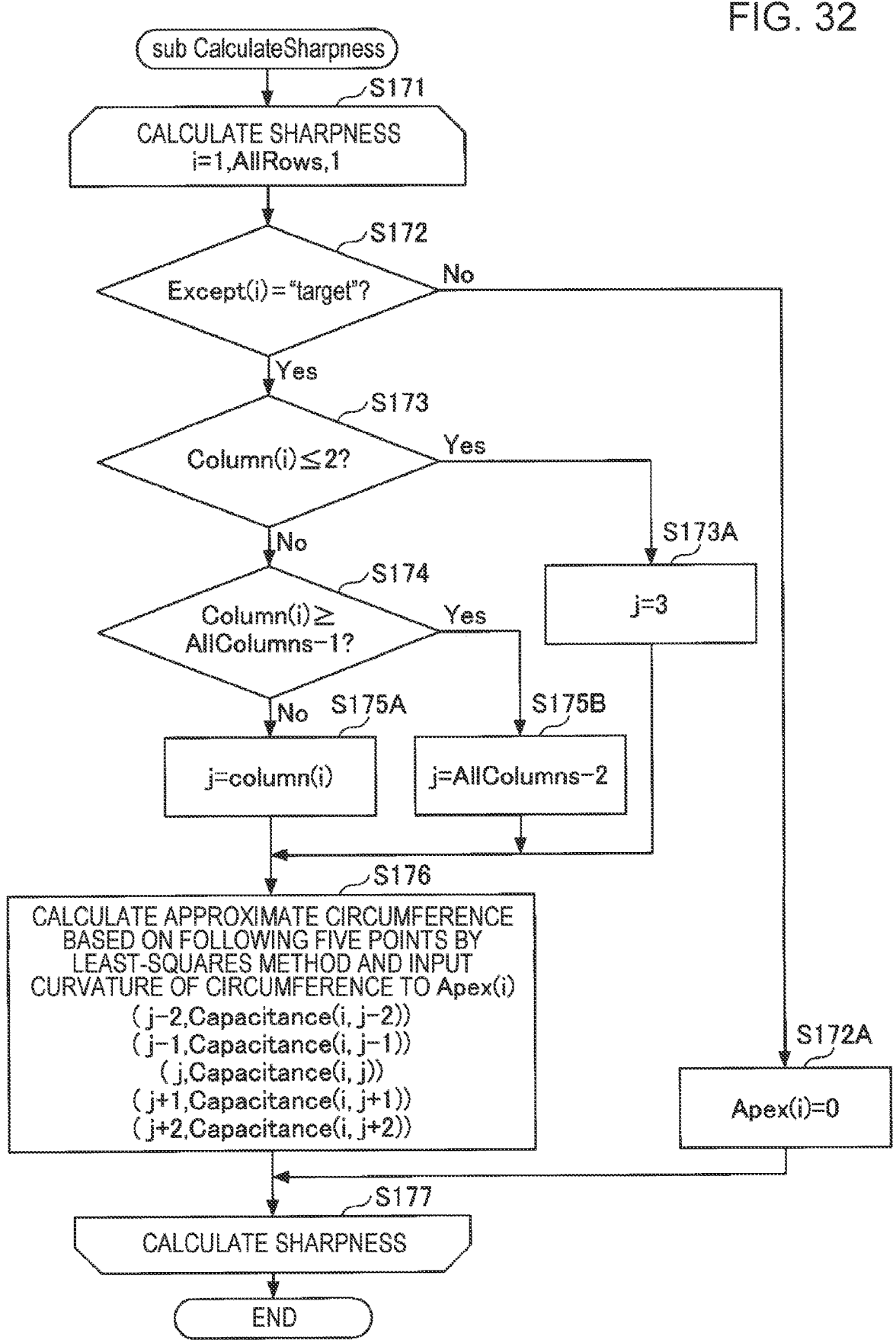
FIG. 32 is a flowchart illustrating an operation of calculating sharpness, performed according to a subroutine "subCalculateSharpness" of a ninth modification.

FIG. 32 is a flowchart illustrating an operation of calculating sharpness, performed according to a subroutine "sub CalculateSharpness" of a ninth modification. In the operations illustrated in FIG. 32, the operation in step S176 is different from the operation in step S176 illustrated in FIG. 29. The following describes the difference to the operation illustrated in FIG. 29.

In the operation illustrated in FIG. 32, the determination unit 134 calculates a circumference that approximates adjacent five points in the row i by curve fitting with the least-squares method and further calculates a curvature of the circumference as the sharpness Apex(i) (step S176).

The adjacent five points in the row i are indicated by (j−2, Capacitance(i, j−2)), (j−1, Capacitance(i, j−1)), (j, Capacitance(i, j)), (j+1, Capacitance(i, j+1)), and (j+2, Capacitance(i, j+2)). The determination unit 134 calculates the sharpness Apex(i) and subsequently proceeds to step S177.

Configuration of Electrostatic Sensor 120

FIG. 33 illustrates a specific configuration of the electrostatic sensor 120 of the contactless input device 100A.

The electrostatic sensor 120, which is overlaid on the display device 110, includes, a plurality of sensor electrodes 121X elongated in the X direction and a plurality of sensor electrodes 121Y elongated in the Y direction as illustrated in FIG. 33. The sensor electrodes 121X and 121Y are individually coupled to the control device 130 with wires 122X and 122Y. The electrostatic sensor 120 configured as described above may be formed by, for example, patterning the sensor electrodes 121X and 121Y and the wires 122X and 122Y at a transparent conductive film made of indium tin oxide (ITO) or other material on a surface of transparent glass. The capacitance of the electrostatic sensor 120 is inputted to the control device 130.

FIG. 33 illustrates, as an example, 12 pieces of the sensor electrodes 121X and 20 pieces of the sensor electrodes 121Y. The relationships of rows and columns of the 12 pieces of the sensor electrodes 121X and the 20 pieces of the sensor electrodes 121Y are the same as the operating parts 111. This means that 12 rows of the sensor electrodes 121X and 20 columns of the sensor electrodes 121Y are arranged. The number of rows of the sensor electrodes 121X and the number of columns of the sensor electrodes 121Y are merely an example.

The 12 rows of the sensor electrodes 121X are scanned one by one, and the 20 columns of the sensor electrodes 121Y are also scanned one by one; the AD conversion unit 132 converts into a digital value the capacitance at 240 points at which the 12 rows of the sensor electrodes 121X and the 20 columns of the sensor electrodes 121Y intersect; the counter 133 counts the amount of change on each output of the AD conversion unit 132 and outputs the difference value ΔAD at the 240 points of intersection. Given that coordinates at individual intersection points are represented by (i, j), in this example, the row i is indicated by 1 to 12, and the column j is indicated by 1 to 20.

The above has described an exemplary embodiment of the contactless input device according to the present invention. The present invention is, however, not intended to be limited to the specifically disclosed embodiment, and various modifications and changes may be made without departing from the claims.

What is claimed is:

1. A contactless input device comprising:
   an operating surface, over which an input operation is performed by a hand in a contactless manner;
   a plurality of sensor electrodes arranged along the operating surface, the plurality of electrodes being configured to individually detect respective capacitances according to proximity of the hand to the operating surface; and
   a determination unit configured to calculate a sharpness indicating a part of the hand for a plurality of locations on the operating surface based on the respective capacitances detected by the plurality of sensor electrodes, and to determine an input location of the input operation based on the sharpness obtained at the plurality of locations,
   wherein the sharpness is calculated by curve fitting reciprocals of the respective capacitances of adjacent sensor electrodes, a curvature of the curve fitting indicating a shape of the part of the hand.

2. The contactless input device according to claim 1, wherein the determination unit is further configured to identify a location, among the plurality of locations, at which a maximum sharpness is obtained as the input location of the input operation.

3. The contactless input device according to claim 1, wherein the contactless input device is configured to be overlaid on a display device, and
   wherein the determination unit is further configured to calculate the sharpness at the plurality of locations along a horizontal direction of the display device.

4. The contactless input device according to claim 1, wherein the plurality of sensor electrodes are formed by arranging rectangular electrodes.

5. The contactless input device according to claim 1, wherein the plurality of sensor electrodes are arranged in a matrix having rows and columns,
   and wherein the determination unit is configured to calculate the sharpness, row by row, for a plurality of rows of the sensor electrodes, by curve fitting the reciprocals of the capacitances of successive 2n+1 sensor electrodes in each row of the sensor electrodes, where n is a natural number, the 2n+1 sensor electrodes including a particular sensor electrode which yields a minimum reciprocal of the capacitance among the reciprocals of the capacitances obtained from the row of the sensor electrodes.

6. The contactless input device according to claim 5, wherein the determination unit is further configured to:
   compare minimum reciprocals obtained from adjacent rows of the sensor electrodes; and
   determine that a particular sensor electrode location indicates a space where no parts of the hand exists, if a minimum reciprocal obtained from the sensor electrode at the particular sensor electrode location in a certain row is a predetermined number of times greater than another minimum reciprocal obtained in another row adjacent to the certain row.

7. The contactless input device according to claim 6, wherein the determination unit is further configured to:
   compare each of the minimum reciprocals with a proximity determination threshold; and
   determine that the particular sensor electrode location indicates a space where no parts of the hand exists, if the minimum reciprocal obtained from the sensor electrode at the particular sensor electrode location is greater than the proximity determination threshold.

8. The contactless input device according to claim 5, wherein the determination unit is further configured to:
   when the particular sensor electrode which yields the minimum reciprocal in the row of the sensor electrodes is located n or more sensor electrodes away from an edge of the row, select the 2n+1 sensor electrodes such that the 2n+1 sensor electrodes include the particular sensor electrode which yields the minimum reciprocal and n sensor electrodes on each side of the particular sensor electrode in the row; and
   when the particular sensor electrode which yields the minimum reciprocal is located less than sensor electrodes away from the edge of the row, select the 2n+1 sensor electrodes from the edge of the row so as to include the particular sensor electrode which yields the minimum reciprocal.

9. A contactless input device comprising:
an operating surface, over which an input operation is performed by a hand in a contactless manner;
a plurality of sensor electrodes arranged along the operating surface, the plurality of electrodes being configured to individually detect respective capacitances according to proximity of the hand to the operating surface; and
a determination unit configured to calculate a sharpness indicating a part of the hand for a plurality of locations on the operating surface based on the respective capacitances detected by the plurality of sensor electrodes, and to determine an input location of the input operation based on the sharpness obtained at the plurality of locations,
wherein the plurality of sensor electrodes are arranged in a matrix having rows and columns,
and wherein the determination unit is configured to:
calculate the sharpnesses, row by row, for a plurality of rows of the sensor electrodes, by curve fitting the capacitances of successive 2n+1 sensor electrodes in each row of the sensor electrodes, the 2n+1 sensor electrodes including a particular sensor electrode which yields a maximum capacitance among the capacitances obtained from the row of the sensor electrodes,
when the particular sensor electrode which yields the maximum capacitance in the row of the sensor electrodes is located n or more sensor electrodes away from an edge of the row, select the 2n+1 sensor electrodes such that the 2n+1 sensor electrodes includes the particular sensor electrode which yields the maximum capacitance and n sensor electrodes on each side of the particular sensor electrode in the row; and
when the particular sensor electrode which yields the maximum capacitance is located less than n sensor electrodes away from the edge of the row, select the 2n+1 sensor electrodes from the edge of the row so as to include the particular sensor electrode which yields the maximum capacitance.

10. The contactless input device according to claim 9, wherein the determination unit is further configured to:
compare maximum capacitances obtained from adjacent rows of the sensor electrodes; and
determine that a particular sensor electrode location corresponds to a space, if a maximum capacitance obtained from the sensor electrode at the particular sensor electrode location in a certain row is a predetermined number of times smaller than another maximum capacitance obtained in another row adjacent to the certain row.

11. The contactless input device according to claim 10, wherein the determination unit is further configured to:
compare each of the maximum capacitances with a proximity determination threshold; and
determine that the particular sensor electrode location corresponds to a space, if the maximum capacitance obtained from the sensor electrode at the particular sensor electrode location is smaller than the proximity determination threshold.

12. The contactless input device according to claim 5, wherein the determination unit is configured to:
employ a quadratic function as a fitting curve for the curve fitting; and
calculate a second-order coefficient of the quadratic function as the sharpness.

13. The contactless input device according to claim 5, wherein the determination unit is configured to:
employ a circle as a fitting curve for the curve fittings; and
calculate a curvature of the circle as the sharpness.

14. The contactless input device according to claim 5, wherein the determination unit is configured to set n to one (1), thereby using 3 sensor electrodes to calculate the sharpness.

15. The contactless input device according to claim 5, wherein the determination unit is configured to:
set n to two (2) or greater, thereby using 5 or more sensor electrodes to calculate the sharpness; and
employ a least-squares method for the curve fitting.

16. The contactless input device according to claim 5, wherein the successive 2n+1 sensor electrodes are arranged within a range of 10 mm to 100 mm along the row.

17. The contactless input device according to claim 1, wherein the determination unit is further configured to identify a location, among the plurality of locations, at which a sharpness equal to or greater than a threshold sharpness is obtained, as a location of a finger of the hand, the threshold sharpness indicating a sharpness of a finger.

18. The contactless input device according to claim 17, wherein the determination unit is further configured to:
identify a location, among the plurality of locations, at which a sharpness smaller than the threshold sharpness is obtained, as a location of a palm of the hand; and
identify a location of a tip of the finger opposite to the location of the palm as the input location of the input operation.

19. A contactless input device comprising:
an operating surface, over which an input operation is performed by a hand in a contactless manner;
a plurality of sensor electrodes arranged along the operating surface, the plurality of electrodes being configured to individually detect respective capacitances according to proximity of the hand to the operating surface; and
a determination unit configured to calculate a sharpness indicating a part of the hand for a plurality of locations on the operating surface based on the respective capacitances detected by the plurality of sensor electrodes, and to determine an input location of the input operation based on the sharpness obtained at the plurality of locations, the sharpness being calculated by curve fitting the capacitances of the sensor electrodes or curve fitting reciprocals of the capacitances of adjacent sensor electrodes, a curvature of the curve fitting indicating a shape of the part of the hand,
wherein the determination unit is further configured to:
perform a linear approximation of sensor electrode locations of a predetermined number of sensor electrodes, among the plurality of sensor electrodes, which yield capacitances greater than that of other sensor electrodes, to obtain an approximation line using a least-squares method;
identify a direction of the approximation line as a finger direction; and set a calculation direction along which the sharpness is calculated such that an intersecting angle of the calculation direction and the finger direction increases.

\* \* \* \* \*